(12) United States Patent
Nakao et al.

(10) Patent No.: US 6,363,137 B1
(45) Date of Patent: Mar. 26, 2002

(54) INFORMATION TERMINAL APPARATUS

(75) Inventors: Atsushi Nakao, Nara; Masayuki Natsumi, Yamatokoriyama; Takashi Yoshida, Kyoto; Susumu Kitaguchi, Toyonaka, all of (JP)

(73) Assignee: Sharp Kabushiki Kaisha, Oaaka (JP)

( * ) Notice: Subject to any disclaimer, the term of this patent is extended or adjusted under 35 U.S.C. 154(b) by 0 days.

(21) Appl. No.: 09/283,582

(22) Filed: Apr. 1, 1999

(30) Foreign Application Priority Data

Apr. 1, 1998 (JP) ........................................... 10-088452
Apr. 1, 1998 (JP) ........................................... 10-088453

(51) Int. Cl.$^7$ ........................ H04M 1/24; H04M 3/08; H04M 3/22
(52) U.S. Cl. ................ 379/1.01; 379/93.09; 379/93.11; 379/100.15
(58) Field of Search .............................. 379/21, 27, 29, 379/28, 32, 34, 6, 26, 30, 15, 1, 100.15–100.17, 93.09, 93.11

(56) References Cited

U.S. PATENT DOCUMENTS

| 4,972,470 A | | 11/1990 | Farago |
| 5,544,224 A | * | 8/1996 | Jonsson et al. ............. 455/434 |
| 5,548,782 A | | 8/1996 | Michael et al. |
| 5,613,130 A | | 3/1997 | Teng et al. |
| 5,757,680 A | * | 5/1998 | Boston et al. ............... 702/121 |
| 5,956,385 A | * | 9/1999 | Soto et al. ..................... 379/27 |

FOREIGN PATENT DOCUMENTS

| EP | 675449 A1 | 10/1995 |
| JP | 60-203054 A | 10/1985 |
| JP | 5-303456 A | 11/1993 |
| JP | 8-307554 A | 11/1996 |

OTHER PUBLICATIONS

Abstract of Japan, vol. 015, No. 278 (P–1227), Jul. 15, 1991.

* cited by examiner

Primary Examiner—Duc Nguyen

(57) ABSTRACT

Objects of the invention are to enable different kinds of communication apparatus having interfaces of different input/output methods and different signal voltages to be connected to the same interface; to achieve communication processing appropriate to the automatically detected attribute of the communication apparatus; to explicitly indicate optimum communication means; and to enable communications to be automatically resumed even if the communication apparatus is replaced in the middle of communication. The communication apparatus comprises: means for sending the connected state of the communication apparatus and an attribute of the communication apparatus which connected to information terminal apparatus; a signal line for sending a connection notification to the information terminal apparatus; and a signal input section and a signal output section for transferring control signals and data to and from the information terminal apparatus.

25 Claims, 51 Drawing Sheets

10a

| COMMUNICATION APPARATUS | CONNECTION DESTINATION INFORMATION | | |
|---|---|---|---|
| COMMUNICATION APPARATUS A | DESTINATION TELEPHONE NUMBER A | CONNECTION ID A | CONNECTION SETUP INFORMATION A |
| COMMUNICATION APPARATUS B | DESTINATION TELEPHONE NUMBER B | CONNECTION ID B | CONNECTION SETUP INFORMATION B |
| ... | ... | ... | ... |
| COMMUNICATION APPARATUS N | DESTINATION TELEPHONE NUMBER N | CONNECTION ID N | CONNECTION SETUP INFORMATION N |

| COMMUNICATION APPARATUS | CHARACTERISTICS OF COMMUNICATION APPARATUS | |
|---|---|---|
| COMMUNICATION APPARATUS A | TRANSMISSION SPEED A | COMMUNICATION PROTOCOL A |
| COMMUNICATION APPARATUS B | TRANSMISSION SPEED B | COMMUNICATION PROTOCOL B |
| ... | ... | ... |
| COMMUNICATION APPARATUS N | TRANSMISSION SPEED N | COMMUNICATION PROTOCOL N |

| COMMUNICATION APPARATUS | TARIFF INFORMATION | | |
|---|---|---|---|
| | UP TO X HOURS | EVERY Y HOURS BEYOND X HOURS | PER PACKET |
| COMMUNICATION APPARATUS A | CHARGE A1 | CHARGE A2 | CHARGE A3 |
| COMMUNICATION APPARATUS B | CHARGE B1 | CHARGE B2 | CHARGE B3 |
| ... | ... | ... | ... |
| COMMUNICATION APPARATUS N | CHARGE N1 | CHARGE N3 | CHARGE N3 |

| COMMUNICATION APPARATUS | SUPPORTED COMMUNICATION AREA INFORMATION | | | |
|---|---|---|---|---|
| COMMUNICATION APPARATUS A | AREA 1 | AREA 2 | – | – |
| COMMUNICATION APPARATUS B | AREA 1 | AREA 2 | AREA 3 | – |
| ... | ... | ... | ... | ... |
| COMMUNICATION APPARATUS N | AREA 1 | AREA 2 | AREA 4 | AREA 5 |

FIG. 48

INFORMATION TERMINAL APPARATUS

BACKGROUND OF THE INVENTION

1. Field of the Invention

The present invention relates to an information terminal apparatus which is adapted to perform data communications by connecting thereto an external device such as a modem, portable telephone, car telephone, second generation cordless telephone, CDMA (code division multiple access) wireless telephone, or the like.

2. Description of the Related Art

Japanese Unexamined Patent Publication JP-A 8-307554 (1996) discloses a communication control apparatus for automatically judging the connected state of a communication terminal connected thereto and the type of the connected terminal; the apparatus comprises an AC current detection means for detecting an AC current that flows at start up through a local line to which a communication terminal is connected, and a connected device judging procedure for recognizing the attribute of the connected communication terminal based on a called signal to the communication terminal, and thereby eliminates the need for predetermining the communication terminal to be connected to the local line, allowing any desired communication terminal to be connected to each local line.

The above apparatus further includes a display means for displaying the attribute of the communication terminal connected to the local line so that the communication terminal attribute can be presented in a visually viewable form. Further, Japanese Unexamined Patent Publication JP-A 60-203054 (1985) discloses a controlled circuit board mounting verification method in which a central processing unit verifies the connection of a controlled circuit board, wherein a three-level input/output gate is provided which is opened and closed in a controlled manner to control a control signal from the central processing unit and whose output is connected to an external connection terminal, and wherein when a controlled circuit board is not mounted, the output gate is controlled at an high impedance state and, based on the output of the input gate, it is determined whether a controlled circuit board is mounted or not.

On the other hand, Japanese Unexamined Patent Publication JP-A 5-303456 (1993) discloses an information processing apparatus in which provisions are made to judge the presence or absence of a plurality of child boards mounted on a parent board, wherein the child boards are each provided, as part of a voltage dividing resistor, with a resistor whose resistance value varies for each child board, while the parent board is provided with a voltage dividing circuit which is completed when a child board is connected, and an A/D converter for measuring a voltage tapped at a designated position, and the mounting or non-mounting of a child board and the type of the mounted child board are automatically judged based on the voltage flowing when the child board is connected to the parent board.

The system for automatically judging the type of the connected communication terminal according to Japanese Unexamined Patent Publication JP-A 8-307554 requires the provision of an AC current detection circuit for detecting the AC current flowing from the connected communication terminal. This increases the cost.

The system for automatically judging the type of the connected communication terminal according to Japanese Unexamined Patent Publication JP-A 8-307554 is provided with means for visually displaying the attribute of the communication terminal connected to the local line, but is not provided with means for presenting various pieces of information associated with the characteristics of each individual communication terminal, such as transmission speed, communication charge, communication area, and the like, that become necessary when actually performing communications.

Likewise, according to the information processing apparatus disclosed in Japanese Unexamined Patent Publication JP-A 5-303456, the system for automatically judging the mounting of a child board requires the provision of an A/D converter for measuring a tapped voltage which varies for each child board. This increases the cost.

Further, the controlled circuit board mounting verification system according to Japanese Unexamined Patent Publication JP-A 60-203054 is not provided with means for automatically judging the attribute of the connected controlled circuit board, but is only intended to simply verify the connection of the predetermined controlled circuit board.

Furthermore, with any of the above prior art systems, connections with different kinds of communication apparatuses having interfaces of different input/output methods, different signal voltages, etc. cannot be implemented on the same interface, but only devices having the same interface can be accommodated.

SUMMARY OF THE INVENTION

An object of the present invention is to provide an information terminal apparatus at low cost that is capable of performing communications by connecting thereto any one of various kinds of external equipment of different input/output methods, having different signal voltage levels.

Another object of the invention is to provide an information terminal apparatus that is capable of easily making a call to the destination appropriate to the communication apparatus connected as an external device.

A still another object of the invention is to provide an information terminal apparatus that is capable of judging whether a communication apparatus that can achieve communications with the currently connected communication apparatus with better conditions is available or not.

In a first aspect of the invention an information terminal apparatus comprises an interface section for connecting thereto an external device, and a control section for performing signal transfers to and from the external device via the interface section, wherein the interface section includes:

a connector having a terminal for sending and receiving communication control and data signals and a terminal for receiving an attribute signal representing an attribute of the external device;

a judging circuit for judging the attribute of the connected external device based on the received attribute signal; and a switching circuit for, based on the result of the judgement, performing an operation for switching input/output directions of the communication control and data signals to directions appropriate to the connected external device and an operation for optimizing signal level to a level appropriate to the connected external device.

According to the information terminal apparatus of the first aspect, a communication apparatus, such as a modem, portable telephone, car telephone, second generation cordless telephone, CDMA wireless telephone, or like apparatus equipped with communication means, is connected as the external device to the information terminal apparatus equipped with means for processing data from the connected communication apparatus. By constructing the information terminal apparatus as described above, any of different kinds of communication apparatuses having interfaces of different input/output methods and different signal voltages can be connected to the same interface of the information terminal apparatus by automatically switching signals for interfacing with such communication apparatus. By providing a particular attribute notification terminal in the interface section, the input/output method and signal voltage for the interface section of the information terminal apparatus can be switched to those that match the connected communication apparatus.

In a second aspect the information terminal apparatus of the first aspect is characterized in that an overcurrent protection circuit is inserted in an input line used to transfer the communication control and data signals.

According to the information terminal apparatus of the second aspect, an overcurrent can be prevented when the communication apparatus is improperly connected to the information terminal apparatus.

In a third aspect of the invention the information terminal apparatus of the first aspect is characterized in that the judging circuit supplies a voltage appearing at the attribute signal receiving terminal to the control section, and the control section verifies the connection of the external device based on a voltage change on the attribute signal receiving terminal.

According to the information terminal apparatus of the third aspect, the communication apparatus is configured to cause the voltage on the particular notification terminal to change when it is connected to the interface section of the information terminal apparatus. In the information terminal apparatus, upon detecting the voltage change on the particular notification terminal, the judging circuit notifies the control section of the connection of the communication apparatus.

In a fourth aspect of the invention an information terminal apparatus comprises an interface section for connecting thereto an external device, and a control section for performing signal transfers to and from the external device via the interface section, wherein the interface section includes:
  a connector having a terminal for sending and receiving communication control and data signals and a terminal for receiving an attribute signal representing an attribute of the external device;
  a judging circuit for judging the attribute of the connected external device based on the received attribute signal; and
  a switching circuit for performing an operation for switching input/output directions of the communication control and data signals to directions appropriate to the connected external device and an operation for optimizing signal level to a level appropriate to the connected external device, and
  wherein the control section verifies the connection of the external device based on the result of the judgement from the judging circuit, and causes the switching circuit to perform the signal input/output direction switching operation and the signal level optimization operation in accordance with the result of the judgement.

According to the information terminal apparatus of the fourth aspect, when the connection of the communication apparatus to the interface section of the information terminal apparatus is detected by the attribute signal applied to a particular notification terminal, the input/output method and signal voltage for the interface section of the information terminal apparatus are switched not in hardware fashion, but in software fashion. That is, the control section that received the result of the judgement controls the switching circuit in the interface section to switch the input/output method and signal voltage to those that match the connected communication apparatus.

In a fifth aspect of the invention the information terminal apparatus of the fourth invention is characterized in that the control section controls the activation and deactivation of the judging circuit and switching circuit in such a manner that when no external device is connected, only the judging circuit is activated, and when an external device is connected, the judging circuit is deactivated and the switching circuit is activated.

According to the information terminal apparatus of the fifth aspect, when no external device is connected to the interface section of the information terminal apparatus, the judging circuit is in the activated condition, and when a communication apparatus is connected to the interface section of the information terminal apparatus, and the attribute signal is applied to the particular notification terminal, the judging circuit is deactivated, and then the control section activates the switching circuit, thereby preventing unnecessary current from flowing.

In a sixth aspect of the invention the information terminal apparatus of the fourth aspect is characterized in that an overcurrent protection circuit is inserted in an input line used to transfer the communication control and data signals, and in that the control section causes the switching circuit to perform the signal input/output direction switching operation so that when no external device is connected, the communication control and data signals are transferred from the terminal to the control section.

According to the information terminal apparatus of the sixth aspect, when no external device is connected to the interface section of the information terminal apparatus, the entire interface section is placed in an input standby mode, and when a communication apparatus is connected to the interface section of the information terminal apparatus, and the attribute signal is applied to the particular notification terminal, the control section activates the interface section. This serves to prevent the information terminal apparatus from being damaged.

In a seventh aspect of the invention the information terminal apparatus of the first or fourth aspect is characterized in that a hysteresis buffer circuit is included which is connected to the attribute signal receiving terminal.

According to the information terminal apparatus of the seventh aspect, when a communication apparatus is connected to the interface section of the information terminal apparatus, the attribute of the connected communication apparatus can be prevented from being erroneously recognized due to chattering associated with a change occurring on the particular notification terminal.

In an eighth aspect of the invention the information terminal apparatus of the first or fourth aspect is characterized in that the judging circuit judges the attribute of the connected external device based on the presence or absence of the chattering of the attribute signal receiving terminal when the external device is connected.

According to the information terminal apparatus of the eighth aspect, assuming the use of two kinds of communication apparatuses, one provided with a hysteresis buffer circuit for preventing chattering from occurring due to a change on the particular notification terminal when the communication apparatus is connected to the interface section of the information terminal apparatus, and the other not provided with such a hysteresis buffer circuit, the attribute of the connected communication apparatus can be judged by judging whether the chattering due to a change on the particular notification terminal occurs when the communication apparatus is connected by cable.

In a ninth aspect of the invention an information terminal apparatus comprises an interface section for connecting thereto an external device and a control section for performing signal transfers to and from the external device via the interface section, wherein the interface section includes:
a connector having a terminal for sending and receiving communication control and data signals, a terminal for sending an inquiry signal inquiring about the connection of the external device, and a terminal for receiving a response signal in reply to the inquiry;
an analyzing circuit for outputting the inquiry signal and receives the response signal; and
a switching circuit for performing an operation for switching input/output directions of the communication control and data signals to directions appropriate to the connected external device and an operation for optimizing signal level to a level appropriate to the connected external device, and
wherein when verifying the connection of the external device, the control section causes the analyzing circuit to output the inquiry signal and verifies the connection of the external device based on the response signal input to the analyzing circuit, and when the connection of the external device is verified, the control section causes the switching circuit to perform the signal input/output direction switching operation and the signal level optimization operation.

According to the information terminal apparatus of the ninth aspect, a communication apparatus is provided with a circuit for responding to the inquiry from the information terminal apparatus by returning a response unique to the communication apparatus. The inquiry signal output from the information terminal apparatus is processed by the responding circuit in the communication apparatus, and the returned response signal is analyzed by the information terminal apparatus, thereby automatically discriminating between a plurality of communication apparatuses.

In a tenth aspect of the invention an information terminal apparatus comprises an interface section for connecting thereto an external device, and a control section for performing signal transfers to and from the external device via the interface section, wherein the interface section includes:
a connector having a terminal for sending and receiving communication control and data signals, a terminal for sending an inquiry signal inquiring about the connection of the external device, a terminal for receiving a response signal in reply to the inquiry, and a terminal for sending a test signal for connection testing;
an analyzing circuit which outputs the inquiry signal and receives the response signal;
a test circuit which outputs the test signal; and
a switching circuit which performs an operation for switching input/output directions of the communication control and data signals to directions appropriate to the connected external device and an operation for optimizing signal level to a level appropriate to the connected external device, and
wherein when verifying the connection of the external device, the control section causes the test circuit to output the test signal and the analyzing circuit to output the inquiry signal and verifies the connection of the external device based on the response signal input to the analyzing circuit and responsive to the test signal, and when the connection of the external device is verified, the control section causes the switching circuit to perform the signal input/output direction switching operation and the signal level optimization operation.

According to the information terminal apparatus of the tenth aspect, when the test output terminal in the interface section of the information terminal apparatus is held in an active state, a communication apparatus A receives the inquiry signal output from the information terminal apparatus and loops it back unchanged from the responding circuit in the communication apparatus, while a communication apparatus B outputs a fixed response signal from its responding circuit regardless of the inquiry signal received from the information terminal apparatus; the information terminal apparatus discriminates between the communication apparatus A and communication apparatus B by examining the contents of the transmitted inquiry signal and the received response signal.

In an eleventh aspect of the invention an information terminal apparatus comprises an interface section for connecting thereto an external device, and a control section for performing signal transfers to and from the external device via the interface section, wherein the interface section includes:
a connector having a terminal for sending and receiving communication control and data signals, a terminal for receiving an attribute signal representing an attribute of the external device, a terminal for sending a test signal for connection testing, and a terminal for receiving a test result signal;
a judging circuit for judging the attribute of the connected external device based on the received attribute signal;
a test circuit for outputting the test signal and receiving the test result signal; and
a switching circuit for performing an operation for switching input/output directions of the communication control and data signals to directions appropriate to the connected external device and an operation for optimizing signal level to a level appropriate to the connected external device, and
wherein the control section verifies the connection of the external device based on the result of the judgement from the judging circuit, and when the connection of the external device is verified, the control section causes the test circuit to output the test signal and verifies the attribute of the external device based on the test result signal returned in response to and appropriate to the test signal, and causes the switching circuit to perform the signal input/output direction switching operation and the signal level optimization operation.

According to the information terminal apparatus of the eleventh aspect, the communication apparatus A is provided with a responding circuit which momentarily causes a response terminal to change when an inquiry terminal in the interface section of the information terminal apparatus changes from high to low. The information terminal apparatus distinguishes the communication apparatus A from other communication apparatus by monitoring the number of occurrences of an interrupt notification caused by the change of the response terminal when the inquiry terminal is activated.

In a twelfth aspect of the invention the information terminal apparatus of the eleventh aspect is characterized in that the terminals on the connector are pin-type terminals, and the test result signal receiving terminal is shorter than the attribute signal receiving terminal, and the control section verifies the attribute of the connected external device based on the length of time between the time the connection of the test result signal receiving terminal is detected and the time the connection of the attribute signal receiving terminal is detected.

According to the information terminal apparatus of the twelfth aspect, the length of the particular notification terminal pin is varied for each communication apparatus, and the attribute of the connected communication apparatus is judged based on the time difference between the detection of another terminal and the detection of the particular notification terminal when connecting the communication apparatus to the interface section of the information terminal apparatus.

In a thirteenth aspect of the invention the information terminal apparatus of the eleventh aspect is characterized in that the terminals on the connector have a plurality of contact faces, and the control section verifies the attribute of the connected external device based on the number of contact faces on the terminals.

According to the information terminal apparatus of the thirteenth invention, the number of contact faces on a particular notification terminal is varied for each communication apparatus, and the attribute of the connected communication apparatus is judged based on the number of occurrences of a change on the particular notification terminal when connecting the communication apparatus to the interface section of the information terminal apparatus.

In a fourteenth aspect of the invention the information terminal apparatus of the first or fourth aspect is characterized in that the judging circuit judges the attribute of the connected external device to determine whether the external device is in a power ON state or in a power OFF or unknown power state.

According to the information terminal apparatus of the fourteenth aspect, to automatically discriminate between the communication apparatus A having a signal line control function and the communication apparatus B not having a signal line control function, the control section of the information terminal apparatus first checks the presence or absence of the signal line control function when a communication apparatus is connected to the interface section of the information terminal apparatus, and thereby determines one of two states, a state in which the communication apparatus A in a power ON state is connected or a state in which the communication apparatus A in a power OFF state or the communication apparatus B in an unknown power state is connected.

In a fifteenth aspect of the invention the information terminal apparatus of the fourteenth aspect is characterized in that, when the connected external device is judged by the judging circuit to be in the power OFF or unknown power state, if there occurs a change in terminal potential, the judging circuit then determines that the connected external device has changed to the power ON state.

According to the information terminal apparatus of the fifteenth aspect, when the communication apparatus connected to the interface section of the information terminal apparatus is judged to be either the communication apparatus A in the power OFF state or the communication apparatus B in an unknown power state, if the connected communication apparatus is the communication apparatus A, a change will occur on the response terminal when the communication apparatus A changes from the power OFF to the power ON state; therefore, by detecting this change, it is determined that the communication apparatus in the power ON state is connected.

In a sixteenth aspect of the invention the information terminal apparatus of the fourteenth aspect is characterized in that, when a communication start request signal is output from the control section, the judging circuit performs the operation of judging the attribute of the connected external device.

According to the information terminal apparatus of the sixteenth aspect, when a communication apparatus is connected to the interface section of the information terminal apparatus, automatic detection of the connected communication apparatus using the signal line control function is not performed until after the communication start request is issued from the control section, in order to avoid consuming unnecessary power; when the communication start request is issued, the communication apparatus A having the signal line control function is preferentially tried to start communication with speed A, thereby judging the attribute of the connected communication apparatus and accomplishing the communication initiation procedure.

In a seventeenth aspect of the invention the information terminal apparatus of the fourteenth aspect is characterized in that, when the connected external device is judged by the judging circuit to be in the power OFF or unknown power state, the control section performs a communication operation procedure for each different type of communication apparatus, and if the communication operation procedure succeeds, the judging circuit determines that the connected external device has changed to the power ON state.

According to the information terminal apparatus of the seventeenth aspect, the inquiry terminal and response terminal in the interface section are made common to the communication apparatus A of speed A, the communication apparatus B of speed B, and a plurality of other communication apparatuses N of different speeds N, and when a communication apparatus is connected to the interface section, the transmission speed of the inquiry terminal and response terminal in the interface section of the information terminal apparatus is set to speed A, speed B, and speed N in sequence, thereby sequentially trying the communication operation procedure with different speeds for the communication apparatus and thus identifying the connected communication apparatus.

In an eighteenth aspect of the invention the information terminal apparatus of the first or fourth aspect is characterized in that the external device is a communication apparatus, and when a call arrives at the connected communication apparatus, the judging circuit judges the attribute of the connected communication apparatus based on a terminal potential change or an input signal pattern.

According to the information terminal apparatus of the eighteenth aspect, to automatically discriminate between the communication apparatus A of speed A equipped with a signal line control function whereby the terminal potential changes at the time of a call arrival and the communication apparatus B of speed B not equipped with a signal line control function but configured to send an input signal of a particular pattern at the time of a call arrival, there is provided a means for notifying the control section upon detecting, at the time of a call arrival, the terminal potential change or the input signal appearing at the response terminal set up with speed B, whereupon the control section of the information terminal apparatus judges the attribute of the called communication apparatus by checking the terminal potential change or the pattern of the input signal at the response terminal.

In a nineteenth aspect of the invention the information terminal apparatus of the eighteenth aspect is characterized in that the judging circuit judges the attribute of the connected communication apparatus based on the terminal potential change or the input signal at a predetermined terminal.

According to the information terminal apparatus of the nineteenth aspect, with the provision of the means for notifying the control section, at the time of a call arrival, of the occurrence of a terminal potential change or the existence of an input signal of a particular pattern on the response terminal set up with speed B, the control section of the information terminal apparatus judges the attribute of the called communication apparatus without having to check the pattern of the input signal at the response terminal.

In a twentieth aspect of the invention the information terminal apparatus of the eighteenth aspect is characterized in that the judging circuit judges the attribute of the connected communication apparatus based on whether or not the input signal pattern matches a preset signal pattern.

According to the information terminal apparatus of the twentieth invention, with the provision of the means for notifying the control section, at the time of a call arrival, of the occurrence of a terminal potential change or the existence of an input signal of a particular pattern on the response terminal set up with speed B, and with provisions made to make the particular input signal pattern settable in hardware, the control section of the information terminal apparatus judges the attribute of the called communication apparatus without having to check the pattern of the input signal at the response terminal.

In a twenty-first aspect of the invention an information terminal apparatus comprises an interface section for connecting thereto a communication apparatus and a control section for performing signal transfers to and from the communication apparatus via the interface section, wherein the interface section includes:
a judging circuit for judging the attribute of the connected communication apparatus; and
a switching circuit for, based on the result of the judgement, performing an operation for switching input/output directions of the communication control and data signals to directions appropriate to the connected communication apparatus and an operation for optimizing signal level to a level appropriate to the connected communication apparatus, and
wherein when a communication application is started after the communication apparatus is connected, the control section executes a call origination procedure by retrieving connection destination information associated with the connected communication apparatus from a table in which connection destination information is prestored for each individual communication apparatus, According to the information terminal apparatus of the twenty-first aspect, with the interface having a particular notification terminal capable of communicating with communication apparatus of various kinds having interfaces of different input/output methods and different signal voltages, such as a modem, portable telephone, car telephone, second generation cordless telephone, and CDMA wireless telephone, and with the provision of means for automatically detecting the connected state of the communication apparatus and the attribute of the connected communication apparatus and thereby automatically switching the input/output method and signal voltage for the interface section to those that match the connected communication apparatus, any of the different kinds of communication apparatuses can be connected to the information terminal apparatus by automatically switching signals for interfacing with such communication apparatus; when a communication application is started, the information terminal apparatus retrieves connection destination information, such as destination telephone number, for the currently connected communication apparatus from the connection destination information table stored in a storage section for each individual communication apparatus, and automatically initiates a call and performs communication using a communication procedure appropriate to the connected communication apparatus.

In a twenty-second aspect of the invention the information terminal apparatus of the apparatus aspect is characterized in that the control section retrieves the connection destination information associated with the communication apparatus based on the result of the judgement.

According to the information terminal apparatus of the twenty-second aspect, when a communication apparatus is connected to the interface section of the information terminal apparatus placed in an activated state, the information terminal apparatus notifies the control section upon detecting the connection of the communication apparatus, and the control section performs call origination and communication setup procedures by retrieving from the storage section the connection destination information appropriate to the automatically recognized attribute of the connected communication apparatus.

In a twenty-third aspect of the invention the information terminal apparatus of the apparatus aspect is characterized in that, when no communication apparatus is connected, the control section activates only the judging circuit, and when a communication apparatus is connected, the judging circuit supplies the result of the judgement to the control section which then activates the entire information terminal apparatus.

According to the information terminal apparatus of the twenty-third aspect, when a communication apparatus is connected to the interface section of the information terminal apparatus placed in an inactive state, upon detecting the connection of the communication apparatus the information terminal apparatus is automatically switched to an active state, and the control section is notified accordingly, whereupon the control section proceeds to perform call origination and communication setup procedures by retrieving from the storage section the connection destination information appropriate to the automatically recognized attribute of the connected communication apparatus.

In a twenty-fourth aspect of the invention the information terminal apparatus of the twenty-first aspect is characterized in that, when the communication application is started after the communication apparatus is connected, the control section judges whether any other communication apparatus is available that can accomplish communication in a shorter time than the currently connected communication apparatus, and that the information terminal apparatus includes a reporting means for visually or audibly reporting the result of the judgement made by the control section.

According to the information terminal apparatus of the twenty-fourth aspect, when the communication application is started, the information terminal apparatus analyzes the communication time required to complete the communication based on the transmission speeds of all available communication apparatuses and using information such as the communication procedure to be used and the amount of data predicted to be transmitted and received during the communication, detects some other communication apparatus that can accomplish the communication in a shorter time than the currently connected communication apparatus, and visually presents a notification recommending the use of such other communication apparatus by lighting an LED or producing a screen display. Alternatively, when the communication application is started, the information terminal apparatus analyzes the communication time required to complete the communication based on the transmission speeds of all available communication apparatuses and using information such as the communication procedure to be used and the amount of data predicted to be transmitted and received during the time from the start to the end of the communication, detects some other communication apparatus that can accomplish the communication in a shorter time than the currently connected communication apparatus, and audibly presents a notification recommending the use of such other communication apparatus by using a buzzer, synthesized voice, etc.

In a twenty-fifth aspect of the invention the information terminal apparatus of the twenty-first aspect is characterized in that, when the communication application is started after the communication apparatus is connected, the control section judges whether any other communication apparatus is available that can accomplish communication with a lower communication charge than the currently connected communication apparatus, and that the information terminal apparatus includes a reporting means for visually or audibly reporting the result of the judgement made by the control section.

According to the information terminal apparatus of the twenty-fifth aspect, when the communication application is started, the information terminal apparatus calculates the communication charge for the communication based on the transmission speeds of all available communication apparatuses and the communication tariff information stored in the storage section for the communication apparatuses and on information such as the communication procedure to be used and the amount of data and the number of packets predicted to be transmitted and received during the time from the start to the end of the communication, detects some other communication apparatus that can accomplish the communication with a lower communication charge than the currently connected communication apparatus, and visually presents a notification recommending the use of such other communication apparatus by lighting an LED or producing a screen display. Alternatively, when the communication application is started, the information terminal apparatus calculates the communication charge for the communication based on the transmission speeds of all available communication apparatuses and the communication tariff information stored in the storage section for the communication apparatuses and on information such as the communication procedure to be used and the amount of data and the number of packets predicted to be transmitted and received during the time from the start to the end of the communication, detects some other communication apparatus that can accomplish the communication with a lower communication charge than the currently connected communication apparatus, and audibly presents a notification recommending the use of such other communication apparatus by using a buzzer, synthesized voice, etc.

In a twenty-sixth aspect of the invention the information terminal apparatus of the twenty-first aspect is characterized in that, when the communication application is started after the communication apparatus is connected, the control section judges whether any other communication apparatus is available that can perform communication with a higher signal level than the signal level on a communication line of the currently connected communication apparatus, and that the information terminal apparatus includes a reporting means for visually or audibly reporting the result of the judgement made by the control section.

According to the information terminal apparatus of the twenty-sixth aspect, when the communication application is started, the information terminal apparatus detects communication line conditions such as radio wave conditions for the currently connected communication apparatus and, when it is determined that the communication line conditions have worsened, detects some other communication apparatus having a wider communication area from the communication area information stored in the storage section for all communication apparatuses, and visually presents a notification recommending the use of such other communication apparatus by lighting an LED or producing a screen display. Alternatively, when the communication application is started, the information terminal apparatus detects communication line conditions such as radio wave conditions for the currently connected communication apparatus and, when it is determined that the communication line conditions have worsened, detects some other communication apparatus having a wider communication area from the communication area information stored in the storage section for all communication apparatuses, and audibly presents a notification recommending the use of such other communication apparatus by using a buzzer, synthesized voice, etc.

In a twenty-seventh aspect of the invention the information terminal apparatus of the twenty-first aspect is characterized in that the control section suspends communication when the communication becomes impossible, and resumes the communication when the communication becomes possible, and while the communication is being suspended, the control section judges whether any other communication apparatus is available that has a wider communication area than the communication area of the currently connected communication apparatus, and that the information terminal apparatus includes a reporting means for visually or audibly reporting the result of the judgement-made by the control section.

According to the information terminal apparatus of the twenty-seventh aspect, the information terminal apparatus detects communication line conditions such as radio wave conditions for the communication apparatus currently performing the communication and, when it is determined that the communication apparatus is put in a communication cutoff state in the middle of data communication, temporarily suspends the ongoing communication, saves the communication data state in the storage section, detects some other communication apparatus having a wider communication area from the communication area information stored in the storage section for all communication apparatuses, and visually presents a notification recommending the use of such other communication apparatus by lighting an LED or producing a screen display. Then, when the connection of new communication apparatus is detected, the call origination and communication setup procedures are again performed automatically and the communication is resumed from the point at which it was temporarily suspended. Alternatively, the information terminal apparatus detects communication line conditions such as radio wave conditions for the communication apparatus currently performing the communication and, when it is determined that the communication apparatus is put in a communication cutoff state in the middle of data communication, temporarily suspends the ongoing communication, saves the communication data state in the storage section, detects some other communication apparatus having a wider communication area from the communication area information stored in the storage section for all communication apparatuses, and audibly presents a notification recommending the use of such other communication apparatus by using a buzzer, synthesized voice, etc. Then, when the connection of a new communication apparatus is detected, the call origination and communication setup procedures are again performed automatically and the communication is resumed from the point at which it was temporarily suspended.

In a twenty-eighth aspect of the invention the information terminal apparatus of the twenty-first aspect is characterized in that, when the communication apparatus is disconnected from the information terminal apparatus during communication, the control section suspends the communication, and resumes the communication upon detecting the connection of the communication apparatus being restored.

According to the information terminal apparatus of the twenty-eighth aspect, when it is detected that the communication apparatus is disconnected from the information terminal apparatus in the middle of data communication, the ongoing communication is temporarily suspended and the communication data state is saved in the storage section. Then, when the connection of the new communication apparatus is detected, call origination and communication setup procedures appropriate to the connected communication apparatus are automatically performed to resume the communication from the point at which it was temporarily suspended.

According to the first to sixth and the ninth to seventeenth aspects, to enable a communication apparatus, such as a modem, portable telephone, car telephone, second generation cordless telephone, CDMA wireless telephone or like apparatus equipped with communication means, to be connected to the information terminal apparatus equipped with means for processing data from the connected communication apparatus, the communication apparatus is provided with means for sending a connection notification and an attribute of the communication apparatus, and the information terminal apparatus is provided with means for judging the attribute of the connected communication apparatus by analyzing the connection notification and attribute information sent from the communication apparatus when the communication apparatus is connected to the information terminal apparatus, and for automatically switching between an input buffer and an output buffer for transfer of control signals and data to and from the communication apparatus. This configuration provides the effect of being able to connect different kinds of communication apparatuses having interfaces of different input/output methods and different signal voltages to the same interface of the information terminal apparatus.

There is the further effect of being able to construct circuitry only from relatively inexpensive devices such as passive devices and gate-level active devices, achieving cost reductions in the information terminal apparatus and communication apparatus.

Furthermore, the provision of the overcurrent protection circuit serves to prevent an overcurrent from flowing into the information terminal apparatus if the information terminal apparatus erroneously judges the attribute of the communication apparatus and erroneously switches the interface in the event of a failure of the attribute notification circuit in the communication apparatus.

According to the seventh and eighth aspects, since the judging circuit used to judge the attribute of the communication apparatus is provided with a hysteresis characteristic, chattering is eliminated, enhancing the accuracy in the judgement of the communication apparatus attribute.

Furthermore, the attribute notifying circuit in the communication apparatus is provided with a hysteresis characteristic, the communication apparatus is provided with a means for processing an inquiry signal sent from the information terminal apparatus into a pattern unique to the communication apparatus and for sending it as a response signal to the information terminal apparatus, the length of a notification terminal pin and the length of other terminal pins on the communication apparatus are varied for each communication apparatus, or the number of contact faces on the notification terminal on the communication apparatus is varied for each communication terminal. With these arrangements, an increased variety of communication apparatuses can be automatically recognized.

According to the eighteenth to twentieth aspects, since the information terminal apparatus is provided with functions for judging the signal line control function of a communication apparatus and the transmission speed of the communication apparatus and for implementing a communication-apparatus initialization procedure and various communication-protocol control procedures such as call origination procedures and call termination procedures, an increased variety of communication apparatuses can be automatically recognized by utilizing characteristics different between different kinds of communication apparatuses, such as the presence or absence of the signal line control function, different transmission speeds, and different communication protocols.

According to the twenty-first to twenty-third and the twenty-eighth inventions, to enable a communication apparatus, such as a modem, portable telephone, car telephone, second generation cordless telephone, CDMA wireless telephone or like apparatus equipped with communication means, to be connected to the information terminal apparatus equipped with means for processing data from the connected communication apparatus, the communication apparatus is provided with means for sending a connection notification and an attribute of the communication apparatus, and the information terminal apparatus is provided with means for judging the attribute of the connected communication apparatus by analyzing the connection notification and attribute information sent from the communication apparatus when the communication apparatus is connected to the information terminal apparatus, and for automatically switching between an input buffer and an output buffer for transfer of control signals and data to and from the communication apparatus. This configuration provides the effect of being able to connect different kinds of communication apparatuses having interfaces of different input/output methods and different signal voltages to the same interface of the information terminal apparatus.

Further, the provision of the means for automatically judging the attribute of the communication apparatus and the means for storing connection destination information for each communication apparatus offers the effect of being able to automatically accomplish call origination and communication setup to a destination appropriate to the communication apparatus.

Moreover, since the information terminal apparatus is provided with means for activating only the circuit for monitoring a connection notification from the communication apparatus when the information terminal apparatus is in an inactive state such as a sleep mode, and for switching the information terminal apparatus to the active state when the communication apparatus is connected, there is offered the effect of being able to automatically initiate the process from the activation of the information terminal apparatus to the completion of the communication by just connecting the communication apparatus.

According to the twenty-fourth, twenty-sixth, and twenty-seventh aspects, with the provision of means for analyzing the communication time required to complete the communication based on the transmission speeds of all available communication apparatuses and on information such as the communication procedure to be used and the amount of data predicted to be transmitted and received during the time from the start to the end of the communication, there is offered the effect of being able to indicate an optimum communication apparatus, other than the currently connected communication apparatus, using a display device or an audio output device; furthermore, not only can the currently connected communication apparatus be disconnected during data communication and be replaced with another communication apparatus, but the communication can also be initiated using a desired communication apparatus without having to make new settings at all.

According to the twenty-fifth aspects, with the provision of means for analyzing the communication charge for the communication based on the transmission speeds of all available communication apparatuses and communication tariff information and on information such as the communication procedure to be used and the amount of data and the number of packets predicted to be transmitted and received during the time from the start to the end of the communication, there is offered the effect of being able to indicate an optimum communication apparatus, other than the currently connected communication apparatus, using a display device or an audio output device; furthermore, not only can the currently connected communication apparatus be disconnected during data communication and be replaced with another communication apparatus, but the communication can also be initiated using a desired communication apparatus without having to make new settings at all.

The further effect is that when communication environmental conditions such as radio wave conditions for the currently connected communication apparatus have worsened, other communication apparatus having a wider communication area can be indicated using a display device or an audio output device.

BRIEF DESCRIPTION OF THE DRAWINGS

Other and further objects, features, and advantages of the invention will be more explicit from the following detailed description taken with reference to the drawings wherein:

FIG. 45 is a diagram showing an example of a connection destination information table 10a stored in a storage section 10.

FIG. 46 is a diagram showing an example of a characteristic information table 10b for a communication apparatus 30, stored in the storage section 10.

FIG. 47 is a diagram showing an example of a tariff information table 10c stored in the storage section 10.

FIG. 48 is a diagram showing an example of a communication area information table 10d stored in the storage section 10.

DETAILED DESCRIPTION OF THE PREFERRED EMBODIMENTS

Figure 1:
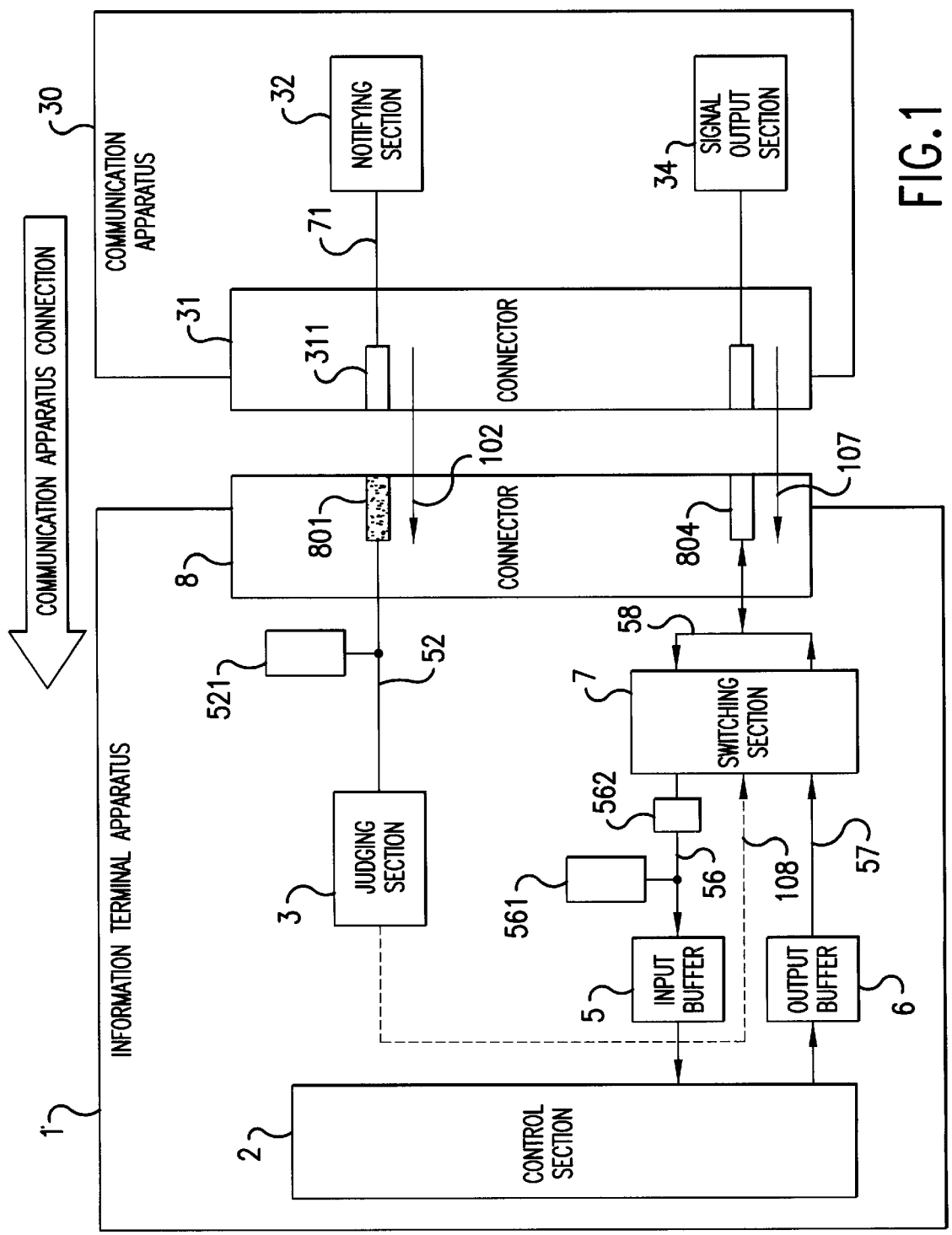
FIG. 1 is a block diagram showing the configuration for implementing an automatic signal switching operation according to a first embodiment of the present invention.

Now referring to the drawings, preferred embodiments of the invention are described below.

Embodiment 1

As shown in FIG. 1, an information terminal apparatus 1 comprises: a control section 2 for controlling an interface connecting between the information terminal apparatus 1 and communication apparatus 30; a judging section 3 for automatically judging an attribute of the connected communication apparatus 30; a signal line 52 for receiving a connection notification 102 from the communication apparatus 30; a switching section 7 for automatically switching between an input buffer 5 and an output buffer 6 in response to a switching control 108 from the judging section 3; a signal line 58 for transferring input/output signals 107, such as control signals and data, between the communication apparatus 30 and the switching section 7; a signal line 56 for transferring control signals and data from the switching section 7 to the control section 2 via the input buffer 5; a signal line 57 for transferring control signals and data from the control section 2 to the switching section 7 via the output buffer 6 of an open collector type; a connector 8 accommodating terminals for connecting the signal lines to the communication apparatus 30; and pull up resistors 521 and 561 for providing a high level state when nothing is connected to the respective input sections and for providing an input signal of a prescribed level to an output section of the communication apparatus 30 when in a connected condition.

The communication apparatus 30 comprises: a notifying section 32 for sending the attribute and the connected state of the communication apparatus 30 when connected to the information terminal apparatus 1; a signal line 71 for sending the connection notification 102 from the notifying section 32 to the information terminal apparatus 1; and a signal output section 34 and a signal input section (not shown) for transferring input/output signals 107, such as control signals and data, to and from the information terminal apparatus 1. When the communication apparatus 30 is not connected to the information terminal apparatus 1, the connection notification 102 is not yet sent to the judging section 3, and the signal line 52 connected to the judging section 3 continually provides a high level state by the action of the pull up resistor 521. Further, since the polarity of signal input/output lines on the communication apparatus 30 is unknown, the judging section 3 controls the switching section 7 by the switching control 108 so that the signal line 57 connected to the open collector type output buffer 6 is connected to the signal line 58 connected to a terminal 804 on the connector 8.

When the communication apparatus 30 is connected to the information terminal apparatus 1, the connection notification 102 from the notifying section 32 arrives at the judging section 3 at the instant that a terminal 801 on the connector 8 is connected to a terminal 311 on a connector 31, and the judging section 3 thus judges the connected state and the attribute of the communication apparatus 30. By configuring the notifying section 32 to generate a pattern unique to the type of the communication apparatus, the judging section 3 can judge the type of the connected communication apparatus as well as the connected state of the communication apparatus.

Figure 2:
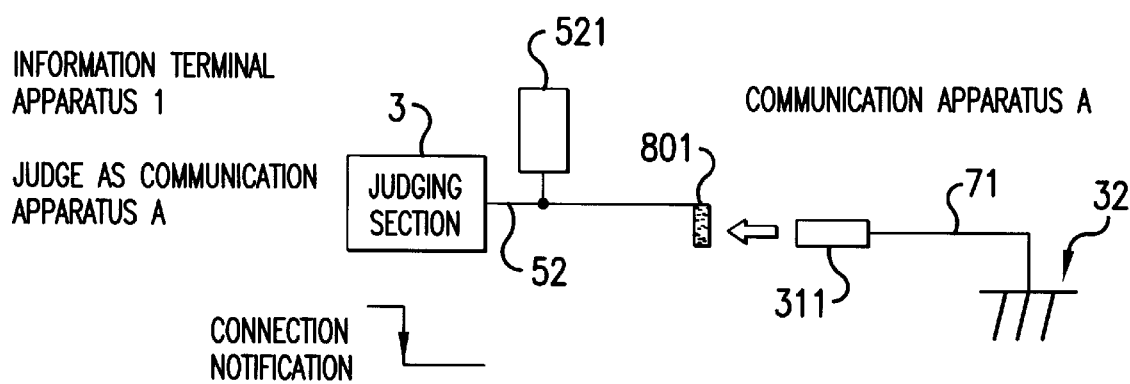
FIG. 2 is a diagram showing the configuration of a judging section 3 and notifying section 32 for implementing the automatic signal switching operation according to the first embodiment of the invention.
Figure 3:
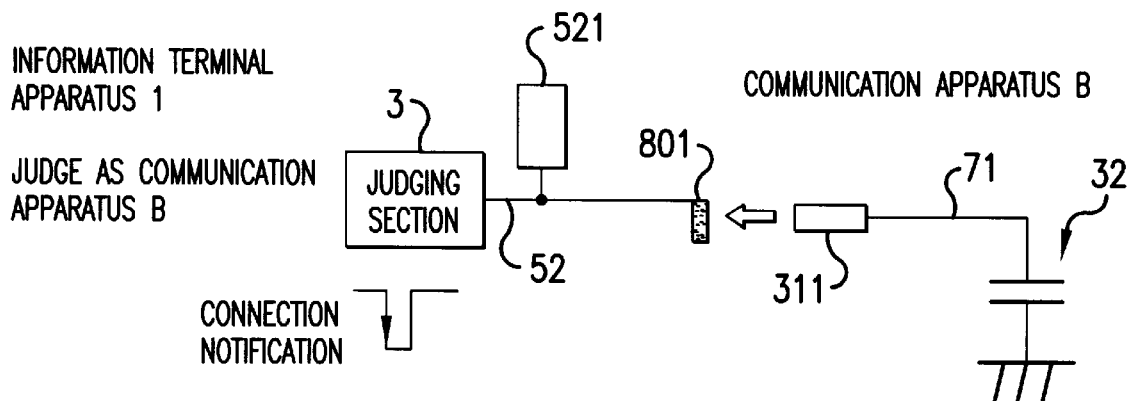
FIG. 3 is a diagram showing the configuration of the judging section 3 and notifying section 32 for implementing the automatic signal switching operation according to the first embodiment of the invention.

FIGS. 2 and 3 show configuration examples of the judging section 3 and notifying section 32. FIG. 2 shows an example in which when a communication apparatus A is connected to the information terminal apparatus 1, the judging section 3 judges the state of the signal line 52 after the connection notification 102 as being low. FIG. 3 shows an example in which when a communication apparatus B is connected to the information terminal apparatus 1, the judging section 3 judges the state of the signal line 52 after the connection notification 102 as being high.

Figure 4:
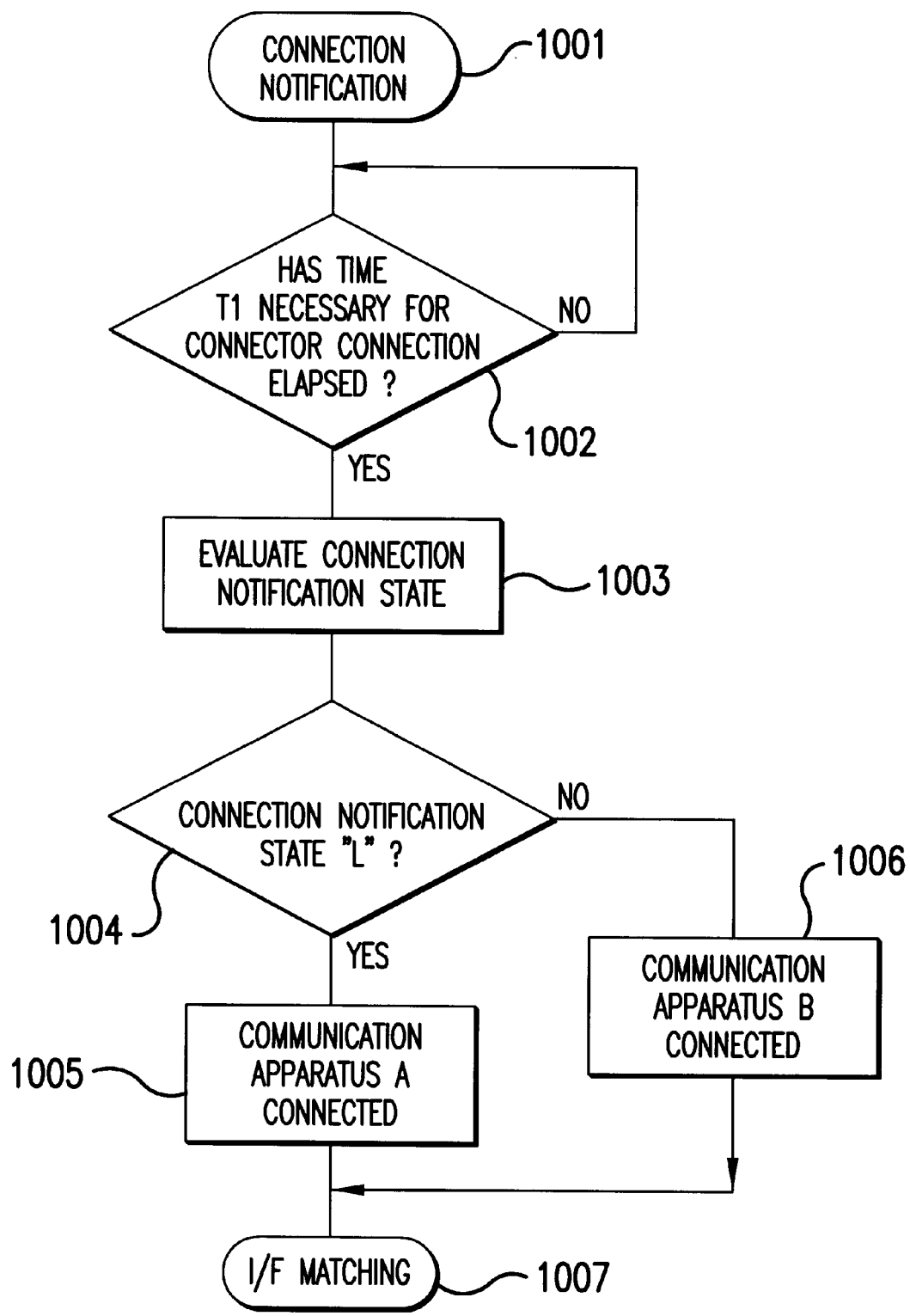
FIG. 4 is a flow chart illustrating the automatic signal switching operation according to the first embodiment of the invention.

FIG. 4 shows a flow chart for judging the attribute of the connected communication apparatus. The judging process is carried out by evaluating the state of the connection notification after waiting for time T1 necessary for connector connection from the time the connection notification is made to the time the connection is completed. When the communication apparatus is connected to the information terminal apparatus 1, the connection notification arrives whereupon the processing sequence is started (1001). When the judging process is started, first a decision is made as to whether the time T1 required to complete the connector connection has elapsed or not (1002). When the time T1 has elapsed, the process exits the loop and proceeds to the next step of evaluating the state of the connection notification (1003), which is followed by the step of judging the result of the evaluation (1004).

In the example of FIG. 2, since the state of the connection notification after the time T1 is low, in the next step (1005) it is determined that the communication apparatus A has been connected (1007). In the example of FIG. 3, on the other hand, since the state of the connection notification after the time T1 is high, the result of the evaluation is judged (1004) and it is determined in the next step (1006) that the communication apparatus B has been connected, and thereafter I/F matching is performed (1007).

Figure 5:
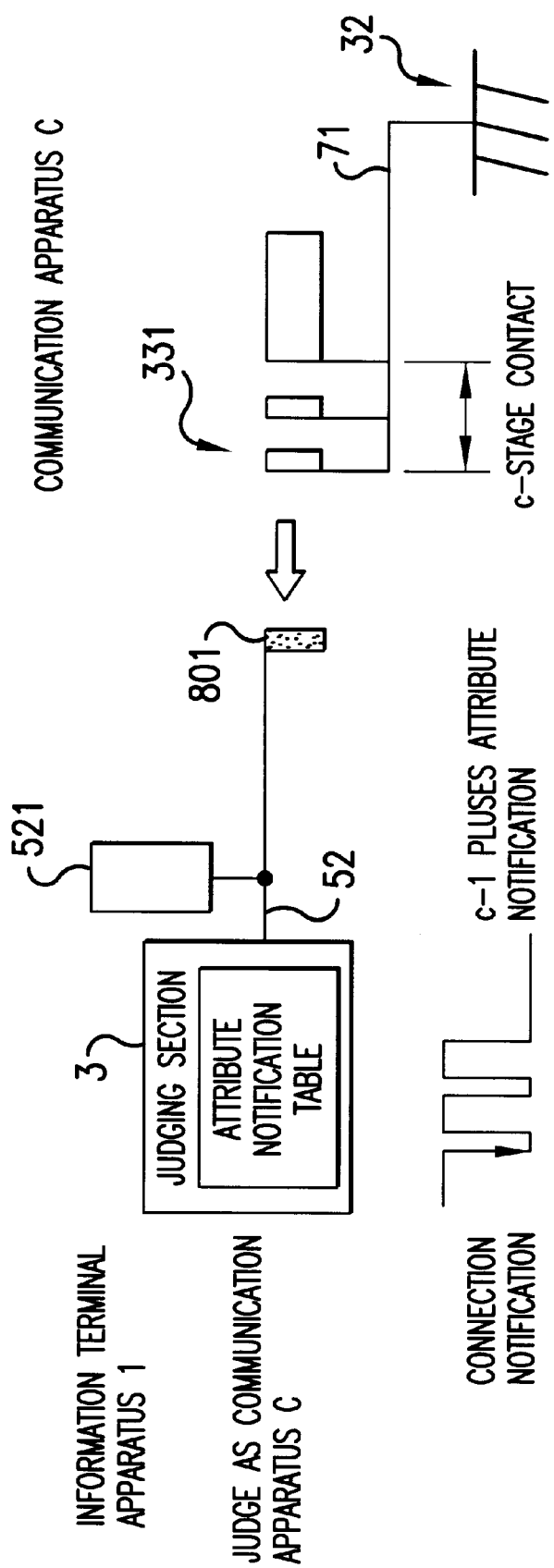
FIG. 5 is a diagram showing the configuration of the judging section 3 and notifying section 32 for implementing the automatic signal switching operation according to the first embodiment of the invention.
Figure 6:
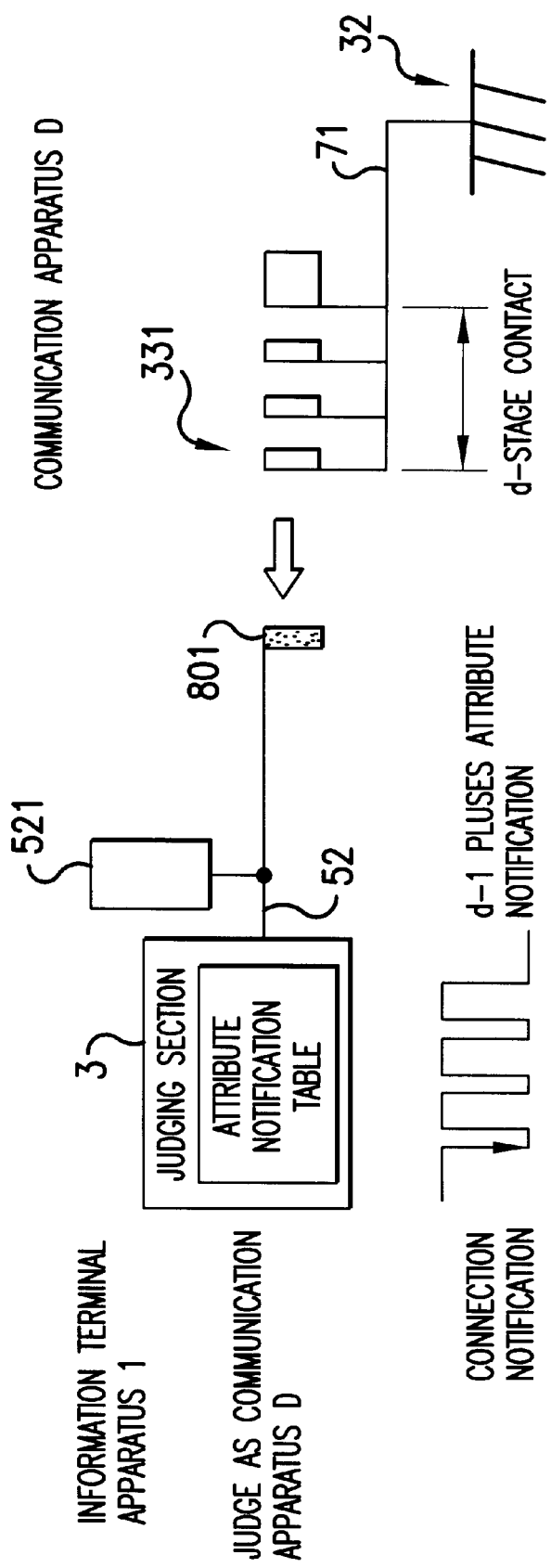
FIG. 6 is a diagram showing the configuration of the judging section 3 and notifying section 32 for implementing the automatic signal switching operation according to the first embodiment of the invention.

FIGS. 5 and 6 show an alternative configuration in which the judging section 3 has an attribute notification table for judging the attribute of the connected communication apparatus based on the number of pulses generated at the time of the connection notification; in this configuration, the contact on the notifying section 32 that generates the connection notification is formed with a different number of stages for different communication apparatus so that the attribute of the connected communication apparatus can be judged based on the number of pulses generated at the time of the connection notification.

FIG. 5 concerns an example in which when a communication apparatus C is connected to the information terminal apparatus 1, the judging section 3 detects c-1 clock-like pulses that follow the connection notification. FIG. 6 concerns an example in which when a communication apparatus D is connected to the information terminal apparatus 1, the judging section 3 detects d-1 clock-like pulses that follow the connection notification.

Figure 7:
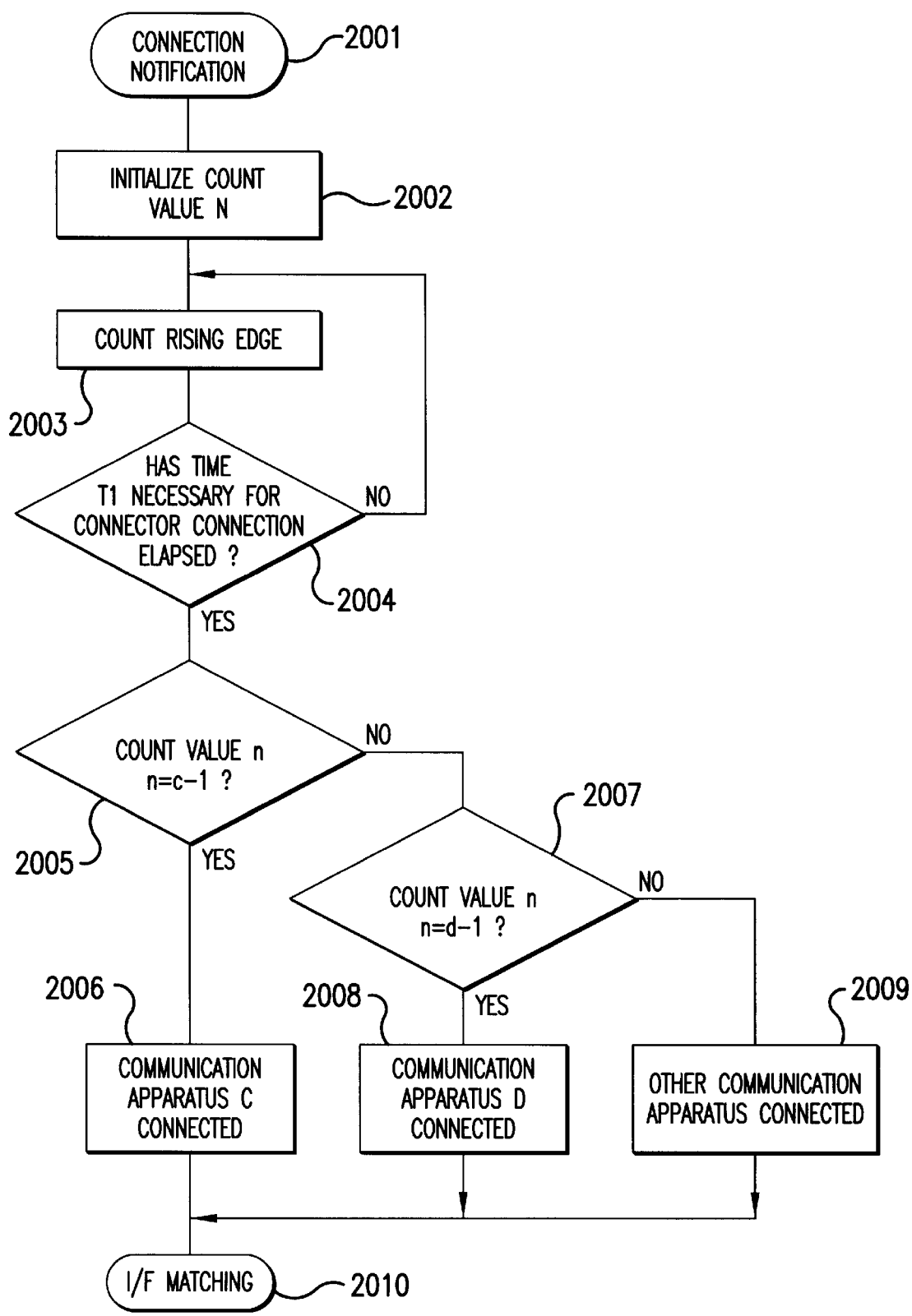
FIG. 7 is a flow chart illustrating the automatic signal switching operation according to the first embodiment of the invention.

FIG. 7 shows a flow chart for judging the attribute of the connected communication apparatus. The judging process is carried out by making use of a count value which indicates the number of pulses generated during the time T1 necessary for connector connection from the time the connection notification is made to the time the connection is completed. When the communication apparatus is connected to the information terminal apparatus 1, the connection notification arrives, whereupon the processing sequence is started (2001). First, the count value n is initialized (2002). When the judging process is started, the step of incrementing the count by the rising edge of each pulse is carried out (2003). This step is carried out repeatedly during the time T1, with the process looping back from the next step of judging the elapsed time (2004). When the time T1 has elapsed, the process exits the loop and proceeds to the next step (2005) where the count value at the end of the time T1 is evaluated. In the example of FIG. 5, since the judging section 3 detects c-1 pulse rise edges that follow the connection notification, the count value n shows c-1; therefore, it is determined in the next step that the communication apparatus C has been connected (2006) and I/F matching based on the determination is performed (2010). In the example of FIG. 6, on the other hand, since the judging section 3 counts d-1 pulse rise edges that follow the connection notification, in the evaluation step (2005) n is not c-1, so that the process proceeds to the next evaluation step (2007) where the count value n is d-1; then, the process proceeds to the next step to determine that the communication apparatus D has been connected (2008) and I/F matching is performed (2010). In either example, I/F matching can be achieved by judging an arbitrary kind of attribute based on the number of terminal stages that generate the connection notification indicating the connection of the communication apparatus.

In FIG. 1, matching to the characteristics of the input/output sections of the communication apparatus 30 is done by judging the attribute of the communication apparatus 30; to achieve this, the judging section 3 sends the switching control 108 to the switching section 7 so that control signals and data can be transferred between the information terminal apparatus 1 and the communication apparatus 30.

In FIG. 1, the circuit block for transferring the control signals and data between the information terminal apparatus 1 and the communication apparatus 30 is shown as having only one control path, but by providing a plurality of switching controls, an interface for transferring control signals and data using multiple paths can be achieved.

Embodiment 2

Figure 8:
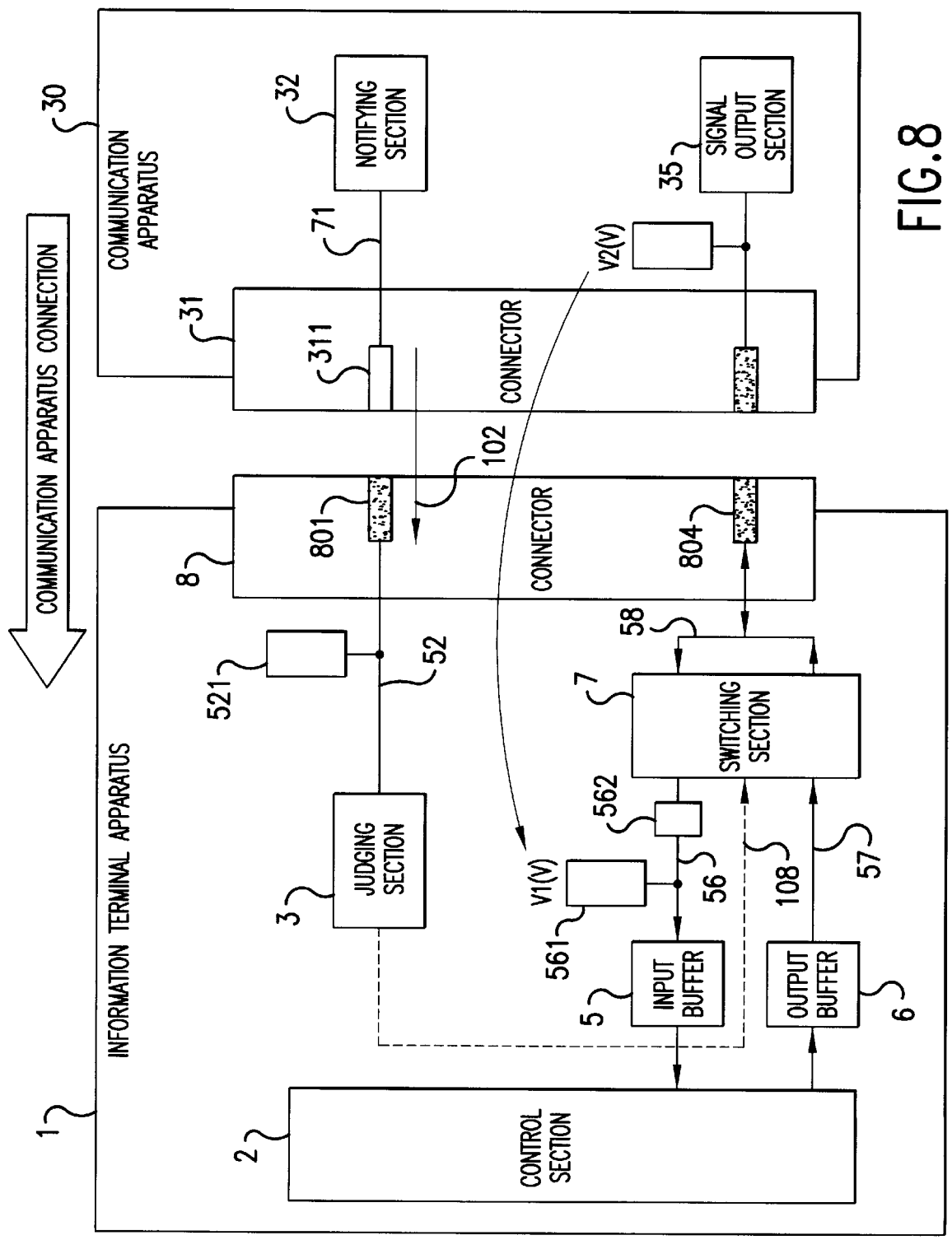
FIG. 8 is a block diagram showing the configuration for implementing an automatic signal switching operation according to a second embodiment of the invention.

The configuration shown in FIG. 8 is the same as that of the first embodiment, except that an overcurrent protection 562 is inserted in the signal line 56 leading to the input buffer in the information terminal apparatus 1 in order to prevent an overcurrent from flowing due to a potential difference between V1 and V2 in case the attribute of the communication apparatus 30 is erroneously judged at the time of the connection of the communication apparatus 30 with the information terminal apparatus 1, accidentally performing such switching control 108 that the signal input/output line 58, which leads to the terminal 804 on the information terminal apparatus 1 connected to the signal input section 35 pulled up by V2 (V) in the communication apparatus 30, is connected to the signal line 56 pulled up by V1 (V)

Embodiment 3

Figure 9:
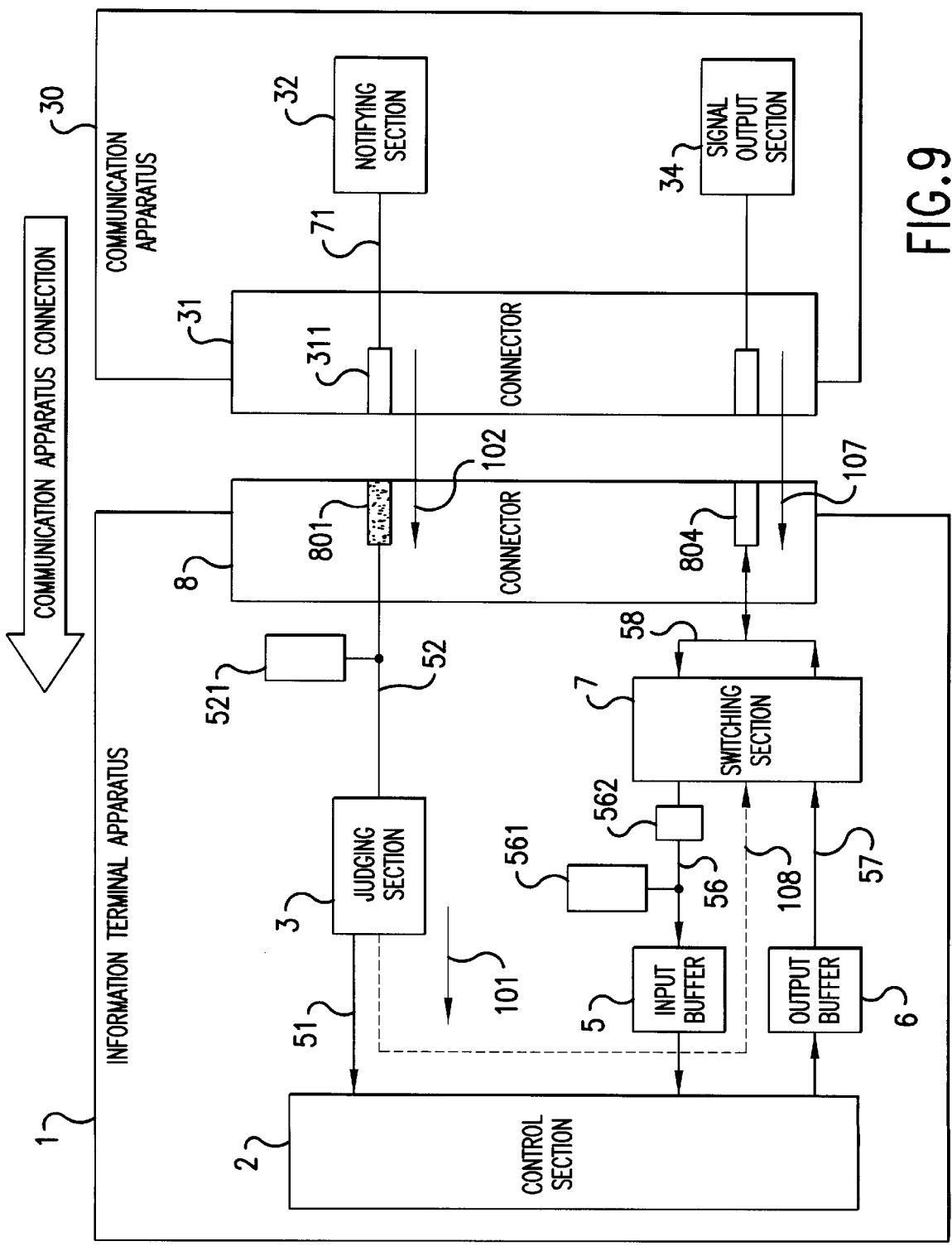
FIG. 9 is a block diagram showing the configuration for implementing an automatic signal switching operation according to a third embodiment of the invention.

As shown in FIG. 9, in a third embodiment, an information terminal apparatus 1 comprises: a control section 2 for controlling an interface connecting between the information terminal apparatus 1 and communication apparatus 30; a judging section 3 for automatically judging an attribute of the connected communication apparatus 30; a signal line 52 for receiving a connection notification 102 from the communication apparatus 30; a switching section 7 for automatically switching between an input buffer 5 and an output buffer 6 in response to a switching control 108 from the judging section 3; an interrupt line 51 for reporting a judgement result 101 from the judging section 3 to the control section 2; a signal line 58 for transferring input/output signals 107, such as control signals and data, between the communication apparatus 30 and the switching section 7; a signal line 56 for transferring control signals and data from the switching section 7 to the control section 2 via the input buffer 5; a signal line 57 for transferring control signals and data from the control section 2 to the switching section 7 via the output buffer 6 of an open collector type; a connector 8 accommodating terminals for connecting the signal lines to the communication apparatus 30; and pull up resistors 521 and 561 for providing a high level state when nothing is connected to the respective input sections and for providing an input signal of a prescribed level to an output section of the communication apparatus 30 when in a connected condition.

The communication apparatus 30 comprises: a notifying section 32 for sending the attribute and the connected state of the communication apparatus 30 when connected to the information terminal apparatus 1; a signal line 71 for sending the connection notification 102 from the notifying section 32 to the information terminal apparatus 1; and a signal output section 34 and a signal input section (not shown) for transferring input/output signals 107, such as control signals and data, to and from the information terminal apparatus 1.

When the communication apparatus 30 is not connected to the information terminal apparatus 1, the connection notification 102 is not yet sent to the judging section 3, and the signal line 52 connected to the judging section 3 continually provides a high level state by the action of the pull up resistor 521. Further, since the polarity of signal input/output lines on the communication apparatus 30 is unknown, the judging section 3 controls the switching section 7 by the switching control 108 so that the signal line 57 connected to the open collector type output buffer 6 is connected to the signal line 58 connected to a terminal 804 on the connector 8.

When the communication apparatus 30 is connected to the information terminal apparatus 1, the connection notification 102 from the notifying section 32 arrives at the judging section 3 at the instant that a terminal 801 on the connector 8 is connected to a terminal 311 on a connector 31, and the judging section 3 thus judges the connected state and the attribute of the communication apparatus 30. By configuring the notifying section 32 to generate a pattern unique to the type of the communication apparatus, the judging section 3 can judge the type of the connected communication apparatus as well as the connected state of the communication apparatus. This method is the same as that employed in the first embodiment. Matching to the characteristics of the input/output sections of the communication apparatus 30 is done by judging the attribute of the communication apparatus 30; to achieve this, the judging section 3 sends the switching control 108 to the switching section 7 so that control signals and data can be transferred between the information terminal apparatus 1 and the communication apparatus 30. At the same time, the judging section 3 generates a signal for reporting the judgement result 101 to the control section 2, and outputs the signal on the interrupt line 51.

In FIG. 9, the circuit block for transferring the control signals and data between the information terminal apparatus 1 and the communication apparatus 30 is shown as having only one control path, but by providing a plurality of switching controls, an interface for transferring control signals and data using multiple paths can be achieved.

Embodiment 4

Figure 10:
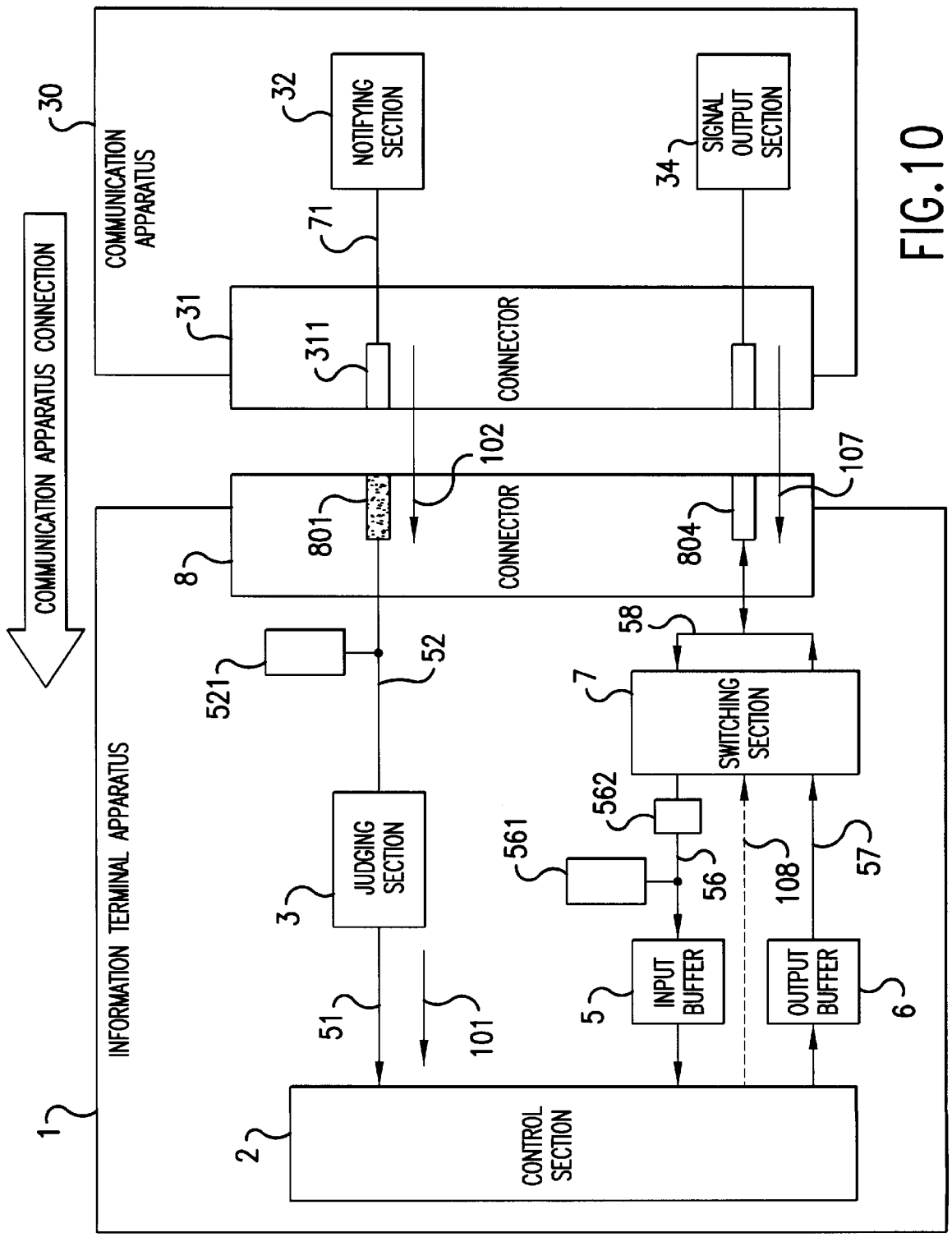
FIG. 10 is a block diagram showing the configuration for implementing an automatic signal switching operation according to a fourth embodiment of the invention.

As shown in FIG. 10, in a fourth embodiment, an information terminal apparatus 1 comprises: a control section 2 for controlling an interface connecting between the information terminal apparatus 1 and communication apparatus 30; a judging section 3, connected to the control section 2, for producing a report corresponding to a connection notification 102 received from the communication apparatus 30; a signal line 52 for the judging section 3 to receive the connection notification 102 from the communication apparatus 30; an interrupt line 51 for reporting a judgement result 101 from the judging section 3 to the control section 2; a switching section 7 for automatically switching between an input buffer 5 and an output buffer 6 in response to a switching control 108 from the control section 2; a signal line 58 for transferring input/output signals 107, such as control signals and data, between the communication apparatus 30 and the switching section 7; a signal line 56 for transferring control signals and data from the switching section 7 to the control section 2 via the input buffer 5; a signal line 57 for transferring control signals and data from the control section 2 to the switching section 7 via the output buffer 6 of an open collector type; a connector 8 accommodating terminals for connecting the signal lines to the communication apparatus 30; and pull up resistors 521 and 561 for providing a high level state when nothing is connected to the respective input sections and for providing an input signal of a prescribed level to an output section of the communication apparatus 30 when in a connected condition.

The communication apparatus 30 comprises: a notifying section 32 for sending the attribute and the connected state of the communication apparatus 30 when connected to the information terminal apparatus 1; a signal line 71 for sending the connection notification 102 from the notifying section 32 to the information terminal apparatus 1; and a signal output section 34 and a signal input section (not shown) for transferring input/output signals 107, such as control signals and data, to and from the information terminal apparatus 1.

When the communication apparatus 30 is not connected to the information terminal apparatus 1, the connection notification 102 is not yet sent to the judging section 3, and the signal line 52 connected to the judging section 3 continually provides a high level state by the action of the pull up resistor 521. Further, since the polarity of signal input/output lines on the communication apparatus 30 is unknown, the control section 2 controls the switching section 7 by the switching control 108 so that the signal line 57 connected to the open collector type output buffer 6 is connected to the signal line 58 connected to a terminal 804 on the connector 8.

When the communication apparatus 30 is connected to the information terminal apparatus 1, the connection notification 102 from the notifying section 32 arrives at the judging section 3 at the instant that a terminal 801 on the connector 8 is connected to a terminal 311 on a connector 31, and the judging section 3 thus generates an interrupt signal corresponding to the pattern of the connection notification 102, and outputs the interrupt signal on the interrupt line 51 for transfer to the control section 2. The control section 2 judges the connected state and the attribute of the communication apparatus 30 based on the interrupt signal. By configuring the notifying section 32 to generate a pattern unique to the type of the communication apparatus, the control section 2 can judge the type of the connected communication apparatus as well as the connected state of the communication apparatus.

Figure 11:
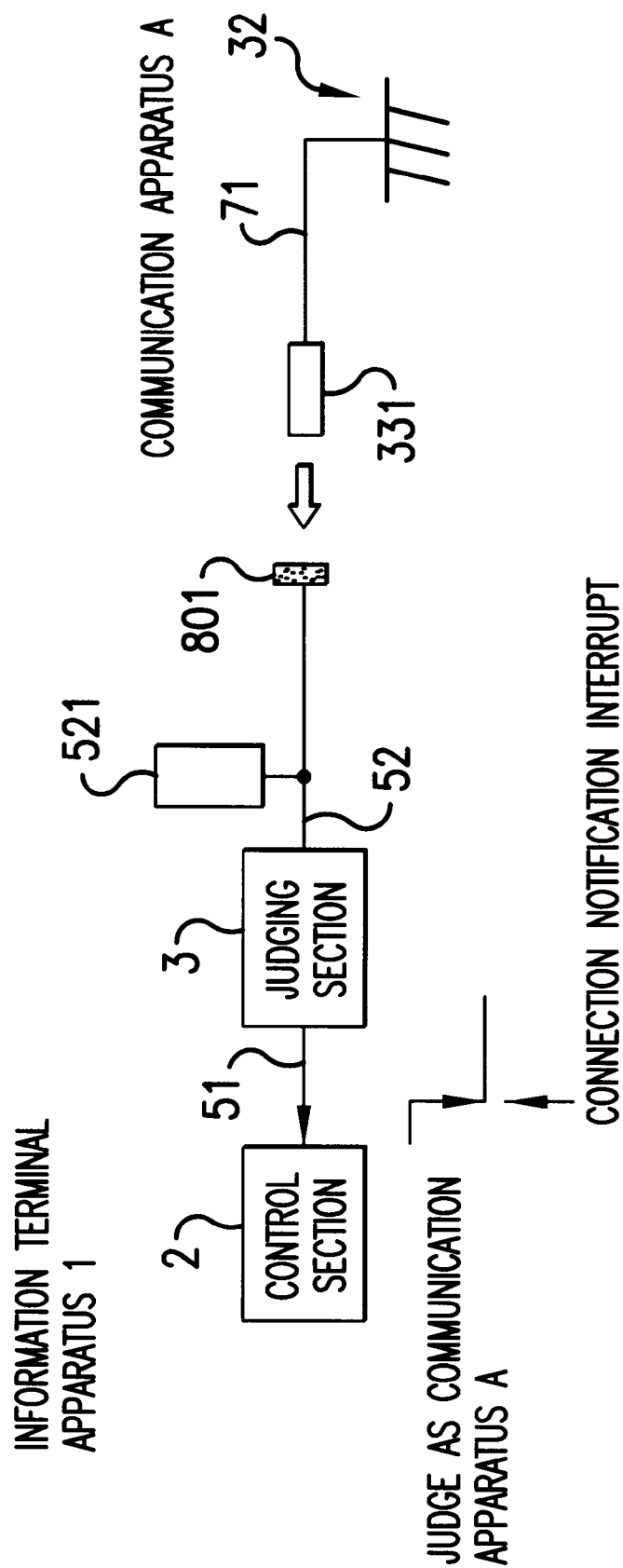
FIG. 11 is a diagram showing the configuration of the judging section 3 and notifying section 32 for implementing the automatic signal switching operation according to the fourth embodiment of the invention.
Figure 12:
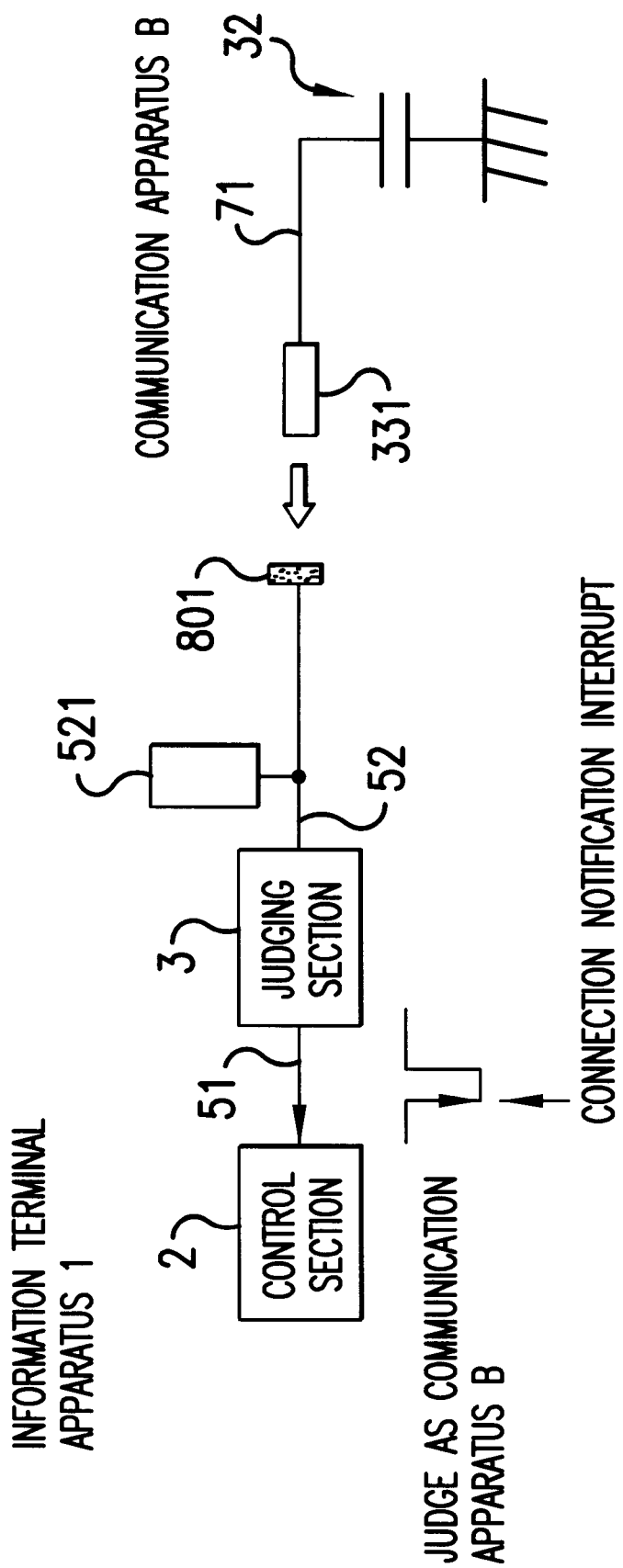
FIG. 12 is a diagram showing the configuration of the judging section 3 and notifying section 32 for implementing the automatic signal switching operation according to the fourth embodiment of the invention.

FIGS. 11 and 12 show configuration examples of the judging section 3 and notifying section 32. FIG. 11 shows an example in which when a communication apparatus A is connected to the information terminal apparatus 1, the judging section 3 sends the connection notification interrupt signal to the control section 2 which then judges the state of the connection notification as being low. FIG. 12 shows an example in which when a communication apparatus B is connected to the information terminal apparatus 1, the judging section 3 sends the connection notification interrupt signal to the control section 2 which then judges the state of the connection notification as being high.

Figure 13:
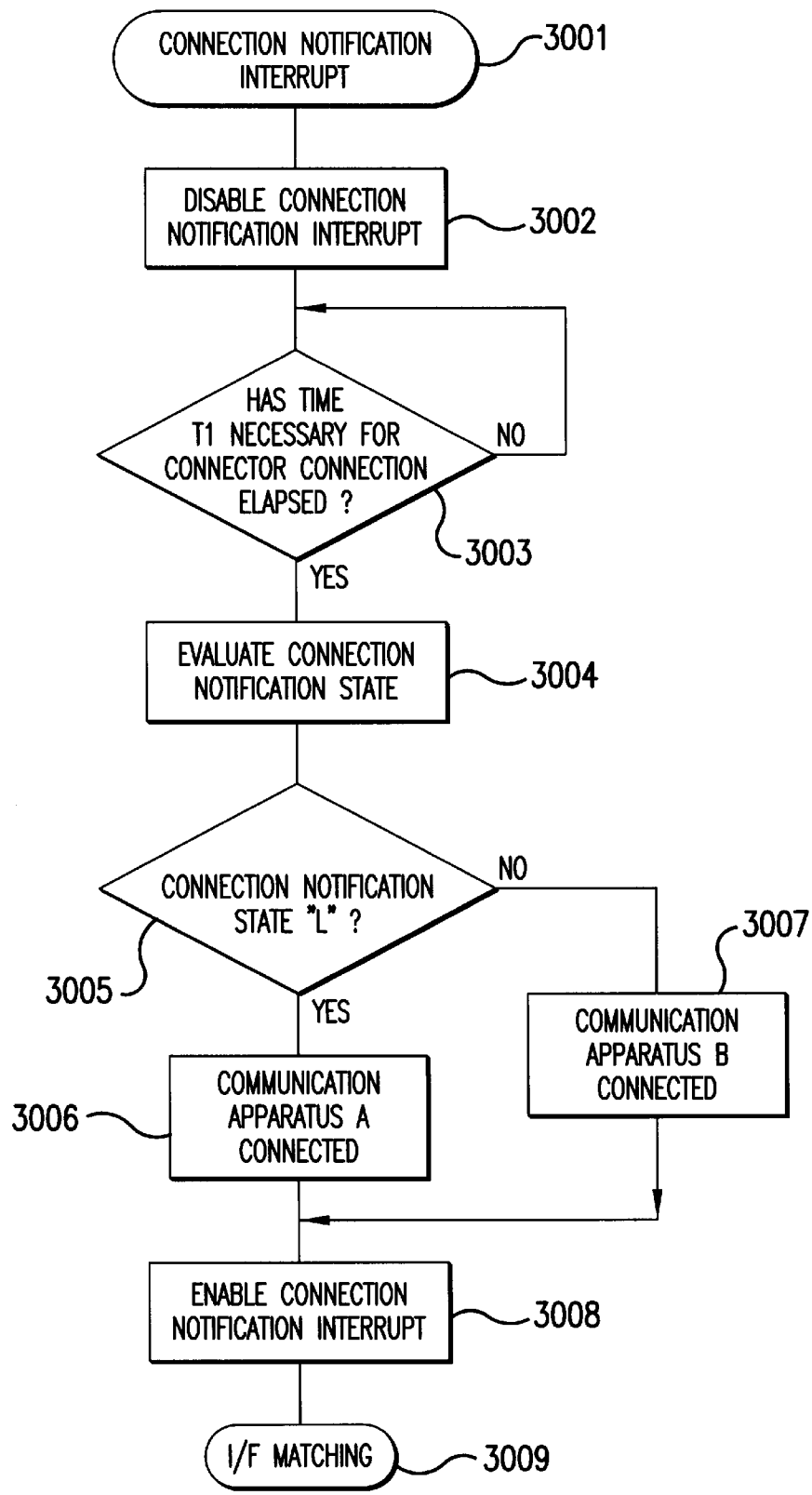
FIG. 13 is a flow chart illustrating the automatic signal switching operation according to the fourth embodiment of the invention.

FIG. 13 shows a flow chart for judging the attribute of the connected communication apparatus. The judging process is carried out by evaluating the state of the connection notification after waiting for time T1 necessary for connector connection from the time the connection notification interrupt is caused to the time the connection is completed. When the communication apparatus is connected to the information terminal apparatus 1, the connection notification interrupt occurs to initiate the processing sequence (3001). When the judging process is started, a connection notification interrupt disable step (3002) is carried out to prevent multiple occurrences of the connection notification interrupt during the time T1. Next, the process proceeds to a decision step (3003) where a decision is made as to whether the time T1 necessary for the connector connection has elapsed or not. When the time T1 has elapsed, the process exits the loop and proceeds to the next step of evaluating the state of the connection notification (3004), which is followed by the step of judging the result of the evaluation (3005).

In the example of FIG. 11, since the state of the connection notification passed from the judging section 3 to the control section 2 is low at the end of the time T1, it is determined in the next step (3006) that the communication apparatus A has been connected, and then the judging process is terminated.

In the example of FIG. 12, on the other hand, since the state of the connection notification passed from the judging section 3 to the control section 2 is high at the end of the time T1, the result of the evaluation is judged (3005) and the process proceeds to the next step (3007) where it is determined the communication apparatus B has been connected, and then the judging process is terminated. When the judging process is terminated, a connection notification interrupt enable step (3008) is carried out to enable the automatic judgement for the next communication apparatus to be connected. The whole process for judging the attribute of the communication apparatus is thus terminated, and I/F matching (3009) is performed.

Figure 14:
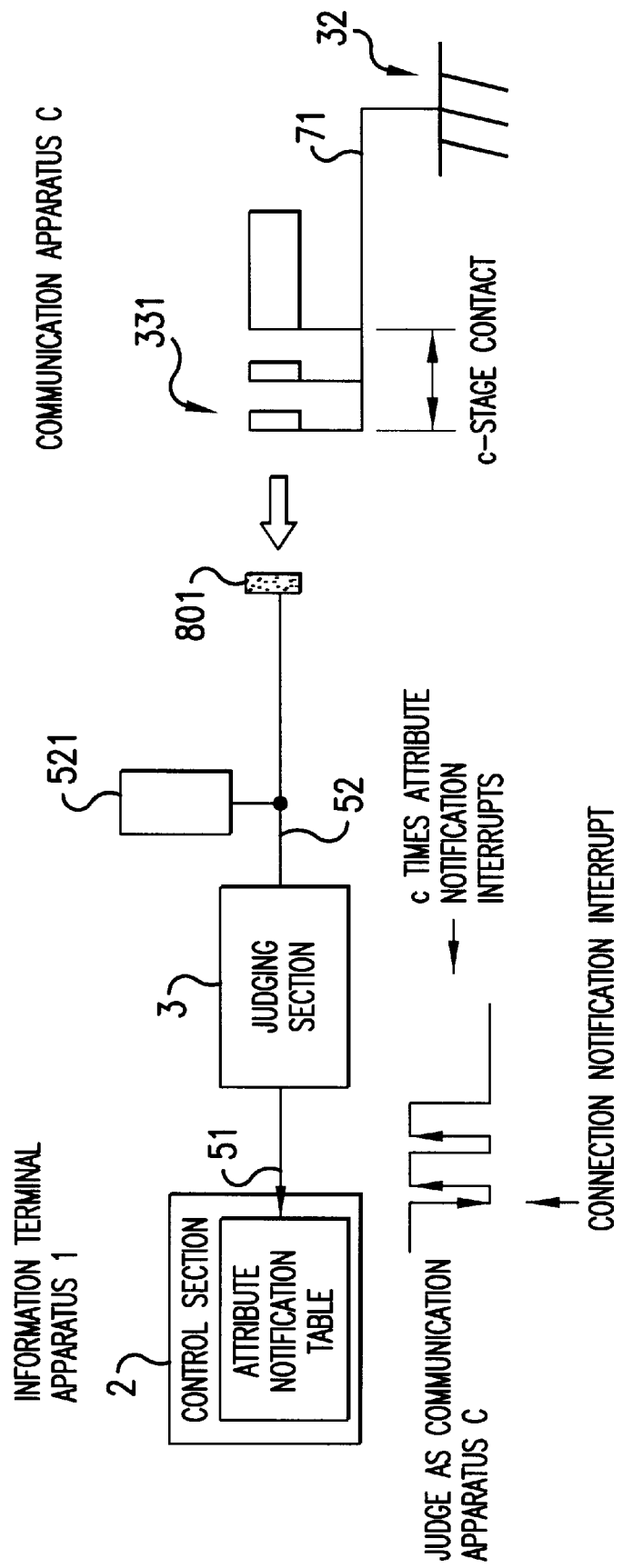
FIG. 14 is a diagram showing the configuration of the judging section 3 and notifying section 32 for implementing the automatic signal switching operation according to the fourth embodiment of the invention.
Figure 15:
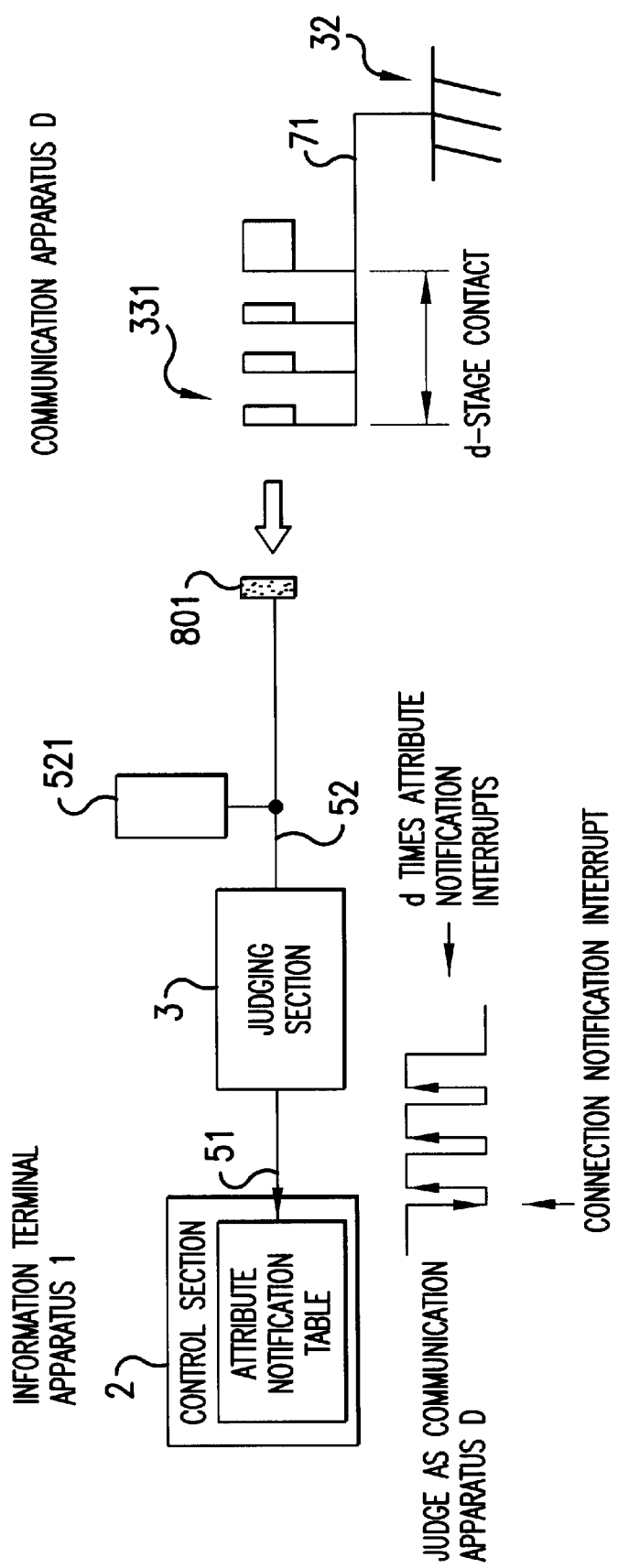
FIG. 15 is a diagram showing the configuration of the judging section 3 and notifying section 32 for implementing the automatic signal switching operation according to the fourth embodiment of the invention.

FIGS. 14 and 15 show an alternative configuration in which the control section 2 has an attribute notification table for judging the attribute of the connected communication apparatus based on the number of attribute notification interrupts generated at the time of the connection notification; in this configuration, the contact on the notifying section 32 that generates the connection notification is formed with a different number of stages for different communication apparatus so that the attribute of the connected communication apparatus can be judged based on the number of attribute notification interrupts generated at the time of the connection notification. FIG. 14 concerns an example in which when a communication apparatus C is connected to the information terminal apparatus 1, the control section 2 detects c-1 times attribute notification interrupts being sent from the judging section 3. FIG. 15 concerns an example in which when a communication apparatus D is connected to the information terminal apparatus 1, the control section 2 detects d-1 times attribute notification interrupts being sent from the judging section 3.

Figure 16:
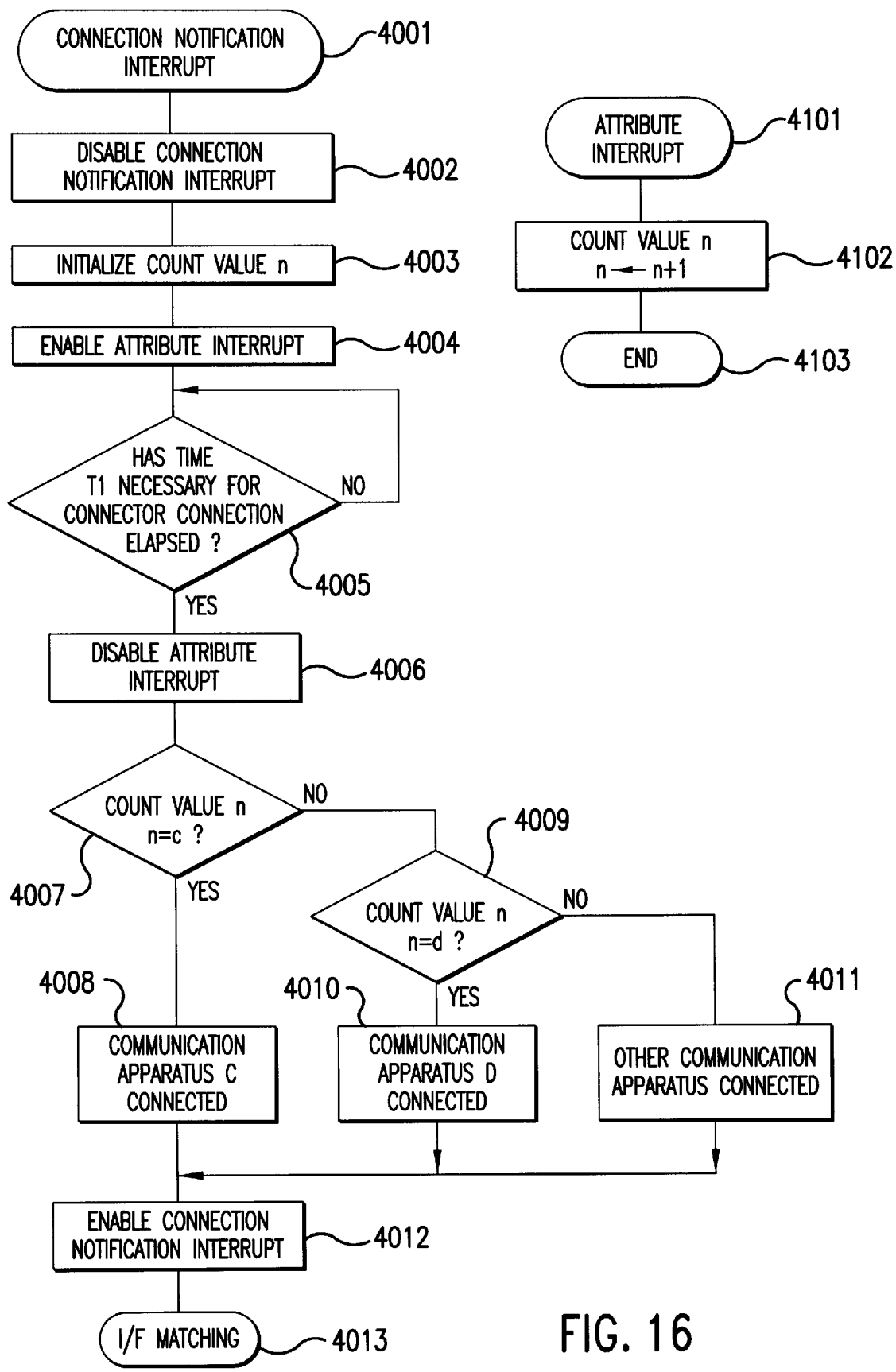
FIG. 16 is a flow chart illustrating the automatic signal switching operation according to the fourth embodiment of the invention.

FIG. 16 shows a flow chart for judging the attribute of the connected communication apparatus. The judging process is carried out by making use of a count value which indicates the number of occurrences of an attribute interrupt caused by the rising edge of a pulse during time T1 necessary for connector connection from the time the connection notification interrupt is caused to the time the connection is completed. When the communication apparatus is connected to the information terminal apparatus 1, the connection notification interrupt occurs to initiate the processing sequence (4001). When the judging process is started, a connection notification interrupt disable step (4002) is carried out to prevent multiple occurrences of the connection notification interrupt during the time T1. Next, the count value counting the number of occurrences of the attribute interrupt arising during the time T1 is initialized (4003).

After carrying out an attribute interrupt enable step (4004), the process proceeds to a decision step (4005) where it is decided whether the time T1 necessary for the connector connection has elapsed or not. When the attribute interrupt enable step (4004) is carried out in the connection interrupt process, an attribute interrupt process (4101) is initiated and carries out a step (4102) where a count of the number of attribute interrupts is incremented at each occurrence of an attribute interrupt, and thereafter the process is terminated (4103). When the waiting time T1 necessary for the connector connection has elapsed in the connection interrupt process, an attribute interrupt disable step (4006) is carried out to prevent an illegal attribute interrupt from occurring after the time T1 necessary for the connector connection has elapsed. Next, the process proceeds to the step (4007) of judging the attribute of the communication apparatus based on the count value obtained by counting the number of attribute interrupts.

In the example of FIG. 14, since the control section 2 receives the attribute interrupt c-1 times following the occurrence of the connection notification interrupt, the count value n in the evaluation step (4007) is c-1, and in the next step (4008) it is determined that the communication apparatus C has been connected, whereupon the judging process is terminated. In the example of FIG. 15, on the other hand, since the control section 2 receives the attribute interrupt d-1 times following the occurrence of the connection notification interrupt, the count value n in the evaluation step (4007) is not c-1, but as it is evaluated in the next step (4009), n is d-1; as a result, it is determined in the next step (4010) that the communication apparatus D has been connected, whereupon the judging process is terminated. In either example, any arbitrary kind of attribute can be judged based on the number of terminal stages that generate the connection notification indicating the connection of the communication apparatus.

When the judging process is terminated, a connection notification interrupt enable step (4012) is carried out to enable the automatic judgement for the next communication apparatus to be connected. The whole process for judging the attribute of the connected communication apparatus is thus terminated, and I/F matching (4013) is performed.

In FIG. 10, matching to the characteristics of the input/output sections of the communication apparatus 30 is done by judging the attribute of the communication apparatus 30; to achieve this, the control section 2 sends the switching control 108 to the switching section 7 so that control signals and data can be transferred between the information terminal apparatus 1 and the communication apparatus 30.

In FIG. 10, the circuit block for transferring the control signals and data between the information terminal apparatus 1 and the communication apparatus is shown as having only one control path, but by providing a plurality of switching controls, an interface for transferring control signals and data using multiple paths can be achieved.

Embodiment 5

Figure 17:
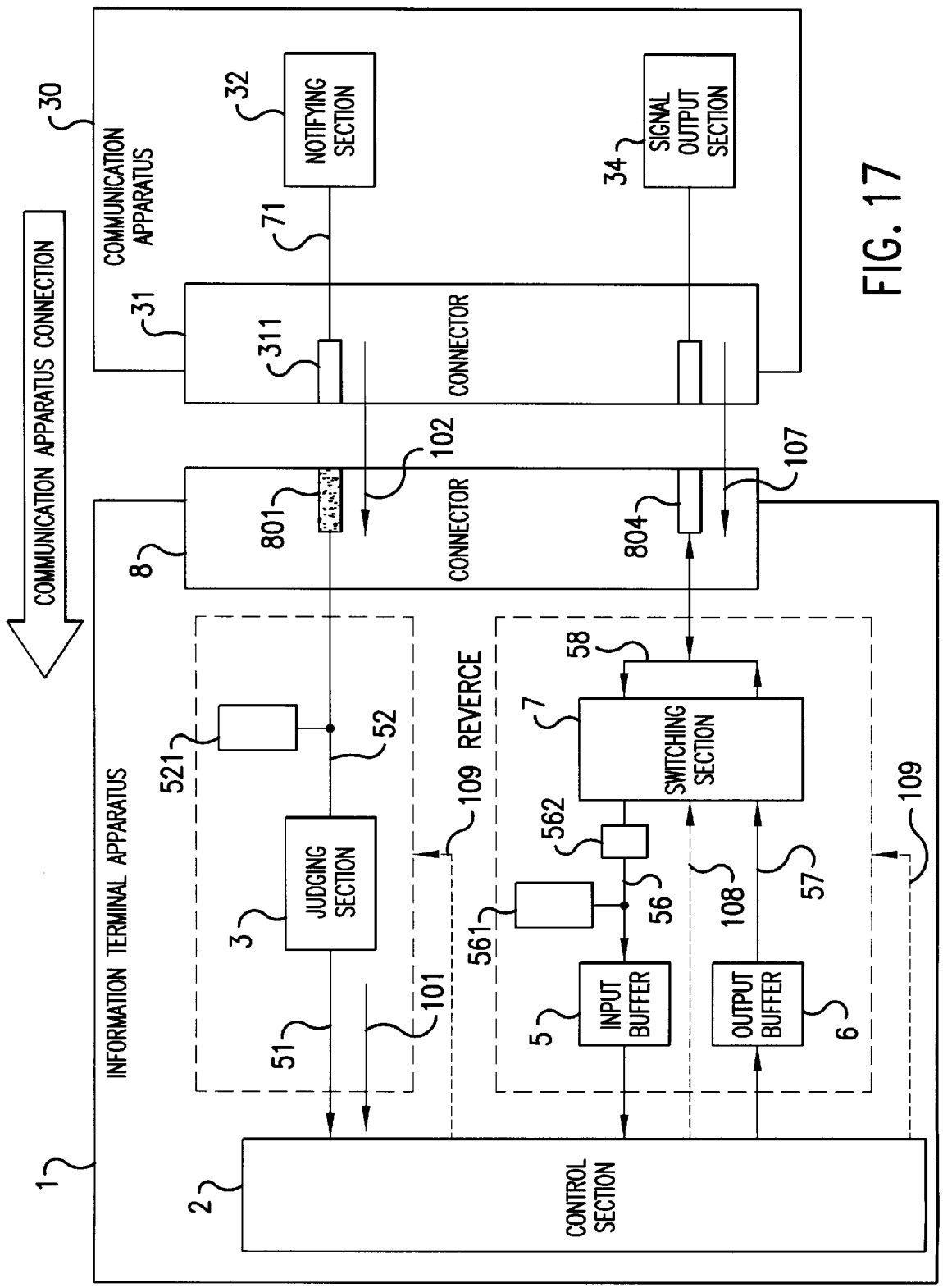
FIG. 17 is a block diagram showing the configuration for implementing an automatic signal switching operation according to a fifth embodiment of the invention.

As shown in FIG. 17, in a fifth embodiment, an information terminal apparatus 1 comprises: a control section 2 for controlling an interface connecting between the information terminal apparatus 1 and communication apparatus 30; a judging section 3, connected to the control section 2, for producing a report corresponding to a connection notification 102 received from the communication apparatus 30; a signal line 52 for the judging section 3 to receive the connection notification 102 from the communication apparatus 30; an interrupt line 51 for reporting a judgement result 101 from the judging section 3 to the control section 2; activation control lines 109 for automatically activating and deactivating the judging section 3 and the connecting interface respectively in reversing manner from the control section 2; a switching section 7 for automatically switching between an input buffer 5 and an output buffer 6 in response to a switching control 108 from the control section 2; a signal line 58 for transferring input/output signals 107, such as control signals and data, between the communication apparatus 30 and the switching section 7; a signal line 56 for transferring control signals and data from the switching section 7 to the control section 2 via the input buffer 5; a signal line 57 for transferring control signals and data from the control section 2 to the switching section 7 via the output buffer 6 of an open collector type; a connector 8 accommodating terminals for connecting the signal lines to the communication apparatus 30; and pull up resistors 521 and 561 for providing a high level state when nothing is connected to the respective input sections and for providing an input signal of a prescribed level to an output section of the communication apparatus 30 when in a connected condition.

The communication apparatus 30 comprises: a notifying section 32 for sending the attribute and the connected state of the communication apparatus 30 when connected to the information terminal apparatus 1; a signal line 71 for sending the connection notification 102 from the notifying section 32 to the information terminal apparatus 1; and a signal output section 34 and a signal input section (not shown) for transferring input/output signals 107, such as control signals and data, to and from the information terminal apparatus 1.

When the communication apparatus 30 is not connected to the information terminal apparatus 1, the connection notification 102 is not yet sent to the judging section 3, and the signal line 52 connected to the judging section 3 continually provides a high level state by the action of the pull up resistor 521. The control section 2 outputs control signals on the activation control lines 109 to activate only the judging section 3, while putting the connecting interface in a deactivated state that does not consume current.

The judging process performed when the communication apparatus 30 is connected to the information terminal apparatus 1 is the same as that described in the fourth embodiment. Matching to the characteristics of the signal input/output sections of the communication apparatus 30 is done by judging the attribute of the communication apparatus 30; to achieve this, the control section 2 deactivates the judging section 3 and activates the connecting interface by activation control signals, and at the same time, sends the switching control 108 to the switching section 7 so that control signals and data can be transferred between the information terminal apparatus 1 and the communication apparatus 30.

In FIG. 17, the circuit block for transferring the control signals and data between the information terminal apparatus 1 and the communication apparatus is shown as having only one control path, but by providing a plurality of switching controls, an interface for transferring control signals and data using multiple paths can be achieved.

Embodiment 6

Figure 18:
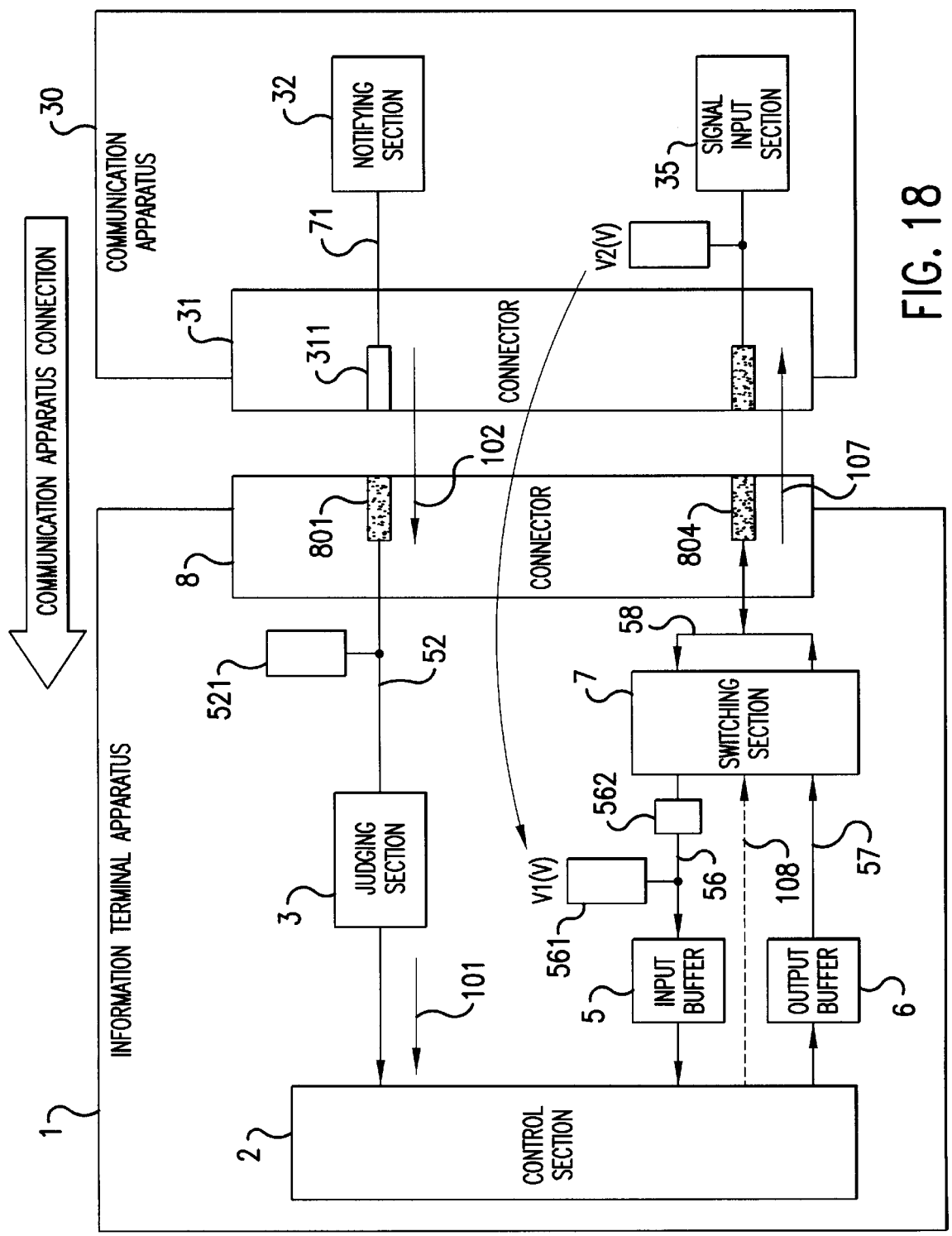
FIG. 18 is a block diagram showing the configuration for implementing an automatic signal switching operation according to a sixth embodiment of the invention.

As shown in FIG. 18, in a sixth embodiment, an information terminal apparatus 1 comprises: a control section 2 for controlling an interface connecting between the information terminal apparatus 1 and communication apparatus 30; a judging section 3, connected to the control section 2, for producing a report corresponding to a connection notification 102 received from the communication apparatus 30; a signal line 52 for the judging section 3 to receive the connection notification 102 from the communication apparatus 30; an interrupt line 51 for reporting a judgement result 101 from the judging section 3 to the control section 2; a switching section 7 for automatically switching between an input buffer 5 and an output buffer 6 in response to a switching control 108 from the control section 2; a signal line 58 for transferring input/output signals 107, such as control signals and data, between the communication apparatus 30 and the switching section 7; a signal line 56 for transferring control signals and data from the switching section 7 to the control section 2 via the input buffer 5; a signal line 57 for transferring control signals and data from the control section 2 to the switching section 7 via the output buffer 6 of an open collector type; a connector 8 accommodating terminals for connecting the signal lines to the communication apparatus 30; and pull up resistors 521 and 561 for providing a high level state when nothing is connected to the respective input sections and for providing an input signal of a prescribed level to an output section of the communication apparatus 30 when in a connected condition.

The communication apparatus 30 comprises: a notifying section 32 for sending the attribute and the connected state of the communication apparatus 30 when connected to the information terminal apparatus 1; a signal line 71 for sending the connection notification 102 from the notifying section 32 to the information terminal apparatus 1; and a signal input section (not shown) and a signal output section 35 for transferring input/output signals 107, such as control signals and data, to and from the information terminal apparatus 1.

When the communication apparatus 30 is not connected to the information terminal apparatus 1, the connection notification 102 is not yet sent to the judging section 3, and the signal line 52 connected to the judging section 3 continually provides a high level state by the action of the pull up resistor 521. Further, since the polarity of signal input/output lines on the communication apparatus 30 is unknown, the control section 2 controls the switching section 7 by the switching control 108 so that the signal line 56 connected to the input buffer 5 is connected to the signal line 58 connected to a terminal 804 on the connector 8.

An overcurrent protection 562 is inserted in the signal line 56 leading to the input buffer 5 in the information terminal apparatus 1 in order to prevent an overcurrent from flowing due to a potential difference between V1 and V2 when a terminal on the information terminal apparatus 1 connected to a terminal on the communication apparatus, with the input polarity of the latter terminal pulled up by V2 (V), is taken as an input pulled up by V1 (V) during the time from the moment the communication apparatus 30 is connected to the information terminal apparatus 1 until the characteristics of the signal input/output sections of the connecting interface on the information terminal apparatus 1 are matched by judging the attribute of the communication apparatus 30.

The judging process performed when the communication apparatus 30 is connected to the information terminal apparatus 1 is the same as that described in the fourth embodiment. Matching to the characteristics of the signal input/output sections of the communication apparatus 30 is done by judging the attribute of the communication apparatus 30; to achieve this, the control section 2 sends the switching control 108 to the switching section 7 so that control signals and data can be transferred between the information terminal apparatus 1 and the communication apparatus 30.

In FIG. 18, the circuit block for transferring the control signals and data between the information terminal apparatus 1 and the communication apparatus is shown as having only one control path, but by providing a plurality of switching controls, an interface for transferring control signals and data using multiple paths can be achieved.

Embodiment 7

Figure 19:
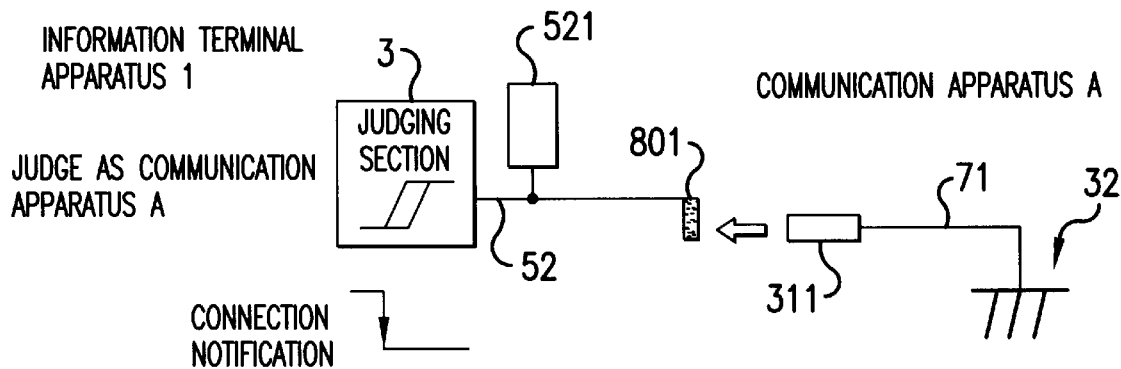
FIG. 19 is a diagram showing the configuration of the judging section 3 and notifying section 32 for implementing an automatic signal switching operation according to a seventh embodiment of the invention.
Figure 20:
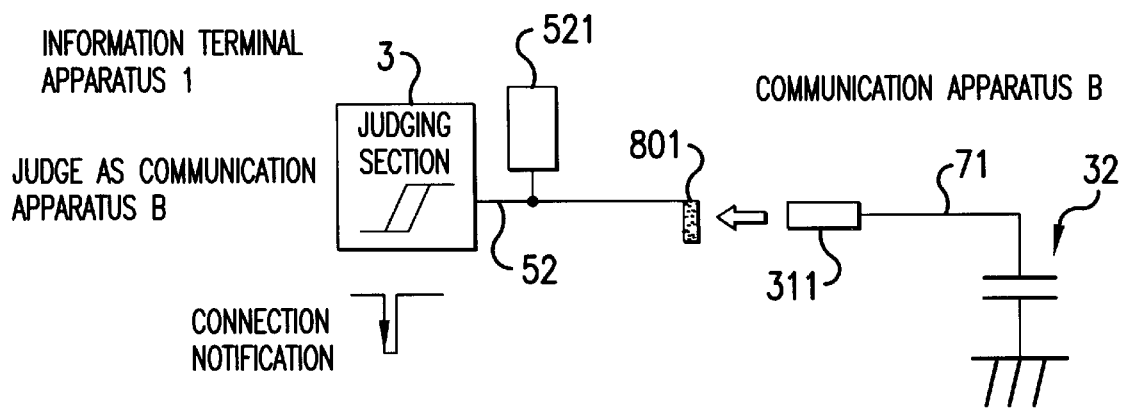
FIG. 20 is a diagram showing the configuration of the judging section 3 and notifying section 32 for implementing the automatic signal switching operation according to the seventh embodiment of the invention.

As shown in FIGS. 19 and 20, in a seventh embodiment, the judging section 3 for automatically judging the attribute of the connected communication apparatus has an input buffer which is provided with a hysteresis characteristic in order to prevent erroneous recognition of the connected communication apparatus due to chattering that occurs because of the mechanical action associated with connector terminal characteristics when the communication apparatus is connected to the information terminal apparatus 1.

Embodiment 8

In an eighth embodiment, the judging section 3 in the information terminal apparatus 1 judges the attribute of the connected communication apparatus based on the number of occurrences of a connection notification during the time T1 necessary for the connector connection from the time the connection notification is first issued to the time the connection is completed. This is accomplished by utilizing the characteristic that the number of connection notifications generated differs between the case of FIG. 21, where the notifying section 32 for reporting the attribute of the connected communication apparatus is not provided with means for suppressing the occurrence of chattering due to the mechanical action associated with connector terminal characteristics when the communication apparatus is connected to the information terminal apparatus 1, and the case of FIG. 22, where the notifying section 32 for reporting the attribute of the connected communication apparatus is provided with means for suppressing the occurrence of chattering due to the mechanical action associated with connector terminal characteristics when the communication apparatus is connected to the information terminal apparatus 1.

Figure 21:
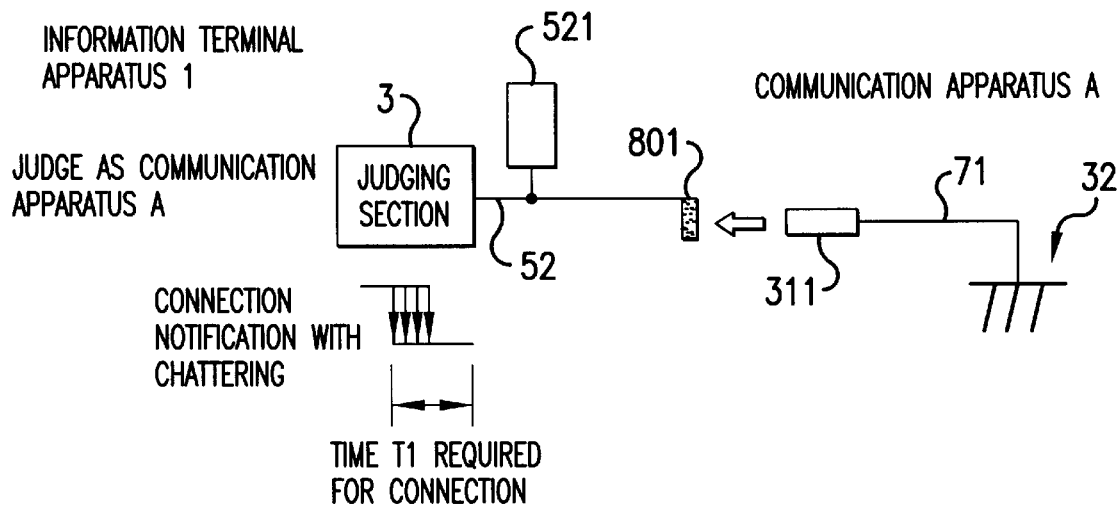
FIG. 21 is a diagram showing the configuration of the judging section 3 and notifying section 32 for implementing an automatic signal switching operation according to an eighth embodiment of the invention.

In the case of FIG. 21, when a communication apparatus A is connected to the information terminal apparatus 1, chattering occurs due to the mechanical action associated with the characteristics of the connector terminals 801 and 311, as a result of which the connection notification is sent to the judging section 3 a plurality of times during the time T1 required to complete the connector connection. On the other hand, in the case of FIG. 22, since the chattering is suppressed by the charge/discharge time constant of a capacitive load, the connection notification is sent to the judging section 3 only once during the time T1 required to complete the connector connection.

Figure 22:
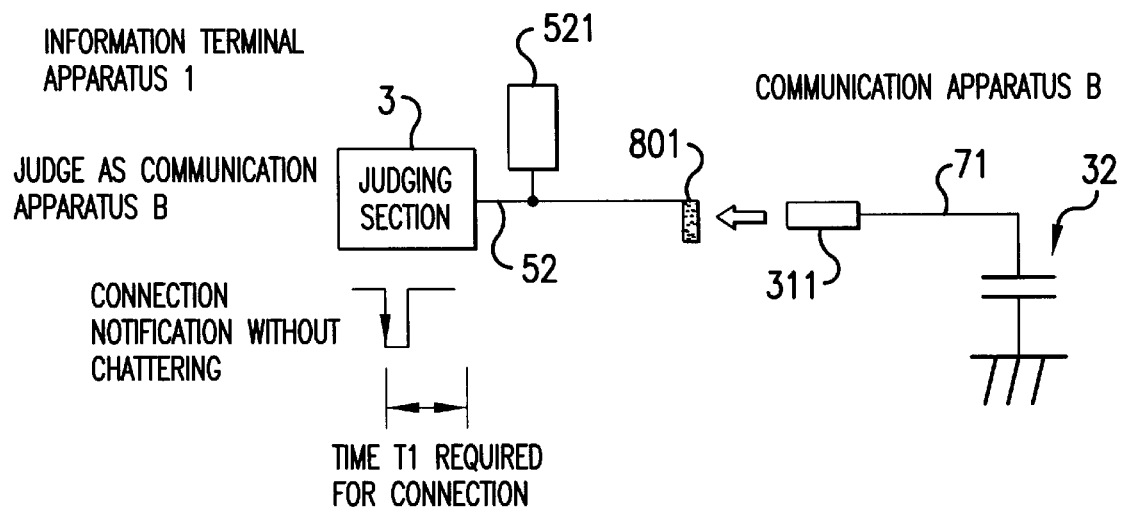
FIG. 22 is a diagram showing the configuration of the judging section 3 and notifying section 32 for implementing the automatic signal switching operation according to the eighth embodiment of the invention.
Figure 23:
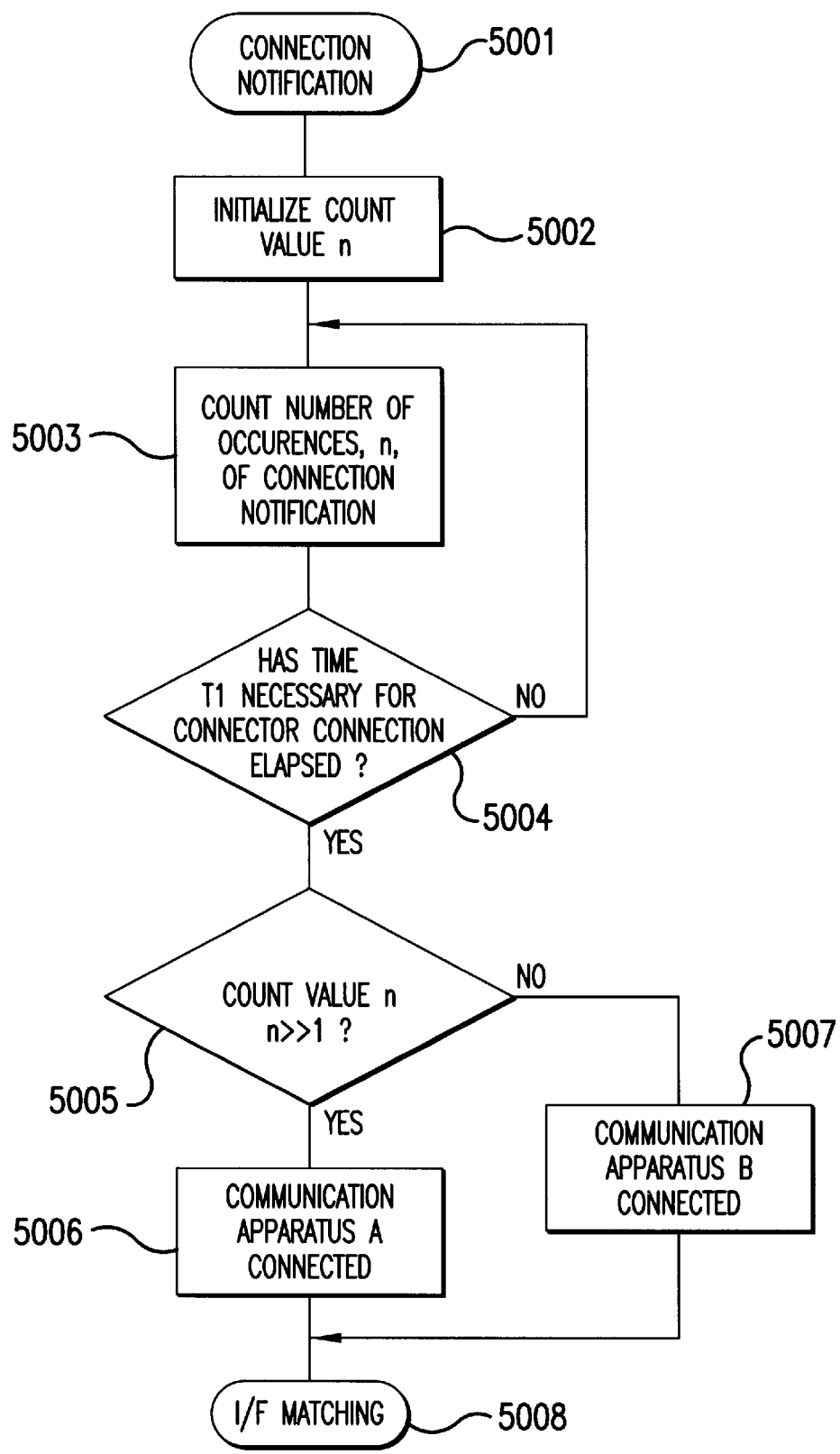
FIG. 23 is a flow chart illustrating the automatic signal switching operation according to the eighth embodiment of the invention.

FIG. 23 shows a flow chart for judging the attribute of the connected communication apparatus. The judging process is performed by making use of a count value which indicates the number of occurrences of the connection notification during the time T1 necessary for the connector connection from the time the connection notification is first reported to the time the connection is completed. When the communication apparatus is connected to the information terminal apparatus 1, a connection notification arrives, whereupon the processing sequence is started (5001). When the judging process is started, first the count value n is initialized (5002). Next, the step of incrementing the count by the falling edge of each connection notification pulse is carried out (5003). This step is carried out repeatedly during the time T1, with the process looping back from the next step (5004) of judging the elapsed time. When the time T1 has elapsed, the process exits the loop and proceeds to the next step (5005) where the count value at the end of the time T1 is evaluated. In the example of FIG. 21, since the judging section 3 detects a plurality of connection notifications after the first connection notification, the count value n is sufficiently larger than 1; therefore, it is determined in the next step (5006) that the communication apparatus A has been connected, and the judging process is terminated, followed by I/F matching (5008). In the example of FIG. 22, on the other hand, since the judging section 3 counts only one connection notification pulse, in the evaluation step (5005) n is not sufficiently larger than 1; therefore, it is determined in the next step (5007) that the communication apparatus B has been connected, and the judging process is terminated, followed by I/F matching (5008).

Embodiment 9

Figure 24:
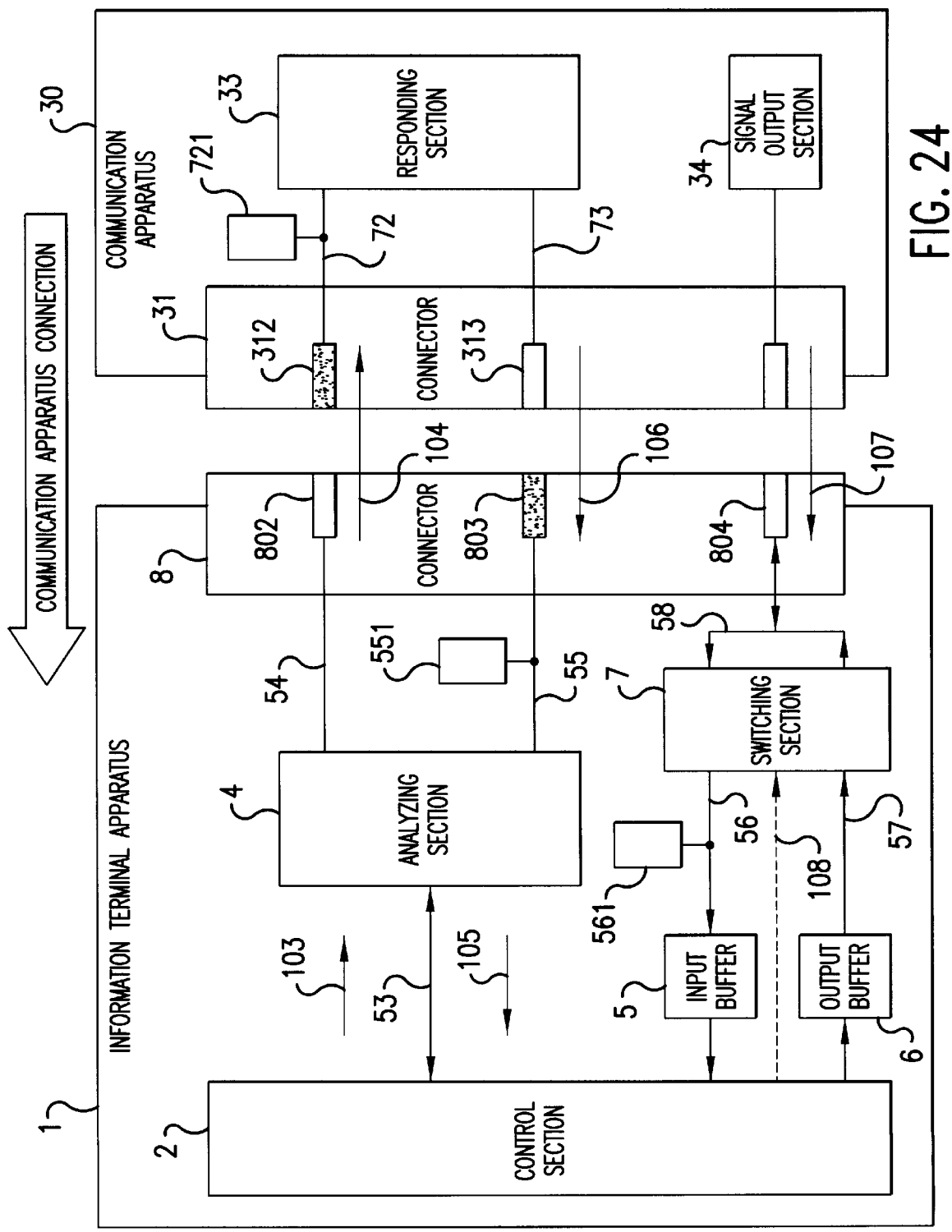
FIG. 24 is a block diagram showing the configuration for implementing an automatic signal switching operation according to a ninth embodiment of the invention.

As shown in FIG. 24, in a ninth embodiment, an information terminal apparatus 1 comprises: a control section 2 for controlling an interface connecting between the information terminal apparatus 1 and communication apparatus 30; an analyzing section 4 for judging the type of the connected communication apparatus 30; a signal line 54 for sending a type inquiry 104 from the analyzing section 4 to the communication apparatus 30; a signal line 55 for the analyzing section 4 to receive a type-identifying response 106 from the communication apparatus 30 in response to the type inquiry; a handling bus 53 for transferring an analysis instruction 103 and a state verification instruction 105 from the control section 2 to the analyzing section 4; an input buffer 5 and an output buffer 6 for transferring control signals and data to and from the communication apparatus 30; a switching section 7 for automatically switching between the input buffer 5 and the output buffer 6 in response to a switching control 108 that the control section 2 issues by judging the connection characteristics based on the result of the analysis of the communication apparatus 30; a signal line 58 for transferring input/output signals 107, such as control signals and data, between the communication apparatus 30 and the switching section 7; a signal line 56 for transferring control signals and data from the switching section 7 to the control section 2 via the input buffer 5; a signal line 57 for transferring control signals and data from the control section 2 to the switching section 7 via the output buffer 6 of an open collector type; a connector 8 accommodating terminals for connecting the signal lines to the communication apparatus 30; and pull up resistors 551 and 561 for providing a high level state when nothing is connected to the respective input sections and for providing an input signal of a prescribed level to an output section of the communication apparatus 30 when in a connected condition.

The communication apparatus 30 comprises: a responding section 33 for generating the type-identifying response 106 identifying the type of the communication apparatus 30 in response to the type inquiry 104 from the information terminal apparatus 1; a signal line 72 for delivering the type inquiry from the information terminal apparatus 1 to the responding section 33; a signal line 73 for sending the type-identifying response 106 from the responding section 33 to the information terminal apparatus 1; and a signal input section (not shown) and a signal output section 34 for transferring input/output signals 107, such as control signals and data, to and from the information terminal apparatus 1.

When the communication apparatus 30 is not connected to the information terminal apparatus 1, the type-identifying response 106 to the analyzing section 4 is not generated, and the signal line 55 connected to the analyzing section 4 continually provides a high level state by the action of the pull up resistor 551. Further, since the polarity of signal input/output lines on the communication apparatus 30 is unknown, the control section 2 controls the switching section 7 by the switching control 108 so that the signal line 57 connected to the open collector type output buffer is connected to the signal line 58 connected to a terminal 804 on the connector.

The control section 2 periodically polls the analyzing section 4 by sending the analysis instruction 103 via the handling bus 53 to check the connection or non-connection of the communication apparatus 30, and in response to the analysis instruction 103, the analyzing section 4 outputs the type inquiry 104 onto the signal line 54. When the communication apparatus 30 is not connected, the analyzing section 4 cannot obtain the type-identifying response 106 and, therefore, cannot report the state verification 105 within waiting time T2. The control section 2 thus automatically recognizes that the communication apparatus 30 is not connected.

When the communication apparatus 30 is connected, a terminal 802 on the connector 8 of the information terminal apparatus 1 is connected to a terminal 312 on the connector 31 of the communication apparatus 30, and a terminal 803 on the connector 8 of the information terminal apparatus 1 is connected to a terminal 313 on the connector 31 of the communication apparatus 30, so that the type inquiry 104 from the analyzing section 4 is delivered to the responding section 33 via the signal line 72 in the communication apparatus 30. In response to the type inquiry 104, the responding section 33 in the communication apparatus 30 sends out the type-identifying response 106 unique to the communication apparatus 30 onto the signal line 73 for transmission to the information terminal apparatus 1. In the information terminal apparatus 1, the received type-identifying response 106 is delivered to the analyzing section 4 via the signal line 55. Upon receiving the type-identifying response 106, the analyzing section 4 reports the result by sending the state verification 105 via the handling bus 53.

Figure 25:
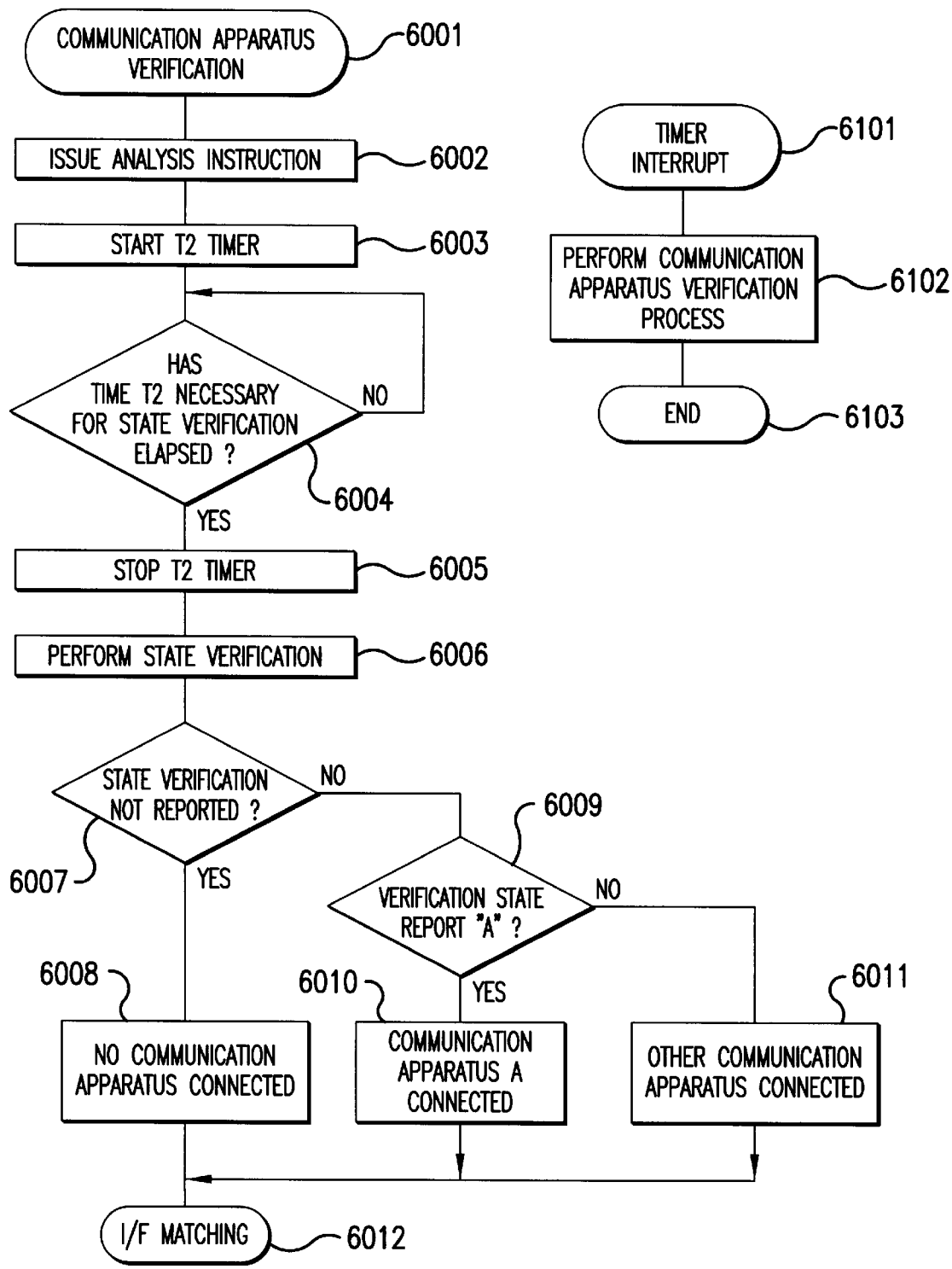
FIG. 25 is a flow chart illustrating the automatic signal switching operation according to the ninth embodiment of the invention.

FIG. 25 shows a flow chart for judging the type of the connected communication apparatus. In a communication apparatus verification process (6102) which is initiated by a periodic timer interrupt (6101), the control section performs processing to recognize the connection or non-connection of a communication apparatus and the type of the connected communication apparatus. When the communication apparatus verification (6001) is started, the control section issues an analysis instruction to the analyzing section (6002), and thereupon starts a timer to count the waiting time T2 necessary for state verification (6003). In the next step (6004) it is determined whether the waiting time T2 has elapsed or not. When the time T2 has elapsed, the process exits the loop, and the T2 timer is stopped (6005). Next, the analyzing section is instructed to verify the state (6006), and waits for a type-identifying response from the communication apparatus. When the communication apparatus is not connected, no report is made from the analyzing section; therefore, in the decision step (6007) it is decided that no state verification report is available, and the process proceeds to the next step (6008) where it is determined that no communication apparatus is connected, whereupon the process is terminated (6012).

If a communication apparatus A is connected which returns a type-identifying response A in response to the type inquiry, the analyzing section sends a report A in response to the state verification instruction from the control section. The process then follows the NO branch of the decision step (6007), and proceeds to the step (6009) where the YES branch is followed since the report verification report indicates A. In the next step (6010), it is determined that the communication apparatus A has been connected. In this way, the type of the connected communication apparatus can be identified from the type of the received response.

In FIG. 24, matching to the characteristics of the signal input/output sections of the communication apparatus 30 is done by recognizing the type of the connected communication apparatus 30 from the report obtained in response to the state verification 105; to achieve this, the control section 2 sends the switching control 108 to the switching section 7 so that control signals and data can be transferred between the information terminal apparatus 1 and the communication apparatus 30.

In FIG. 24, the circuit block for transferring the control signals and data between the information terminal apparatus 1 and the communication apparatus is shown as having only one control path, but by providing a plurality of switching controls, an interface for transferring control signals and data using multiple paths can be achieved. When the communication apparatus is provided with a notifying section that sends the connected state and the attribute of the communication apparatus when the communication apparatus is connected to the information terminal apparatus 1, as in the first embodiment, if the judging section of the first embodiment is provided in the information terminal apparatus 1, polling by the analyzing section is not needed and the control section can immediately issue an inquiry about the type of the connected communication apparatus, since the connecting of the communication apparatus to the information terminal apparatus 1 and the attribute of the connected communication apparatus can be detected through the notifying section.

Embodiment 10

Figure 26:
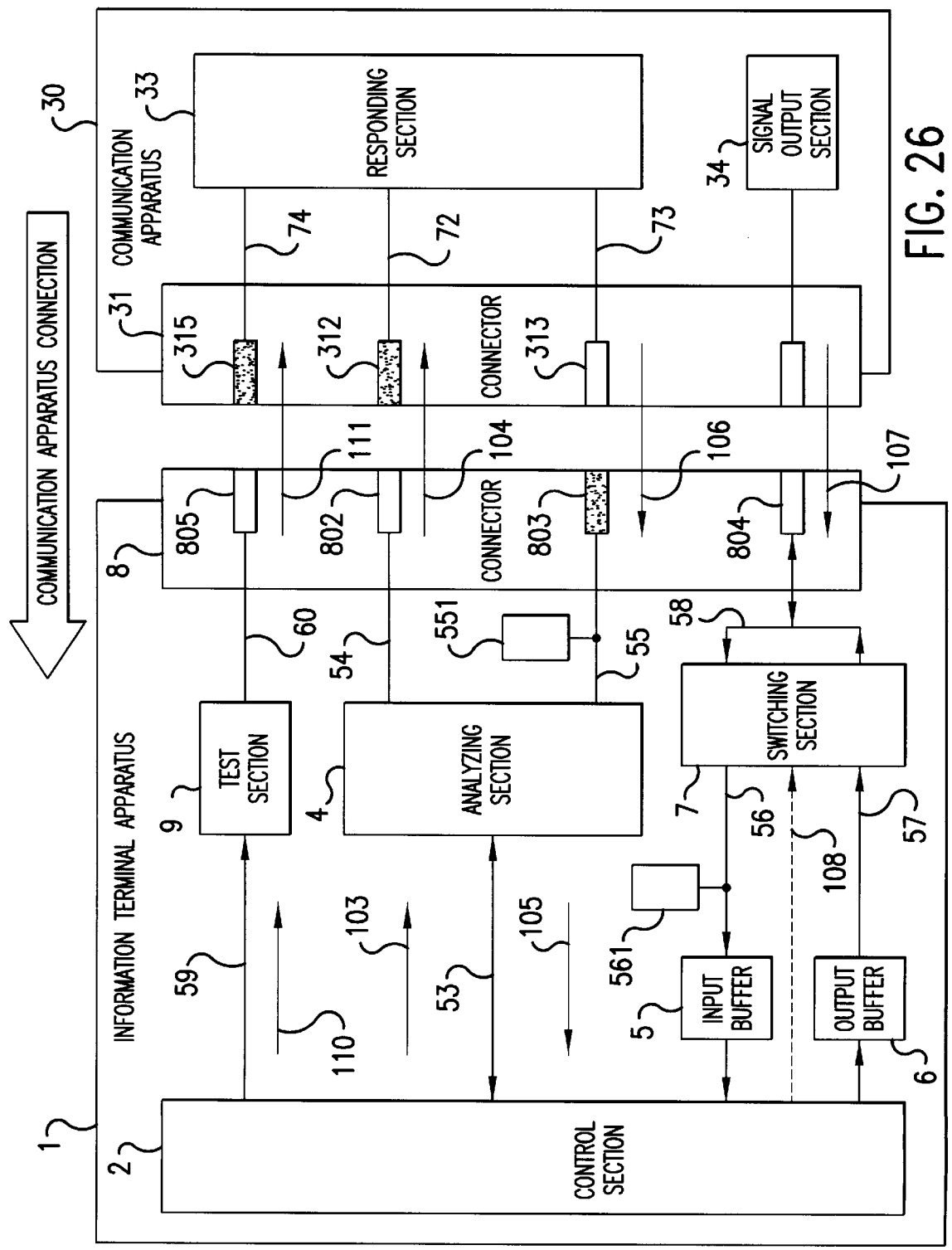
FIG. 26 is a block diagram showing the configuration for implementing an automatic signal switching operation according to a 10th embodiment of the invention.

As shown in FIG. 26, in a 10th embodiment, an information terminal apparatus 1 comprises: a control section 2 for controlling an interface connecting between the information terminal apparatus 1 and communication apparatus 30; a test section 9 for producing a test output 111 to assist in identifying the type of the connected communication apparatus 30; a signal line 59 for sending a test instruction 110 from the control section 2 to the test section 9; a signal line 60 for sending the test output 111 from the test section 9 to the communication apparatus 30; an analyzing section 4 for judging the type of the connected communication apparatus 30; a signal line 54 for sending a type inquiry 104 from the analyzing section 4 to the communication apparatus 30; a signal line 55 for the analyzing section 4 to receive a type-identifying response 106 from the communication apparatus 30 in response to the type inquiry; a handling bus 53 for transferring an analysis instruction 103 and a state verification instruction 105 from the control section 2 to the analyzing section 4; an input buffer 5 and an output buffer 6 for transferring control signals and data to and from the communication apparatus 30; a switching section 7 for automatically switching between the input buffer 5 and the output buffer 6 in response to a switching control 108 that the control section 2 issues by judging the connection characteristics based on the result of the analysis of the communication apparatus 30; a signal line 58 for transferring input/output signals 107, such as control signals and data, between the communication apparatus 30 and the switching section 7; a signal line 56 for transferring control signals and data from the switching section 7 to the control section 2 via the input buffer 5; a signal line 57 for transferring control signals and data from the control section 2 to the switching section 7 via the output buffer 6 of an open collector type; a connector 8 accommodating terminals for connecting the signal lines to the communication apparatus 30; and pull up resistors 551 and 561 for providing a high level state when nothing is connected to the respective input sections and for providing an input signal of a prescribed level to an output section of the communication apparatus 30 when in a connected condition.

The communication apparatus 30 comprises: a responding section 33 for generating the type-identifying response 106 identifying the type of the communication apparatus 30 in response to the type inquiry 104 and test output 111 from the information terminal apparatus 1; a signal line 72 for delivering the type inquiry from the information terminal apparatus 1 to the responding section 33; a signal line 74 for delivering the test output 111 from the information terminal apparatus 1 to the responding section 33; a signal line 73 for sending the type-identifying response 106 from the responding section 33 to the information terminal apparatus 1; and a signal input section (not shown) and a signal output section 34 for transferring input/output signals 107, such as control signals and data, to and from the information terminal apparatus 1.

When the communication apparatus 30 is not connected to the information terminal apparatus 1, the type-identifying response 106 to the analyzing section 4 is not generated, and the signal line 55 connected to the analyzing section 4 continually provides a high level state by the action of the pull up resistor 551. Further, since the polarity of signal input/output lines on the communication apparatus 30 is unknown, the control section 2 controls the switching section 7 by the switching control 108 so that the signal line 57 connected to the open collector type output buffer is connected to the signal line 58 connected to a terminal 804 on the connector.

To verify the connection of the communication apparatus 30, the control section 2 issues the test instruction 110 to the test section 9 via the signal line 59, and the test section 9 outputs a low state as the test output onto the signal line 60. On the other hand, the control section 2 periodically polls the analyzing section 4 by sending the analysis instruction 103 via the handling bus 53 to check the connection or non-connection of the communication apparatus 30, and in response to the analysis instruction 103, the analyzing section 4 outputs the type inquiry 104 onto the signal line 54. When the communication apparatus 30 is not connected, the analyzing section 4 receives a high state as the type-identifying response 106, and the control section 2 thus automatically recognizes that the communication apparatus 30 is not connected.

When the communication apparatus 30 is connected, a terminal 802 on the connector 8 of the information terminal apparatus 1 is connected to a terminal 312 on the connector 31 of the communication apparatus 30, a terminal 803 on the connector 8 of the information terminal apparatus 1 is connected to a terminal 313 on the connector 31 of the communication apparatus 30, and a terminal 805 on the connector 8 of the information terminal apparatus 1 is connected to a terminal 315 on the connector 31 of the communication apparatus 30, so that the type inquiry 104 from the analyzing section 4 and the test output 111 from the test section 9 are delivered to the responding section 33, the former via the signal line 72 and the latter via the signal line 74 in the communication apparatus 30. The responding section 33 provided in the communication apparatus 30 differs depending on the type of the communication apparatus, and returns the type-identifying response 106 unique to the type in response to the type inquiry from the analyzing section 4 when the test output 111 from the test section 9 is at a low level.

Figure 27:
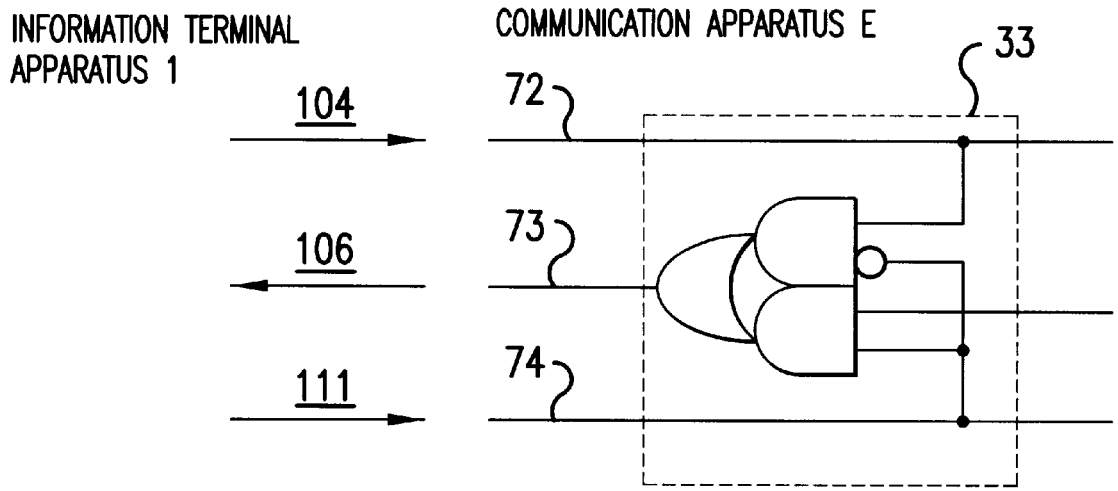
FIG. 27 is a diagram showing the configuration of a responding section along with an analyzing signal for the automatic signal switching operation according to the 10th embodiment of the invention.
Figure 28:
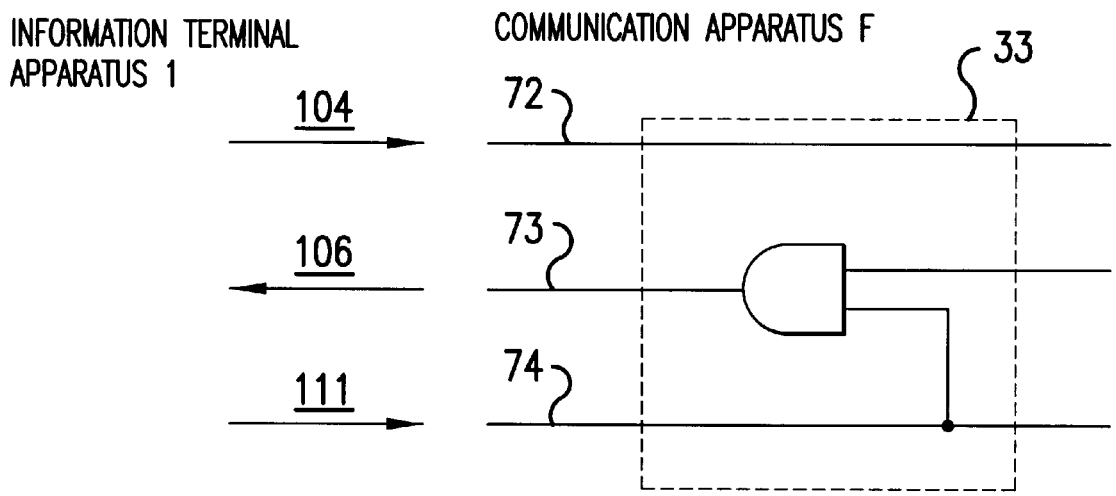
FIG. 28 is a diagram showing the configuration of the responding section along with the analyzing signal for the automatic signal switching operation according to the 10th embodiment of the invention.

FIG. 27 shows a communication apparatus E, and FIG. 28 shows a communication apparatus F. In the case of the communication apparatus E, when the test output 111 is fixed at the low level, the type inquiry 104 sent from the analyzing section 4 to the responding section 33 is returned unchanged as the type-identifying response 106 to the analyzing section 4 in the information terminal apparatus 1. In the case of the communication apparatus F, on the other hand, when the test output 111 is fixed at the low level, the responding section 4 returns a low level signal as the type-identifying response 106 to the analyzing section 4 in the information terminal apparatus 1, regardless of the type inquiry 104 from the analyzing section 4.

In FIG. 26, in the information terminal apparatus 1, the returned type-identifying response 106 is delivered to the analyzing section 4 via the signal line 55. Upon receiving the type-identifying response 106, the analyzing section 4 reports the result in response to the state verification instruction 105 sent from the control section 2 via the handling bus 53.

Figure 29:
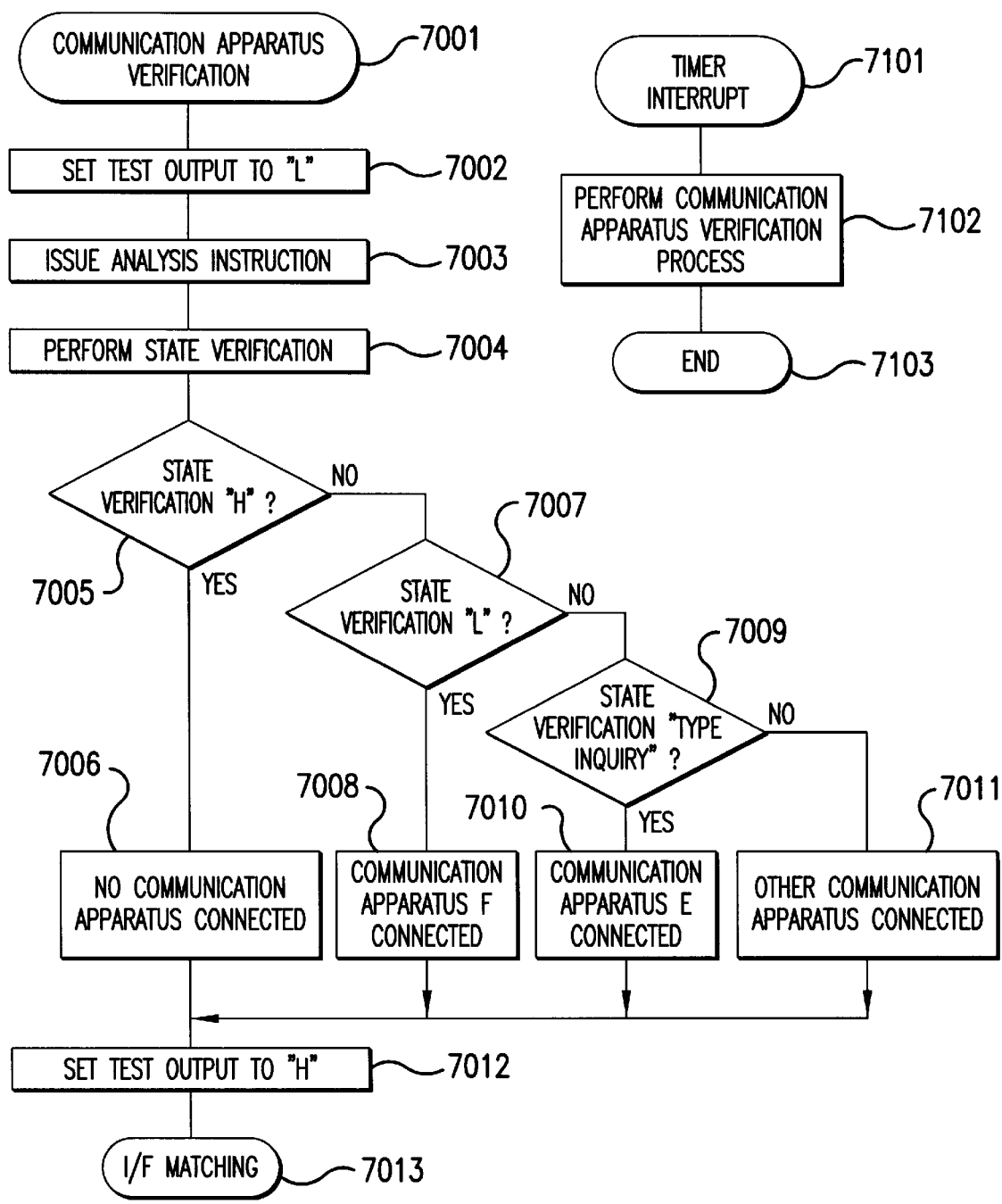
FIG. 29 is a flow chart illustrating the automatic signal switching operation according to the 10th embodiment of the invention.

FIG. 29 shows a flow chart for judging the type of the connected communication apparatus. In a communication apparatus verification process (7102) which is initiated by a periodic timer interrupt (7101), the control section 2 performs processing to recognize the connection or non-connection of a communication apparatus and the type of the connected communication apparatus. When the communication apparatus verification (7001) is started, the control section 2 first issues an instruction to the test section 9 to output a test output L (7002), and then issues an analysis instruction to the analyzing section 4 (7003), which is followed by a state verification instruction (7004) to the analyzing section 4 to wait for a report of the type-identifying response from the communication apparatus 30. When the communication apparatus 30 is not connected, since a high level H is returned as a state verification report from the analyzing section 4, the state verification is H in the next evaluation step (7005), and it is determined in the next step (7006) that no communication apparatus is connected.

When the communication apparatus F shown in FIG. 28 is connected, the responding section 33 of the communication apparatus F, when the test output 111 is fixed at the low level, returns a type-identifying response by outputting a low level L in response to the type inquiry 104 from the analyzing section 4; as a consequence, the analyzing section 4 returns a report L in response to the state verification instruction from the control section 2, so that the NO branch of the evaluation step (7005) is followed to proceed to the next evaluation step (7007). Since the state verification report is L in the evaluation step (7007), the process proceeds to the next step (7008) to determine that the communication apparatus F has been connected. On the other hand, when the communication apparatus E is connected, the responding section 33 of the communication apparatus E, when the test output 111 is fixed at the low level, returns the type inquiry 104, received from the analyzing section 4, unchanged as the type-identifying response 106 to the analyzing section 4 in the information terminal apparatus 1; as a consequence, the analyzing section 4 returns a report "type inquiry" in response to the state verification instruction from the control section 2, so that the NO branch of the evaluation step (7005) is followed and also the NO branch of the evaluation step (7007) is followed to proceed to the next evaluation step (7009). Since the state verification is the type inquiry in the evaluation step (7009), it is determined that the communication apparatus E has been connected. In this example, any arbitrary type of communication apparatus can be identified by the type-identifying response returned from the communication apparatus.

In FIG. 26, matching to the characteristics of the signal input/output sections of the communication apparatus 30 is done by recognizing the type of the connected communication apparatus 30 from the report obtained in response to the state verification 105; to achieve this, the control section 2 sends the switching control 108 to the switching section 7 so that control signals and data can be transferred between the information terminal apparatus 1 and the communication apparatus 30.

In FIG. 26, the circuit block for transferring the control signals and data between the information terminal apparatus 1 and the communication apparatus is shown as having only one control path, but by providing a plurality of switching controls, an interface for transferring control signals and data using multiple paths can be achieved. When the communication apparatus is provided with a notifying section that sends the connected state and the attribute of the communication apparatus when the communication apparatus is connected to the information terminal apparatus 1, if the judging section of the first embodiment is provided in the information terminal apparatus 1, polling by the analyzing section 4 is not needed and the control section 2 can immediately issue an inquiry about the type of the connected communication apparatus, since the connecting of the communication apparatus to the information terminal apparatus 1 and the attribute of the connected communication apparatus can be detected through the notifying section 4.

Embodiment 11

Figure 30:
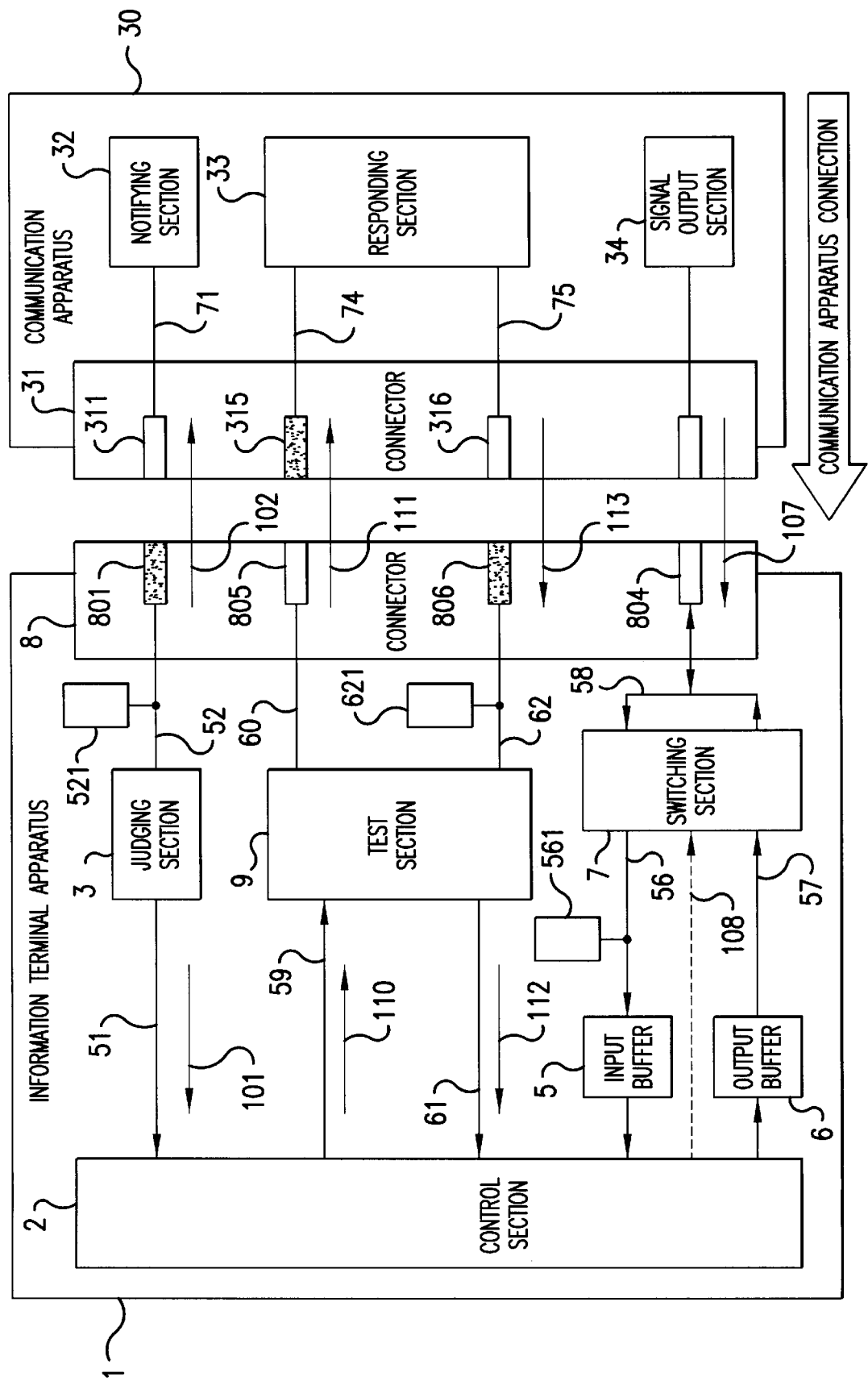
FIG. 30 is a block diagram showing the configuration for implementing an automatic signal switching operation according to 11th and 12th embodiments of the invention.

As shown in FIG. 30, in an 11th embodiment, an information terminal apparatus 1 comprises: a control section 2 for controlling an interface connecting between the information terminal apparatus 1 and communication apparatus 30; a judging section 3, connected to the control section 2, for producing a report corresponding to a connection notification 102 received from the communication apparatus 30; a signal line 52 for the judging section 3 to receive the connection notification 102 from the communication apparatus 30; an interrupt line 51 for reporting a judgement result 101 from the judging section 3 to the control section 2; a test section 9 for producing a test output 111 to assist in identifying the type of the connected communication apparatus 30; a signal line 59 for sending a test instruction 110 from the control section 2 to the test section 9; a signal line 60 for sending the test output 111 from the test section 9 to the communication apparatus 30; a signal line 62 for the test section 9 to receive a test input 113 from the communication apparatus 30; a test report interrupt line 61 for sending a test report 112 from the test section 9 to the control section 2; an input buffer 5 and an output buffer 6 for the control section 2 to transfer control signals and data to and from the communication apparatus 30; a switching section 7 for automatically switching between the input buffer 5 and the output buffer 6 in response to a switching control 108 that the control section 2 issues by judging the connection characteristics based on the result of the test of the communication apparatus 30; a signal line 58 for transferring input/output signals 107, such as control signals and data, between the communication apparatus 30 and the switching section 7; a signal line 56 for transferring control signals and data from the switching section 7 to the control section 2 via the input buffer 5; a signal line 57 for transferring control signals and data from the control section 2 to the switching section 7 via the output buffer 6 of an open collector type; a connector 8 accommodating terminals for connecting the signal lines to the communication apparatus 30; and pull up resistors 521, 561, and 621 for providing a high level state when nothing is connected to the respective input sections and for providing an input signal of a prescribed level to an output section of the communication apparatus 30 when in a connected condition.

The communication apparatus 30 comprises: a responding section 33 for generating the test input 113 as a response of the communication apparatus 30 by receiving the test output 111 from the information terminal apparatus 1; a signal line 74 for delivering the test output 111 from the information terminal apparatus 1 to the responding section 33; a signal line 75 for sending the test input 113 from the responding section 33 to the information terminal apparatus 1; and a signal input section (not shown) and a signal output section 34 for transferring input/output signals 107, such as control signals and data, to and from the information terminal apparatus 1.

When the communication apparatus 30 is not connected to the information terminal apparatus 1, since the polarity of signal input/output lines on the communication apparatus 30 is unknown, the control section 2 controls the switching section 7 by the switching control 108 so that the signal line 57 connected to the open collector type output buffer is connected to the signal line 58 connected to a terminal 804 on the connector.

Upon verifying the connection of the communication apparatus 30 through the judging section 3 in the same manner as the fourth embodiment, the control section 2 sends the test instruction 110 to the test section 9 via the signal line 59, whereupon the test section 9 outputs a low level L as the test output 111 onto the signal line 60. The responding section 33 provided in the communication apparatus 30 differs depending on the type of the communication apparatus, and returns the test input 113 unique to the type in response to the test output 111 from the test section 9.

Figure 31:
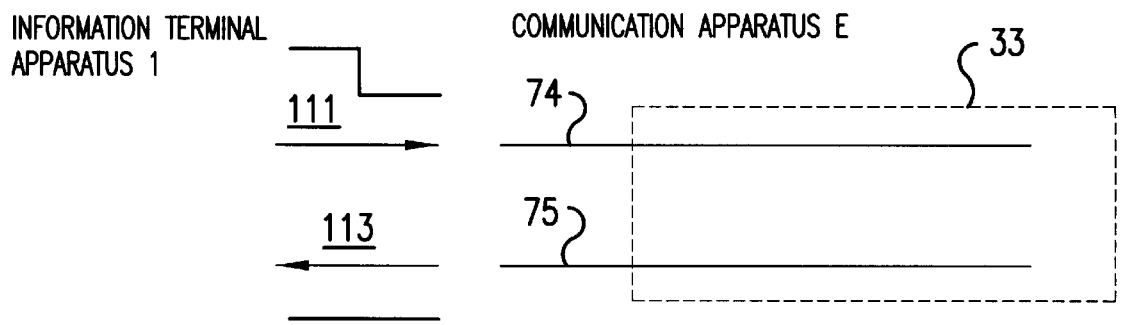
FIG. 31 is a diagram showing the configuration of a responding section along with an analyzing signal for the automatic signal switching operation according to the 11th embodiment of the invention.
Figure 32:
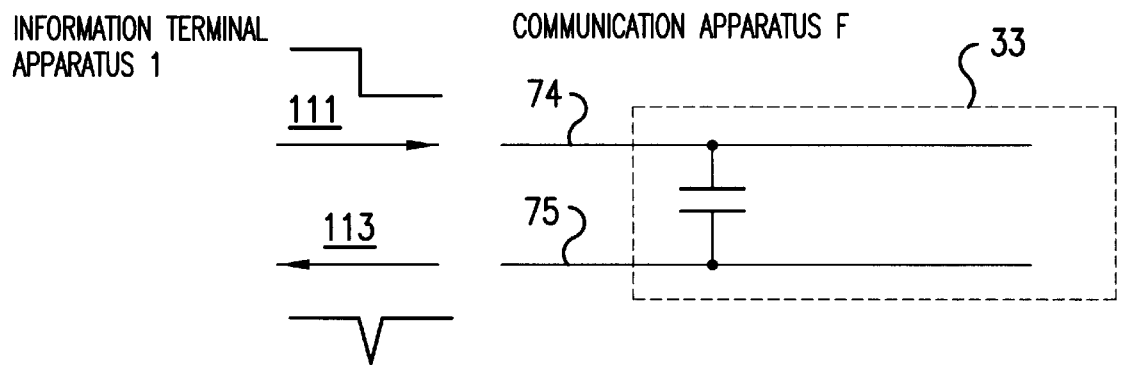
FIG. 32 is a diagram showing the configuration of the responding section along with the analyzing signal for the automatic signal switching operation according to the 11th embodiment of the invention.

FIG. 31 shows a communication apparatus E, and FIG. 32 shows a communication apparatus F. In the responding section 33 of the communication apparatus E, if the test output 111 changes to L, there occurs no change in the test input 113 returned as a response; as a result, the test section 9 determines that there is no state change in response to the test output 111, and sends the test report 112 to the control section 2 which then recognizes the connection of the communication apparatus E. On the other hand, in the responding section 33 of the communication apparatus F, when the test output 111 changes to L, a pulse occurs in the test input 113 due to capacitive coupling. This pulse is interpreted by the test section 9 as being a state change associated with the test output 111, and the test section 9 sends the test report 112 to the control section 2 which then recognizes the connection of the communication apparatus F.

Figure 33:
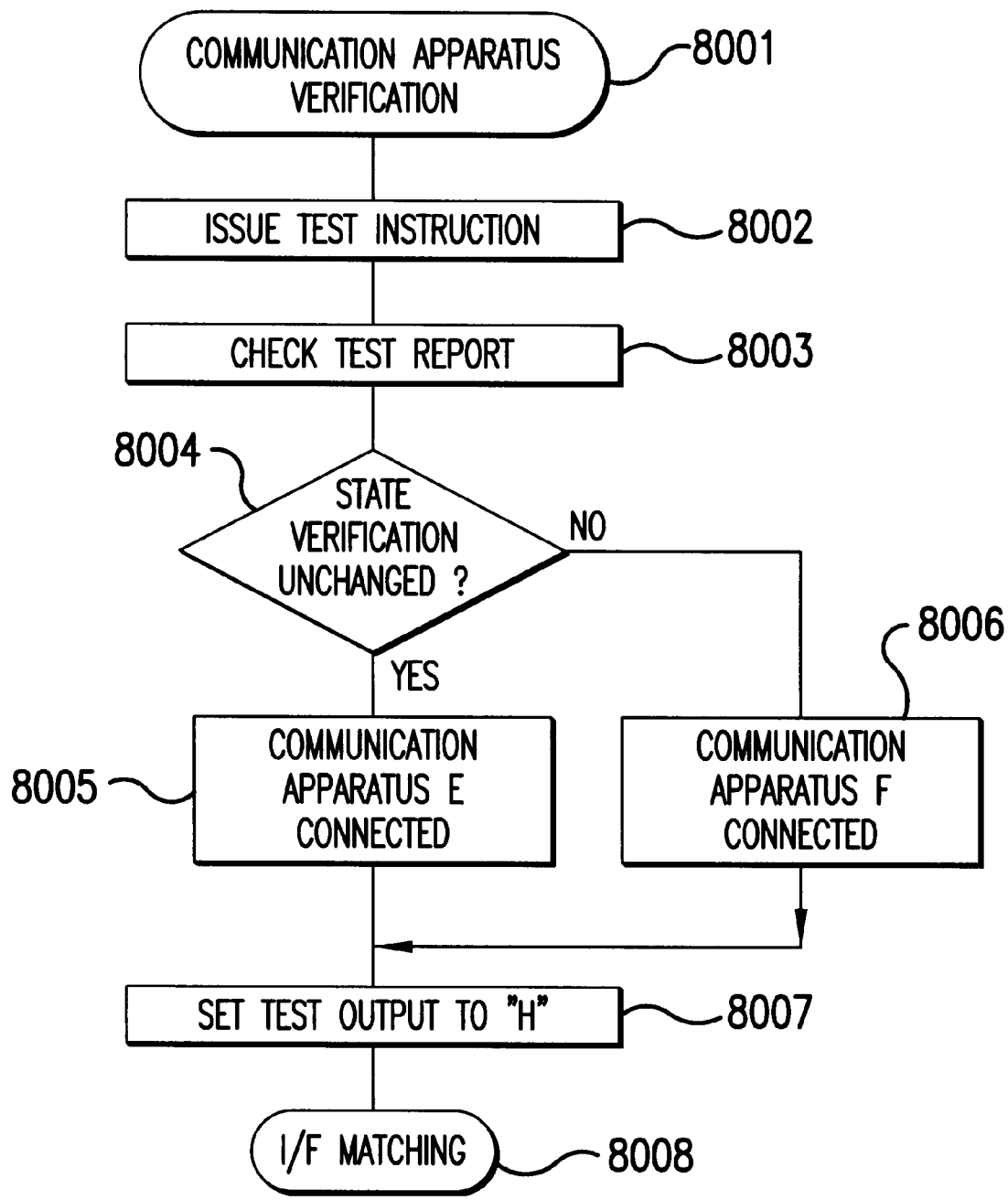
FIG. 33 is a flow chart illustrating the automatic signal switching operation according to the 11th embodiment of the invention.

FIG. 33 shows a flow chart for judging the type of the connected communication apparatus. When the connection of the communication apparatus 30 is verified through the judging section 3, the control section 2 initiates a communication apparatus verification process 8001. First, the control section 2 issues a test instruction to the test section 9 (8002). In response, the test section 9 outputs a test output L. Next, the process proceeds to the test report checking step (8003) to receive a report of the test input from the communication apparatus 30.

When the communication apparatus E shown in FIG. 31 is connected, since there occurs no change in the test input returned from the communication apparatus E as a response to the test output, it is determined that there is no state change (8004), and the process proceeds to the next step (8005) where it is determined that the communication apparatus E has been connected. On the other hand, when the communication apparatus F shown in FIG. 32 is connected, since the communication apparatus F responds to the test output by a pulse-like test input, the NO branch of the decision step (8004) is followed to proceed to the next step (8006) where it is determined that the communication apparatus F has been connected. In either case, the test output is returned to H (8007) to terminate the process, and I/F matching is performed (8008).

In FIG. 30, matching to the characteristics of the signal input/output sections of the communication apparatus 30 is done by recognizing the type of the connected communication apparatus 30 from the report obtained in response to the state verification 105; to achieve-this, the control section 2 sends the switching control 108 to the switching section 7 so that control signals and data can be transferred between the information terminal apparatus 1 and the communication apparatus 30.

In FIG. 30, the circuit block for transferring the control signals and data between the information terminal apparatus 1 and the communication apparatus is shown as having only one control path, but by providing a plurality of switching controls, an interface for transferring control signals and data using multiple paths can be achieved.

Embodiment 12

As shown in FIG. 30, in a 12th embodiment, an information terminal apparatus 1 comprises: a control section 2 for controlling an interface connecting between the information terminal apparatus 1 and communication apparatus 30; a judging section 3, connected to the control section 2, for producing a report corresponding to a connection notification 102 received from the communication apparatus 30; a signal line 52 for the judging section 3 to receive the connection notification 102 from the communication apparatus 30; an interrupt line 51 for reporting a judgement result 101 from the judging section 3 to the control section 2; a test section 9 for producing a test output 111 to assist in identifying the type of the connected communication apparatus 30; a signal line 59 for sending a test instruction 110 from the control section 2 to the test section 9; a signal line 60 for sending the test output 111 from the test section 9 to the communication apparatus 30; a signal line 62 for the test section 9 to receive a test input 113 from the communication apparatus 30; a test report interrupt line 61 for sending a test report 112 from the test section 9 to the control section 2; an input buffer 5 and an output buffer 6 for the control section 2 to transfer control signals and data to and from the communication apparatus 30; a switching section 7 for automatically switching between the input buffer 5 and the output buffer 6 in response to a switching control 108 that the control section 2 issues by judging the connection characteristics based on the result of the test of the communication apparatus 30; a signal line 58 for transferring input/output signals 107, such as control signals and data, between the communication apparatus 30 and the switching section 7; a signal line 56 for transferring control signals and data from the switching section 7 to the control section 2 via the input buffer 5; a signal line 57 for transferring control signals and data from the control section 2 to the switching section 7 via the output buffer 6 of an open collector type; a connector 8 accommodating terminals for connecting the signal lines to the communication apparatus 30; and pull up resistors 521, 561, and 621 for providing a high level state when nothing is connected to the respective input sections and for providing an input signal of a prescribed level to an output section of the communication apparatus 30 when in a connected condition.

The communication apparatus 30 comprises: a responding section 33 for generating the test input 113 as a response of the communication apparatus 30 by receiving the test output 111 from the information terminal apparatus 1; a signal line 74 for delivering the test output 111 from the information terminal apparatus 1 to the responding section 33; a signal line 75 for sending the test input 113 from the responding section 33 to the information terminal apparatus 1; and a signal input section (not shown) and a signal output section 34 for transferring input/output signals 107, such as control signals and data, to and from the information terminal apparatus 1.

When the communication apparatus 30 is not connected to the information terminal apparatus 1, since the polarity of signal input/output lines on the communication apparatus 30 is unknown, the control section 2 controls the switching section 7 by the switching control 108 so that the signal line 57 connected to the open collector type output buffer is connected to the signal line 58 connected to a terminal 804 on the connector.

When the beginning of the connection of the communication apparatus 30 is detected by receiving a connection notifying interrupt at the judging section 3, the control section 2 sends the test instruction 110 to the test section 9 via the signal line 59, whereupon the test section 9 outputs a low level L as the test output 111 onto the signal line 60. In the communication apparatus 30, since the test output 111 is looped back as the test input 113, when the test output 111 of a low level L is delivered, a low level L is returned as the test input 113. Here, the connector configuration is such that a time lag occurs between the time a type-identifying terminal, which differs according to the type of the communication apparatus 30, is connected and the time a terminal 316 to which the test input 113 is coupled is connected to the corresponding terminal on the connector of the information terminal apparatus 1, and the time lag can be varied according to the type of the communication apparatus.

Figure 34:
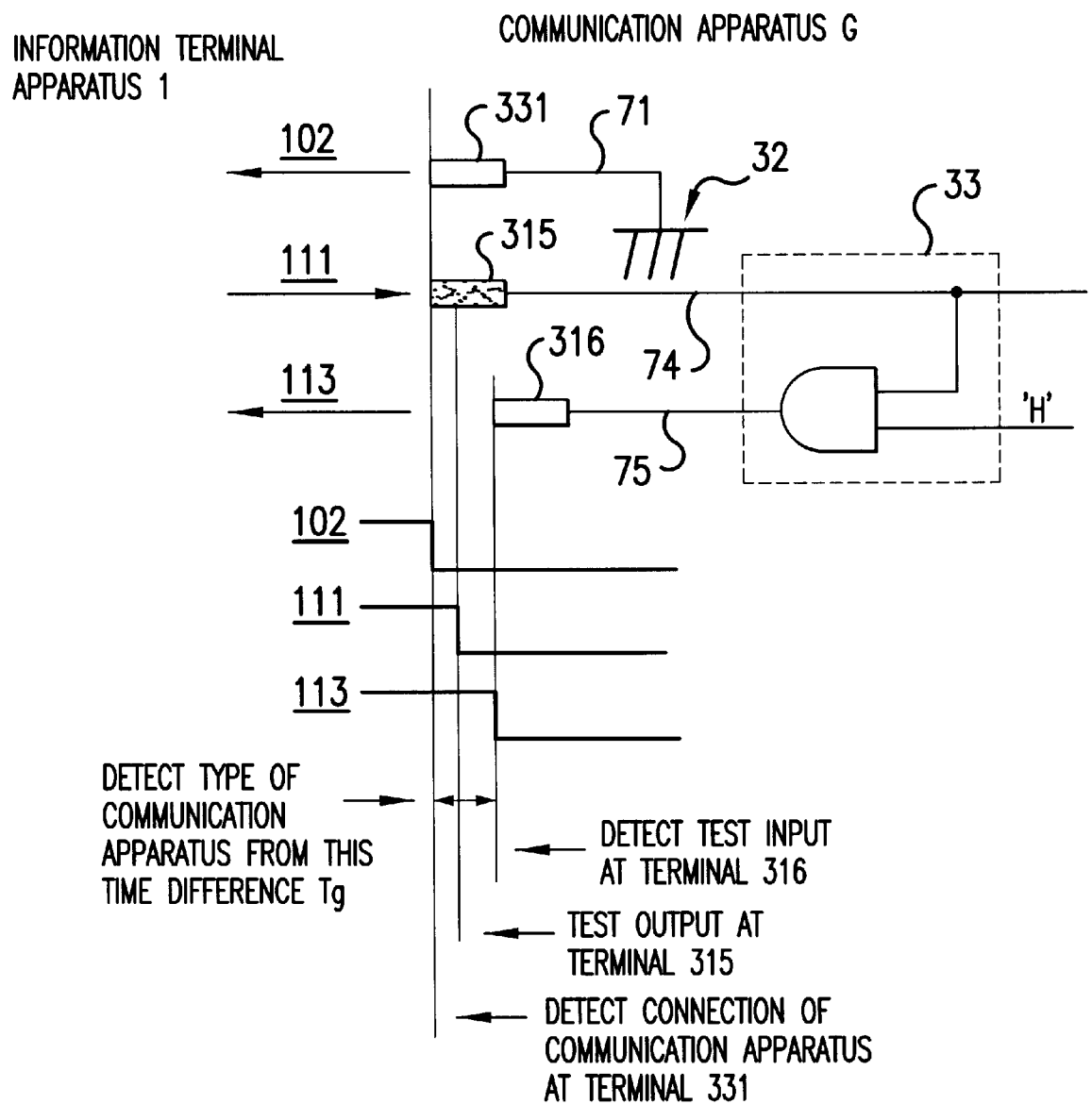
FIG. 34 is a diagram showing the configuration of a responding section along with an analyzing signal for the automatic signal switching operation according to the 12th embodiment of the invention.
Figure 35:
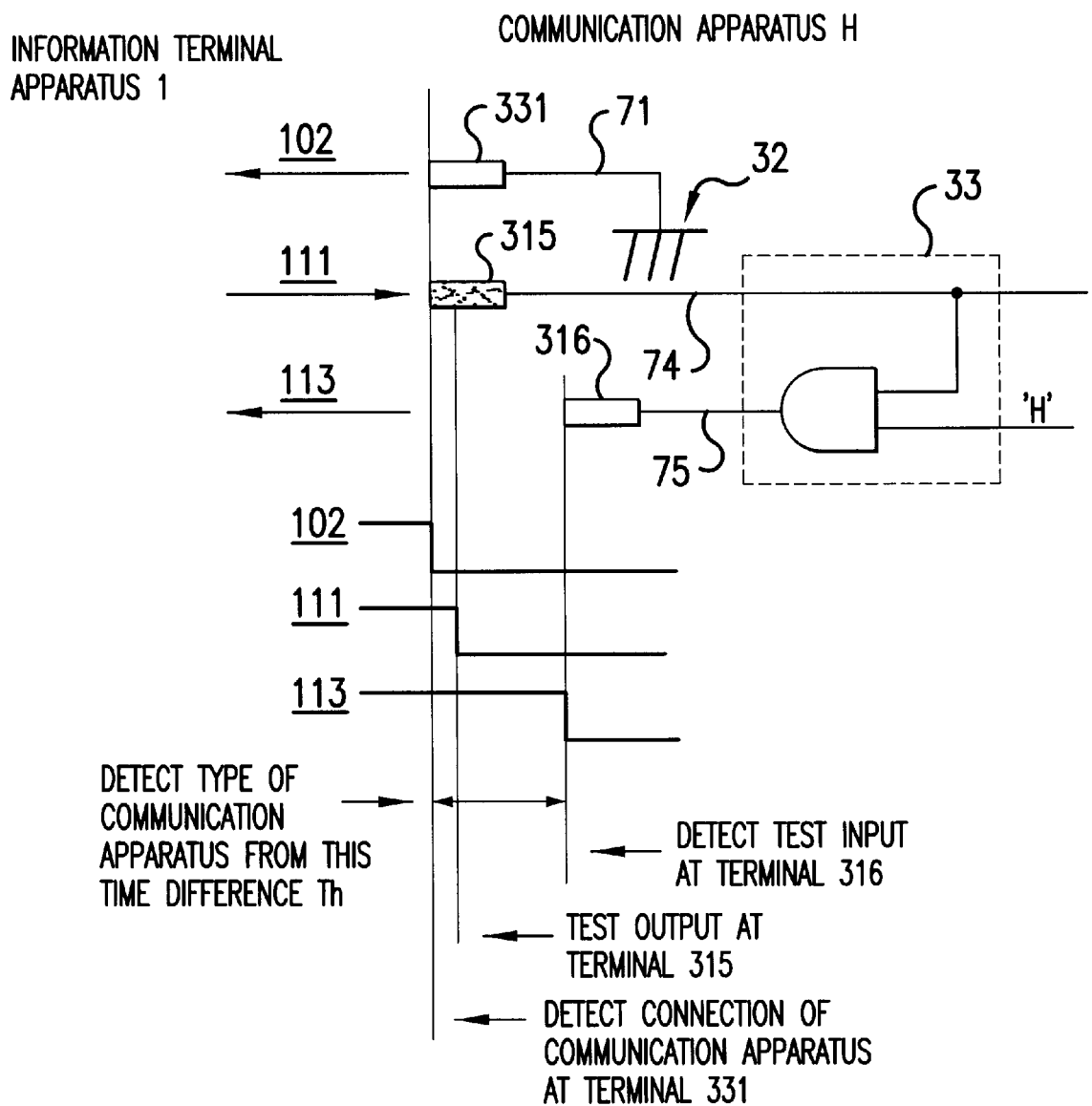
FIG. 35 is a diagram showing the configuration of the responding section along with the analyzing signal for the automatic signal switching operation according to the 12th embodiment of the invention.

FIG. 34 shows a communication apparatus G, and FIG. 35 shows a communication apparatus H. In the responding section 33 of the communication apparatus G, when the beginning of the connection of the communication apparatus G is detected by the judging section 3 of the information terminal apparatus 1, and the low level L is output on the test output 111, the low level L appears at the test input 113 with a delay of time Tg from the beginning of the connector connection. This gives rise to a test report interrupt which causes the test section 9 to send a test report to the control section 2. In the responding section 33 of the communication apparatus H, on the other hand, when the beginning of the connection of the communication apparatus H is detected by the judging section 3 of the information terminal apparatus 1, and the low level L is output on the test output 111, the low level L appears at the test input 113 with a delay of time Th from the beginning of the connector connection. This gives rise to a test report interrupt which causes the test section 9 to send a test report to the control section 2.

Figure 36:
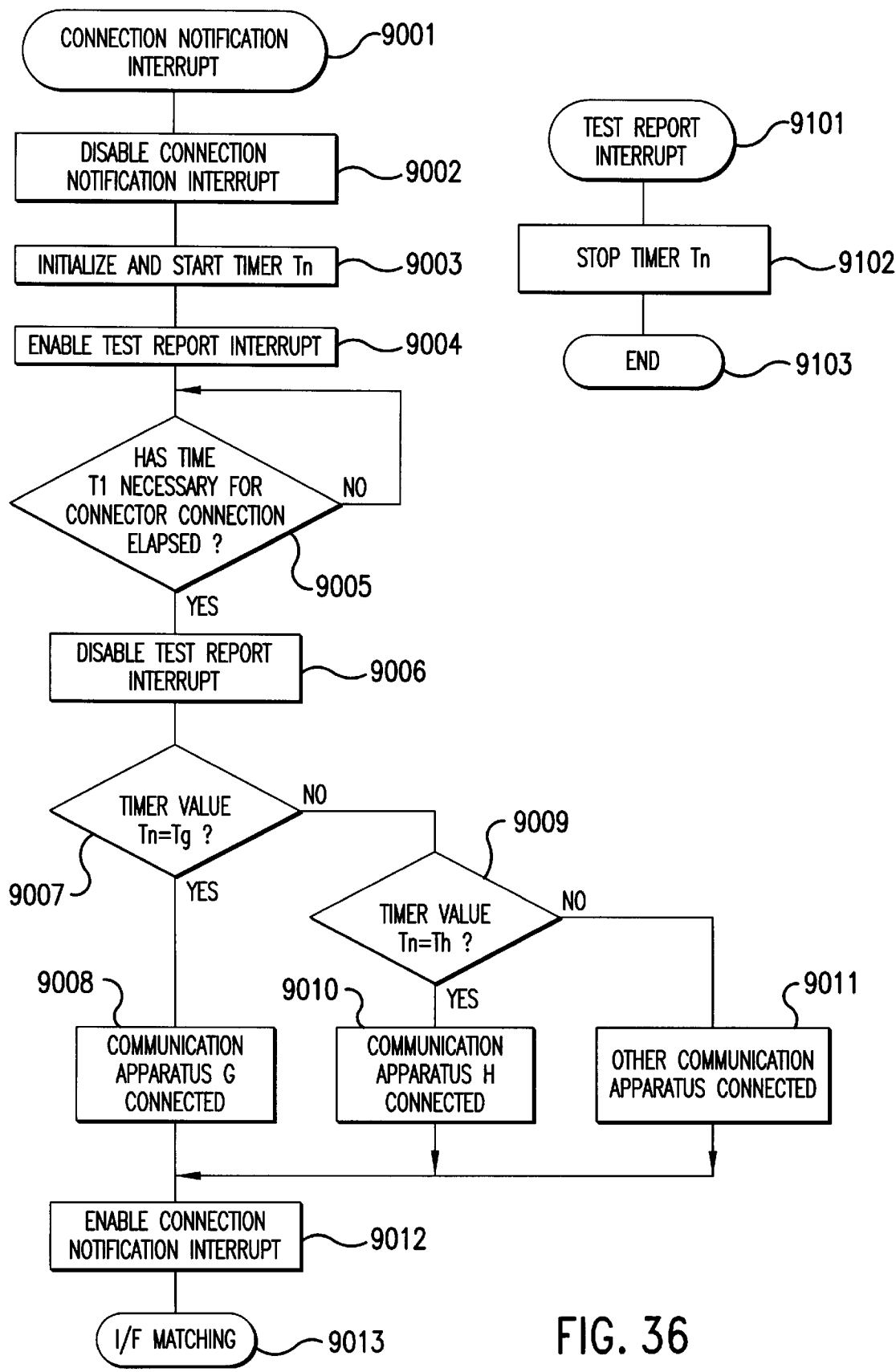
FIG. 36 is a flow chart illustrating the automatic signal switching operation according to the 12th embodiment of the invention.

FIG. 36 shows a flow chart for judging the type of the connected communication apparatus. The judging process is carried out by making use of the value of time Tn necessary for connector connection from the time the connection notification interrupt is caused to the time the connection of the test input is completed. When the communication apparatus 30 is connected to the information terminal apparatus 1, the connection notification interrupt occurs to initiate the processing sequence (9001). When the judging process is started, a connection notification interrupt disable step (9002) is carried out in order to prevent multiple occurrences of the connection notification interrupt during time T1. Next, the step of initializing the timer value Tn is carried out (9003). Then, after carrying out a test report interrupt enable step (9004), the process proceeds to the step (9005) to determine whether the time T1 necessary for the connector connection has elapsed or not. When the test report interrupt enable step (9004) is carried out in the connection interrupt process, a test report interrupt process (9101) is initiated, and stops the timer Tn (9102) when the test report interrupt occurs; after that, the process is terminated (9103). When the waiting time T1 necessary for the connector connection has elapsed in the connection interrupt process, a test report interrupt disable process (9006) is carried out to prevent an illegal test report interrupt from occurring after the time T1 necessary for the connector connection has elapsed. Next, the process proceeds to the step (9007) of judging the attribute of the communication apparatus from the timer value obtained by the test report interrupt.

When the communication apparatus G of FIG. 34 is connected, since the control section 2 issues a test report interrupt after the time Tg following the connection notification interrupt, Tn=Tg in the evaluation step (9007) and it is determined in the next step (9008) that the communication apparatus G has been connected, after which the judging process is terminated. On the other hand, when the communication apparatus H of FIG. 35 is connected, since the judging section 3 issues a test report interrupt after the time Th following the connection notification interrupt, Tn is not Tg in the evaluation step (9007) and Tn=Th in the next evaluation step (9009); then, it is determined in the next step (9010) that the communication apparatus H has been connected, after which the judging process is terminated. In this embodiment, any arbitrary kind of attribute can be judged by suitably setting the time lag required to complete the connection of the test input terminal on the communication apparatus.

When the judging process is terminated, a connection notification interrupt enable step (9012) is carried out to enable the automatic judgement for the next communication apparatus to be connected. The whole process for judging the attribute of the connected communication apparatus is thus terminated, and I/F matching (9013) is performed.

In FIG. 30, matching to the characteristics of the signal input/output sections of the communication apparatus 30 is done by recognizing the type of the connected communication apparatus 30 from the report obtained in response to the state verification 105; to achieve this, the control section 2 sends the switching control 108 to the switching section 7 so that control signals and data can be transferred between the information terminal apparatus 1 and the communication apparatus 30.

In FIG. 30, the circuit block for transferring the control signals and data between the information terminal apparatus 1 and the communication apparatus is shown as having only one control path, but by providing a plurality of switching controls, an interface for transferring control signals and data using multiple paths can be achieved.

Embodiment 13

Figure 37:
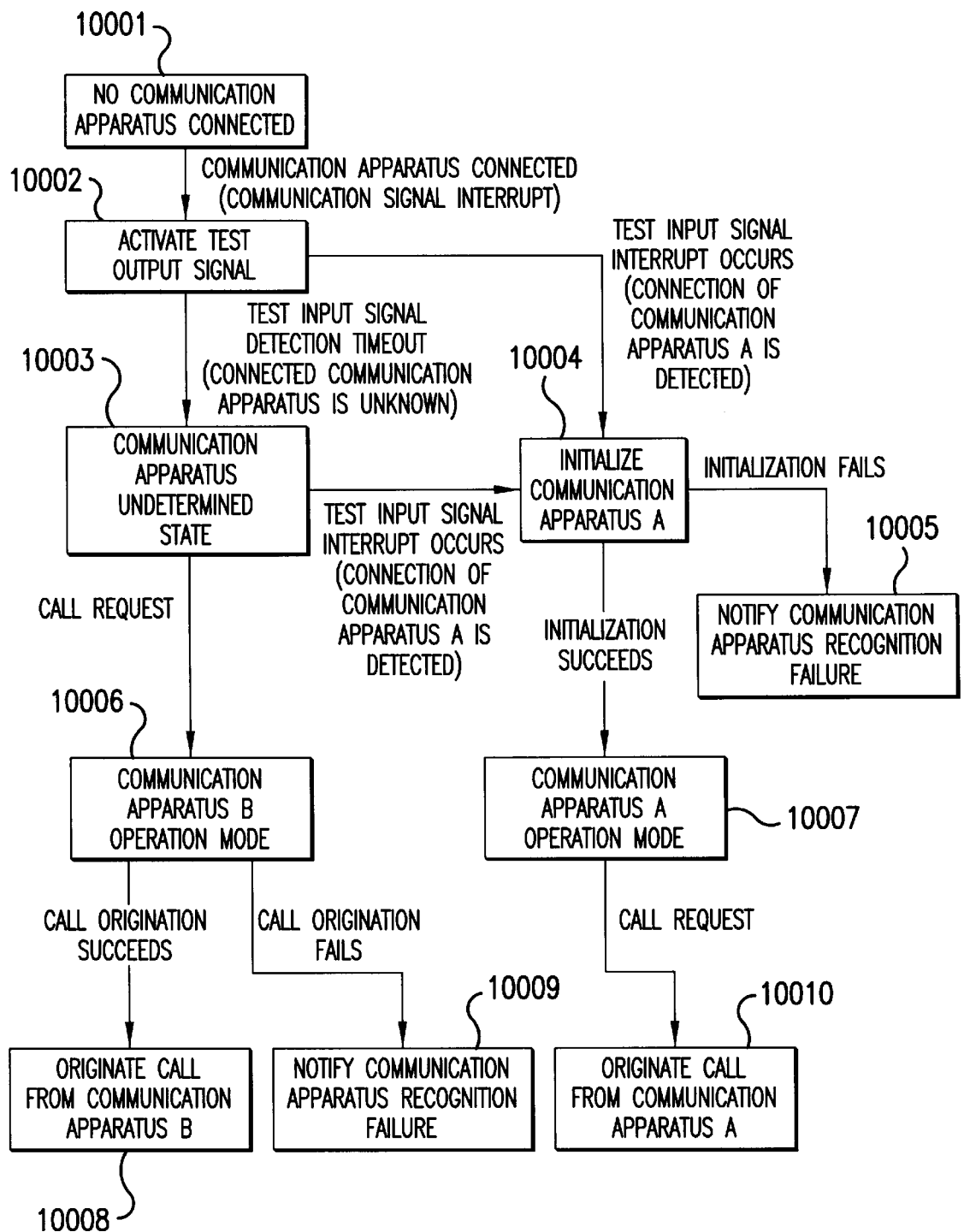
FIG. 37 is an explanatory diagram showing a communication apparatus detection process sequence for an automatic signal switching operation according to 13th and 14th embodiments of the invention.
Figure 43:
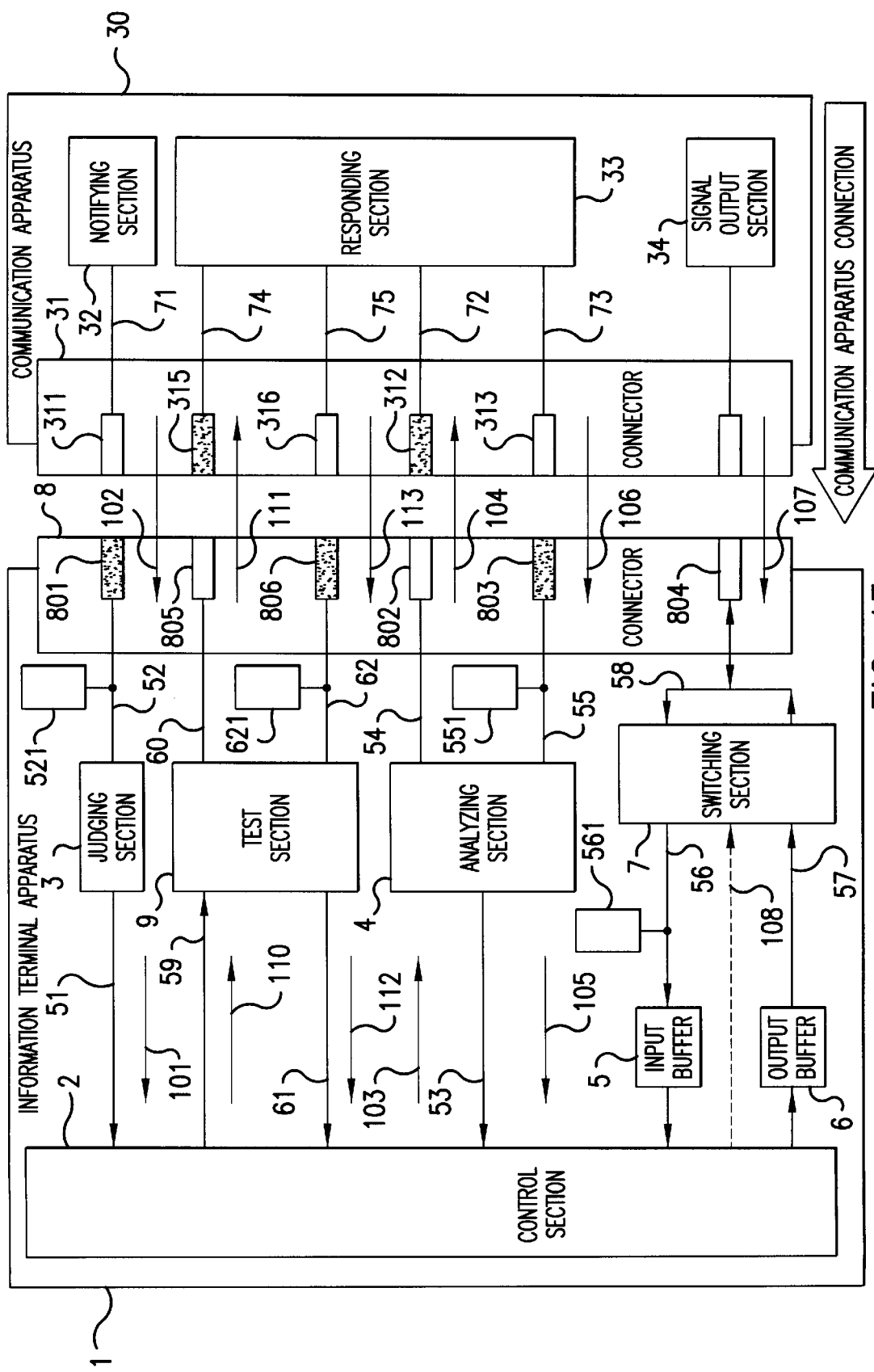
FIG. 43 is a block diagram showing the configuration for implementing the automatic signal switching operation according to the 13th to 19th embodiments of the invention.

FIG. 43 is a conceptual diagram showing the configuration for implementing the automatic signal switching operation of the invention, and FIG. 37 is a diagram illustrating one embodiment of a communication apparatus detection process.

With no communication apparatus 30 connected to the interface of the information terminal apparatus 1 (10001), when the communication apparatus 30 is connected to the connector of the information terminal apparatus 1, an interrupt occurs from the judging section 3 by a signal change on the notification signal line, and the control section 2 notifies the test section 9 to activate the test output signal line (10002). After that, the control section 2 starts a timer T1 and waits for an interrupt notification to occur from the test section 9 by a signal change on the test input signal line.

Suppose here that a communication apparatus A of speed A is connected. Since the communication apparatus A has a signal line control function by which the responding section 33 activates the test input signal line in response to the activation of the test output signal line from the information terminal apparatus 1, the test section 9 detects the signal change on the test input signal line, and notifies the control section 2 by causing an interrupt. The control section 2 thus detects the connection of the communication apparatus A, stops the timer T1, and initializes the communication apparatus A (10004).

On the other hand, when a communication apparatus B of speed B is connected, the signal on the test input signal line does not change because the communication apparatus B does not have a signal line control function by which the responding section 33 activates the test input signal line in response to the activation of the test output signal line from the information terminal apparatus 1. When the communication apparatus A in a power OFF state is connected, the signal on the test input signal line also remains unchanged. If an interrupt due to a signal change on the test input signal line does not occur from the test section 9 within the predetermined time T1, the control section 2 decides that the timer T1 has timed out, and determines that the communication apparatus connected to the connector is either the communication apparatus B or the communication apparatus A in a power OFF state (10003).

By performing the above process sequence, the communication apparatus detection process for the automatic signal switching operation according to the 14th invention is accomplished.

Embodiment 14

FIG. 43 is a conceptual diagram showing the configuration for implementing the automatic signal switching operation according to the invention, and FIG. 37 is a diagram illustrating one embodiment of the communication apparatus detection process.

In the communication apparatus undetermined state (10003) in which the connected communication apparatus 30 is judged to be either the communication apparatus B or the communication apparatus A in a power OFF state, the control section 2 monitors an interrupt notification to occur by a signal change on the test input signal line while the timer T1 used to wait for an interrupt notification to occur by a signal change on the test input signal line is held in the stopped condition.

Here, when the communication apparatus A changes from the power OFF to the power ON state, the responding section 33 of the communication apparatus activates the test input signal line; as a result, the control section 2 detects the connection of the communication apparatus A by the interrupt notification caused by the signal change on the test input signal line, and initializes the communication apparatus A (10004). If the initialization procedure failed, a communication apparatus recognition failure notification is issued, and the process is terminated (10005).

When the initialization procedure is successfully accomplished, the control section 2 switches to communication apparatus A operation mode, and notifies the switching section 7 to switch the input/output lines to the communication apparatus A mode (10007). Thereafter, when a call request is received from an application, a call origination procedure is performed to connect the call with speed A (10010).

On the other hand, in the communication apparatus undetermined state (10003), when a call request is received from an application, the control section 2 switches to communication apparatus B operation mode, and notifies the switching section 7 to switch the input/output lines to the communication apparatus B mode (10006). Then, a call origination procedure is tried with speed B, and if the procedure is successfully accomplished, a normal call is originated (10008).

If the procedure failed, on the other hand, it can be determined that the communication apparatus 30 is in the power OFF state, and a communication apparatus recognition failure is notified (10009).

By performing the above process sequence, the communication apparatus detection process for the automatic signal switching operation according to the 15th invention is accomplished.

Embodiment 15

Figure 38:
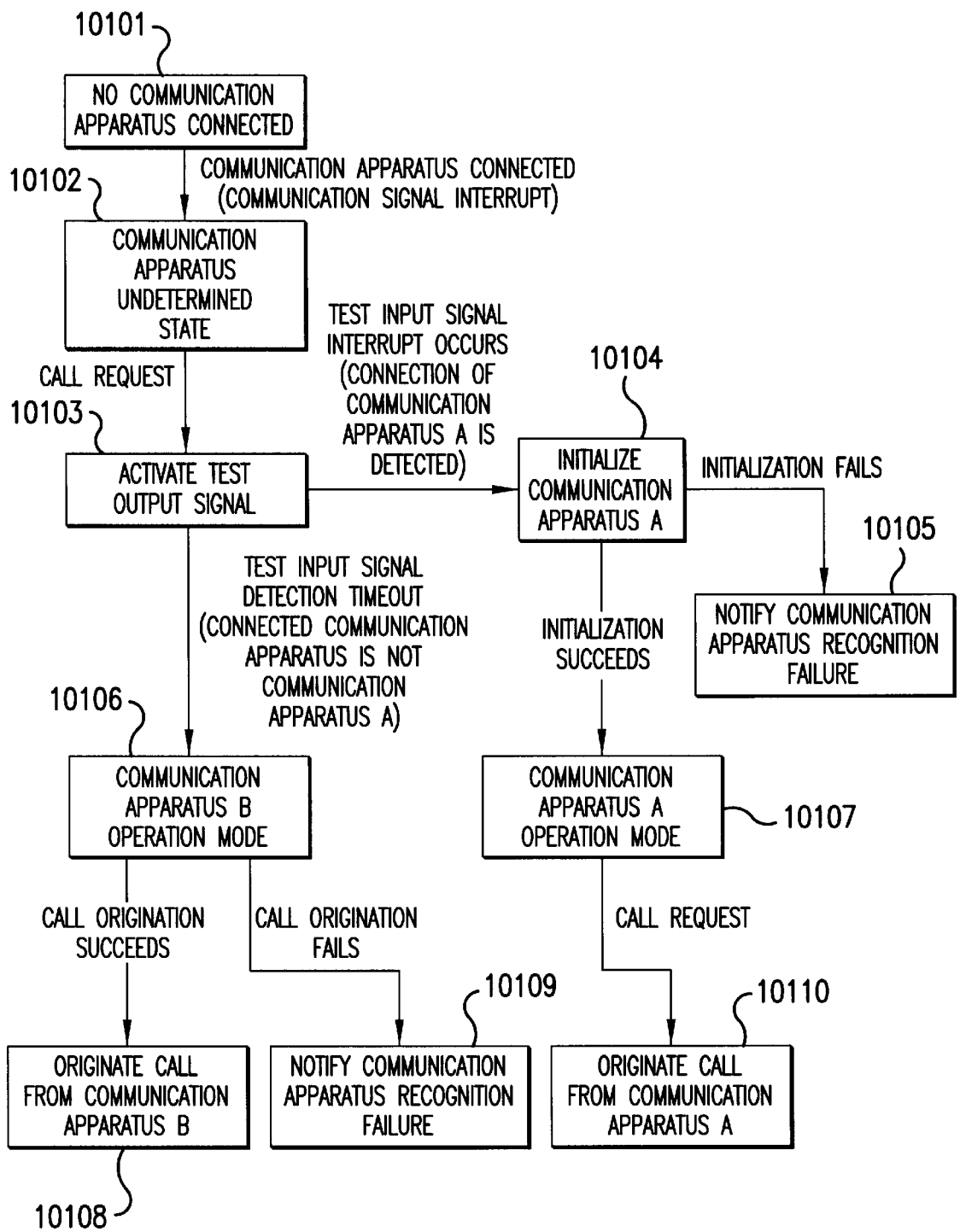
FIG. 38 is an explanatory diagram showing a communication apparatus detection process sequence for an automatic signal switching operation according to a 15th embodiment of the invention.

FIG. 43 is a conceptual diagram showing the configuration for implementing the automatic signal switching operation according to the invention, and FIG. 38 is a diagram illustrating one embodiment of the communication apparatus detection process.

With no communication apparatus 30 connected to the interface of the information terminal apparatus 1 (10101), when the communication apparatus 30 is connected to the connector of the information terminal apparatus 1, an interrupt occurs from the judging section 3 by a signal change on the notification signal line, and the control section 2 makes a transition to the communication apparatus undetermined state in which the communication apparatus 30 is not yet recognized (10102). When a call request is received from an application, the control section 2 notifies the test section 9 to active the test output signal line (10103). After that, the control section 2 starts the timer T1 and waits for an interrupt notification to occur from the test section 9 by a signal change on the test input signal line.

Suppose here that a communication apparatus A of speed A is connected. Since the communication apparatus A has a signal line control function by which the responding section 33 activates the test input signal line in response to the activation of the test output signal line from the information terminal apparatus 1, the test section 9 detects the signal change on the test input signal line, and notifies the control section 2 by causing an interrupt. The control section 2 thus detects the connection of the communication apparatus A, stops the timer T1, and initializes the communication apparatus A (10104). If the initialization procedure failed, a communication apparatus recognition failure notification is issued, and the process is terminated (10105).

When the initialization procedure is successfully accomplished, the control section 2 switches to communication apparatus A operation mode, and notifies the switching section 7 to switch the input/output lines to the communication apparatus A mode (10107). Thereafter, when a call request is received from the application, a call origination procedure is performed to accomplish the call origination with speed A (10110).

On the other hand, when a communication apparatus B of speed B is connected, the signal on the test input signal line does not change because the communication apparatus B does not have a signal line control function by which the responding section 33 activates the test input signal line in response to the activation of the test output signal line from the information terminal apparatus 1. When the communication apparatus A in a power OFF state is connected, the signal on the test input signal line also remains unchanged. If an interrupt due to a signal change on the test input signal line does not occur from the test section 9 within the predetermined time T1, the control section 2 decides that the timer T1 has timed out, and determines that the communication apparatus 30 connected to the connector is either the communication apparatus B or the communication apparatus A in a power OFF state. The control section 2 then switches to communication apparatus B operation mode, and notifies the switching section 7 to switch the input/output lines to the communication apparatus B mode (10106). Then, a call origination procedure is tried with speed B, and if the procedure is successfully accomplished, a normal call is established (10108). If the procedure failed, on the other hand, it can be determined that the communication apparatus is in the power OFF state, and a communication apparatus recognition failure notification is issued (10109). By performing the above process sequence, the communication apparatus detection process for the automatic signal switching operation according to the 16th invention is accomplished.

Embodiment 16

Figure 39:
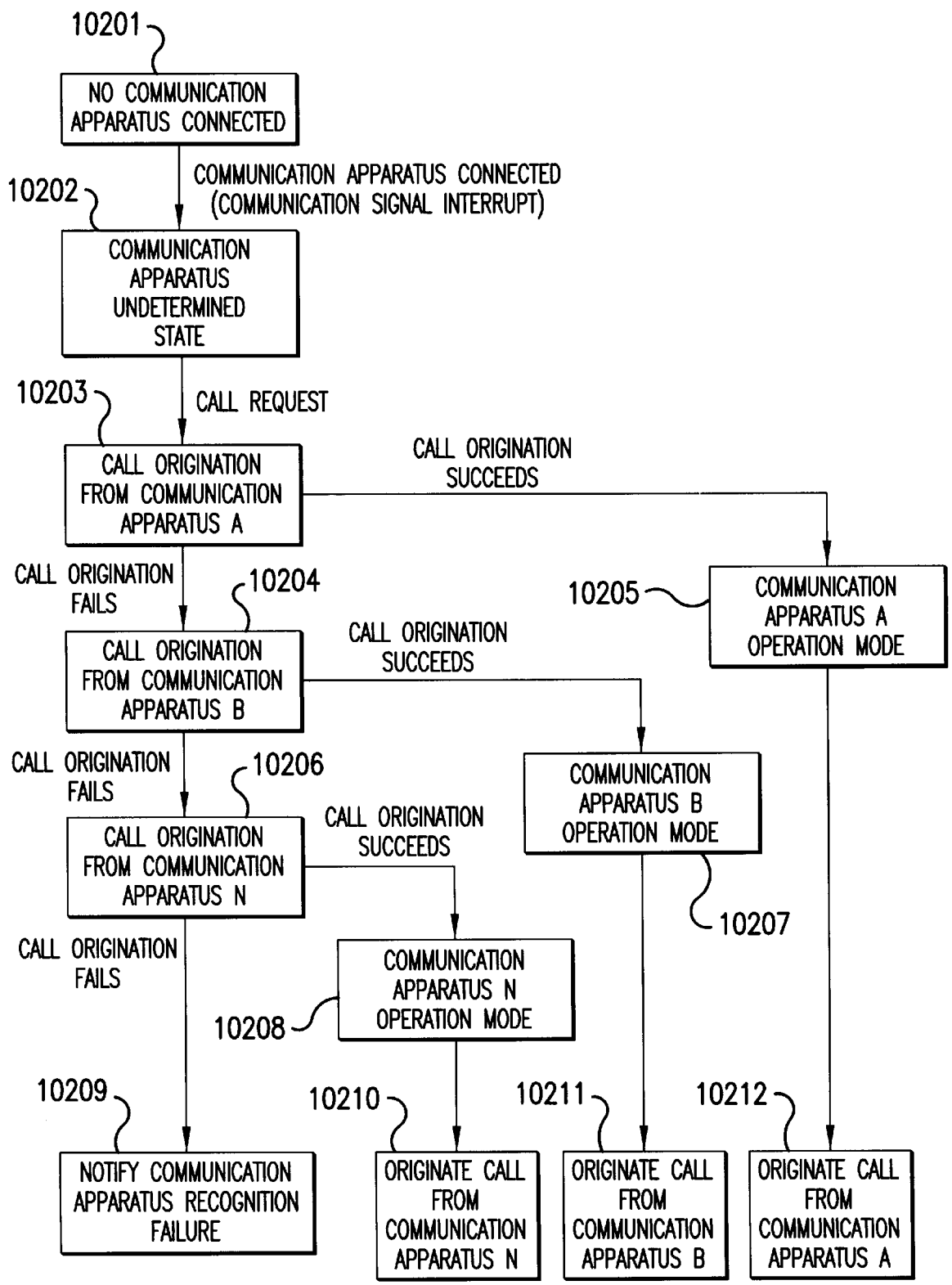
FIG. 39 is an explanatory diagram showing a communication apparatus detection process sequence for an automatic signal switching operation according to a 16th embodiment of the invention.

FIG. 43 is a conceptual diagram showing the configuration for implementing the automatic signal switching operation according to the invention, and FIG. 39 is a diagram illustrating one embodiment of the communication apparatus detection process.

With no communication apparatus 30 connected to the interface of the information terminal apparatus 1 (10201), when the communication apparatus 30 is connected to the connector of the information terminal apparatus 1, an interrupt occurs from the judging section 3 by a signal change on the notification signal line, and the control section 2 makes a transition to the communication apparatus undetermined state in which the communication apparatus 30 is not yet recognized (10202). When a call request is received from an application, the control section 2 instructs the test section 9 to try a call origination procedure with communication speed A (10203). If the call origination procedure succeeds, the control section 2 switches to communication apparatus A operation mode, notifies the switching section 7 to switch the input/output lines to the communication apparatus A mode (10205), and accomplishes the call origination with speed A (10212). If the call origination with communication speed A failed, then the control section 2 instructs the test section 9 to try the call origination procedure with a different communication speed B (10204). If the call origination procedure succeeds, the control section 2 switches to communication apparatus B operation mode, notifies the switching section 7 to switch the input/output lines to the communication apparatus B mode (10207), and accomplishes the call origination with speed B (10211). If failed, the call origination procedure is tried with different communication speeds N one after another (10206).

If the call origination procedure succeeds, the control section 2 switches to communication apparatus N operation mode, notifies the switching section 7 to switch the input/output lines to the communication apparatus N mode (10208), and accomplishes the call origination with speed N (10210). If the call origination procedure failed after trying with all communication speeds, a communication apparatus recognition failure is notified (10209). By performing the above process sequence, the communication apparatus detection process for the automatic signal switching operation according to the 17th invention is accomplished.

Embodiment 17

Figure 40:
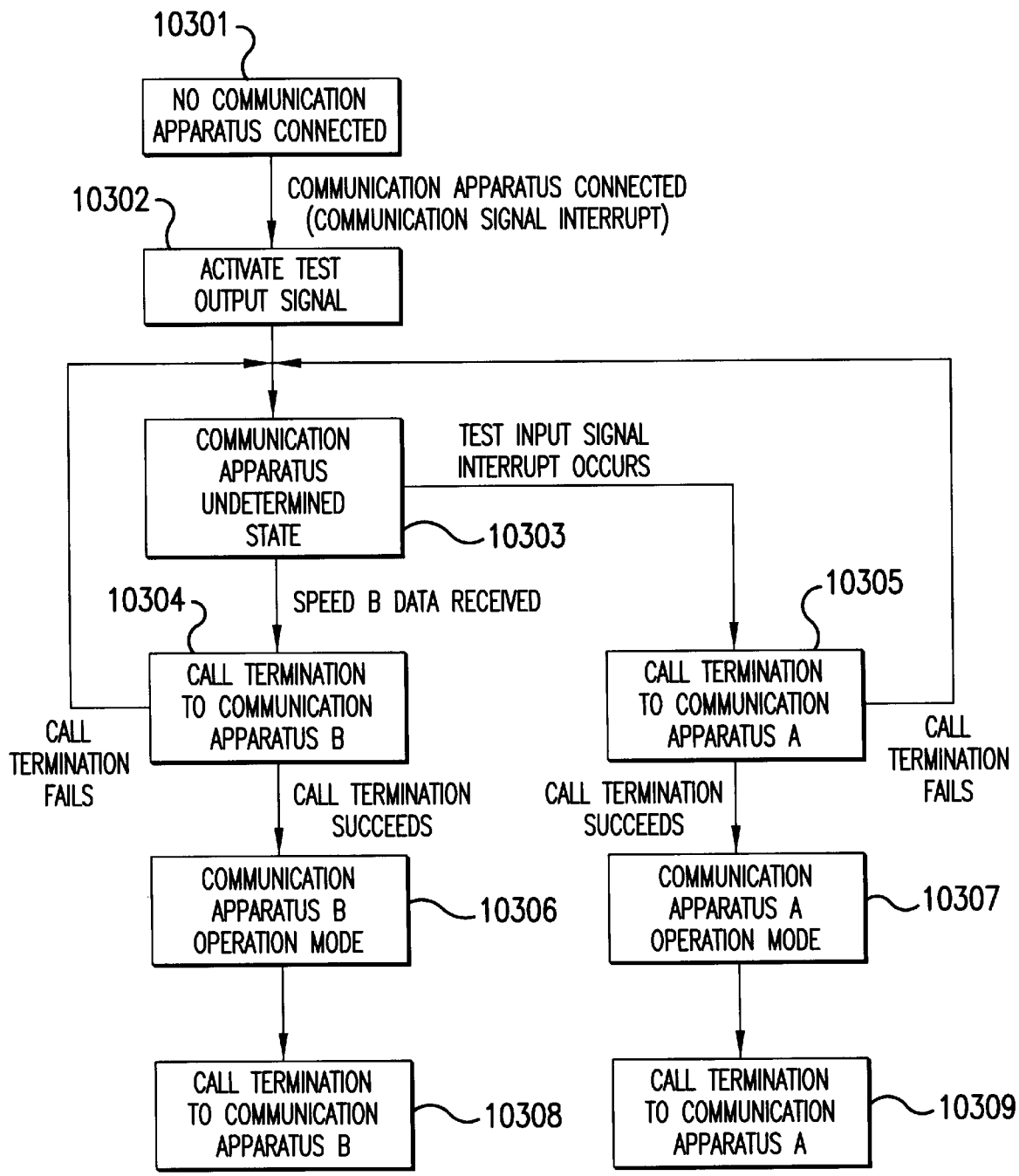
FIG. 40 is an explanatory diagram showing a communication apparatus detection process sequence for an automatic signal switching operation according to a 17th embodiment of the invention.

FIG. 43 is a conceptual diagram showing the configuration for implementing the automatic signal switching operation according to the invention, and FIG. 40 is a diagram illustrating one embodiment of the communication apparatus detection process.

With no communication apparatus 30 connected to the interface of the information terminal apparatus 1 (10301), when the communication apparatus 30 is connected to the connector of the information terminal apparatus 1, an interrupt occurs from the judging section 3 by a signal change on the notification signal line, and the control section 2 notifies the test section 9 to activate the test output signal line (10302). Thereafter, the control section 2 makes a transition to the communication apparatus undetermined state (10303) to wait for an interrupt notification to occur from the test section 9 by a signal change on the test input signal line or for an interrupt notification to occur by the reception of data on the response signal line from the communication apparatus 30 of speed B. Here, if a call arrives at a communication apparatus A of speed A, the responding section 33 of the communication apparatus A activates the test input signal line; the test section 9 then detects the signal change on the test input signal line and notifies the control section 2 by causing an interrupt. The control section 2 thus detects the connection of the communication apparatus A, and performs a call termination procedure of the communication apparatus A (10305).

If the call termination procedure failed, the control section 2 makes a transition back to the communication apparatus undetermined state (10303); on the other hand, when the call termination procedure is successfully accomplished, the control section 2 switches to the communication apparatus A operation mode, notifies the switching section 7 to switch the input/output lines to the communication apparatus A mode (10307), and accomplishes the call termination with speed A (10309). If a call arrives at a communication apparatus B of speed B, the responding section 33 of the communication apparatus B sends data onto the response signal line indicating the arrival of a call with speed B; when any data is received on the response signal line, the test section 9 notifies the control section 2 of an interrupt, and the control section 2 thus detects the connection of the communication apparatus B and performs a call termination procedure of the communication apparatus B (10304). When the call arrival indicating data received from the response signal line is recognized by the control section 2, if the call termination procedure failed, the control section 2 makes a transition back to the communication apparatus undetermined state (10303); on the other hand, if the call termination procedure is successfully accomplished, the control section 2 switches to the communication apparatus B operation mode, notifies the switching section 7 to switch the input/output lines to the communication apparatus B mode (10306), and accomplishes the call termination with speed B (10308). By performing the above process sequence, the communication apparatus detection process for the automatic signal switching operation according to the 18th invention is accomplished.

Embodiment 18

Figure 41:
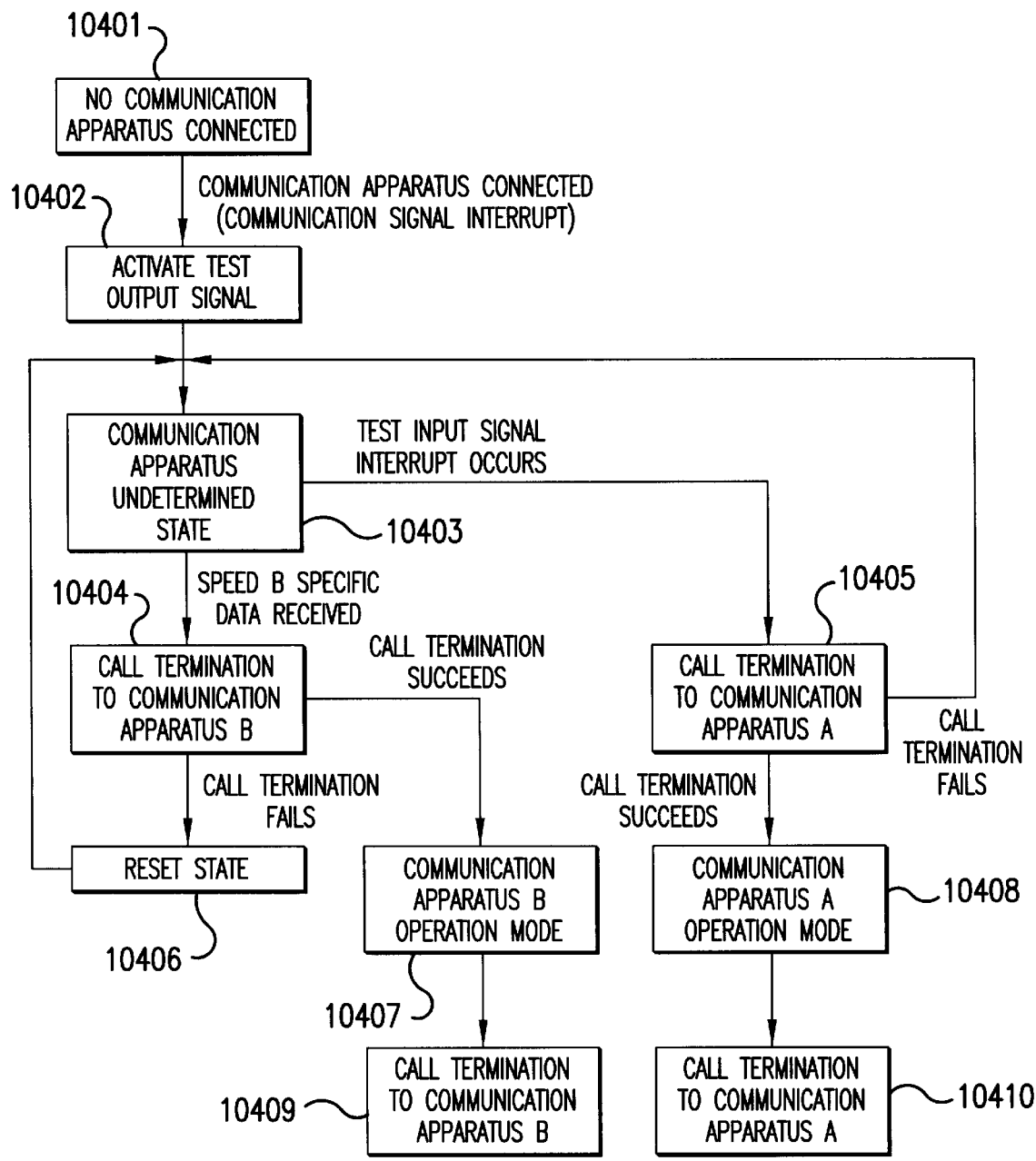
FIG. 41 is an explanatory diagram showing a communication apparatus detection process sequence for an automatic signal switching operation according to an 18th embodiment of the invention.

FIG. 43 is a conceptual diagram showing the configuration for implementing the automatic signal switching operation according to the invention, and FIG. 41 is a diagram illustrating one embodiment of the communication apparatus detection process.

With no communication apparatus 30 connected to the interface of the information terminal apparatus 1 (10401), when the communication apparatus 30 is connected to the connector of the information terminal apparatus 1, an interrupt occurs from the judging section 3 by a signal change on the notification signal line, and the control section 2 notifies the test section 9 to activate the test output signal line (10402). Thereafter, the control section 2 makes a transition to the communication apparatus undetermined state (10403) to wait for an interrupt notification to occur from the test section 9 by a signal change on the test input signal line or for an interrupt notification to occur by the reception of data on the response signal line from the communication apparatus 30 of speed B.

Here, if a call arrives at a communication apparatus A of speed A, the responding section 33 of the communication apparatus A activates the test input signal line; the test section 9 then detects the signal change on the test input signal line and notifies the control section 2 by causing an interrupt. The control section 2 thus detects the connection of the communication apparatus A, and performs a call termination procedure of the communication apparatus A (10405). If the call termination procedure failed, the control section 2 makes a transition back to the communication apparatus undetermined state (10403); on the other hand, when the call termination procedure is successfully accomplished, the control section 2 switches to the communication apparatus A operation mode, notifies the switching section 7 to switch the input/output lines to the communication apparatus A mode (10408), and accomplishes the call termination with speed A (10410). If a call arrives at a communication apparatus B of speed B, the responding section 33 of the communication apparatus B outputs data indicating the arrival of a call with speed B onto the response signal line; therefore, only when predetermined specific data is received on the response signal line, the test section 9 notifies the control section 2 of an interrupt, and the control section 2 thus detects the connection of the communication apparatus B and performs a call termination procedure of the communication apparatus B (10404).

If the call termination procedure failed, the control section 2 clears the received data on the response signal line and resets the state (1406), and makes a transition back to the communication apparatus undetermined state (10403); on the other hand, when the call termination procedure is successfully accomplished, the control section 2 switches to the communication apparatus B operation mode, notifies the switching section 7 to switch the input/output lines to the communication apparatus B mode (10406), and accomplishes the call termination with speed B (10408).

By performing the above process sequence, the communication apparatus detection process for the automatic signal switching operation according to the 19th invention is accomplished.

Embodiment 19

Figure 42:
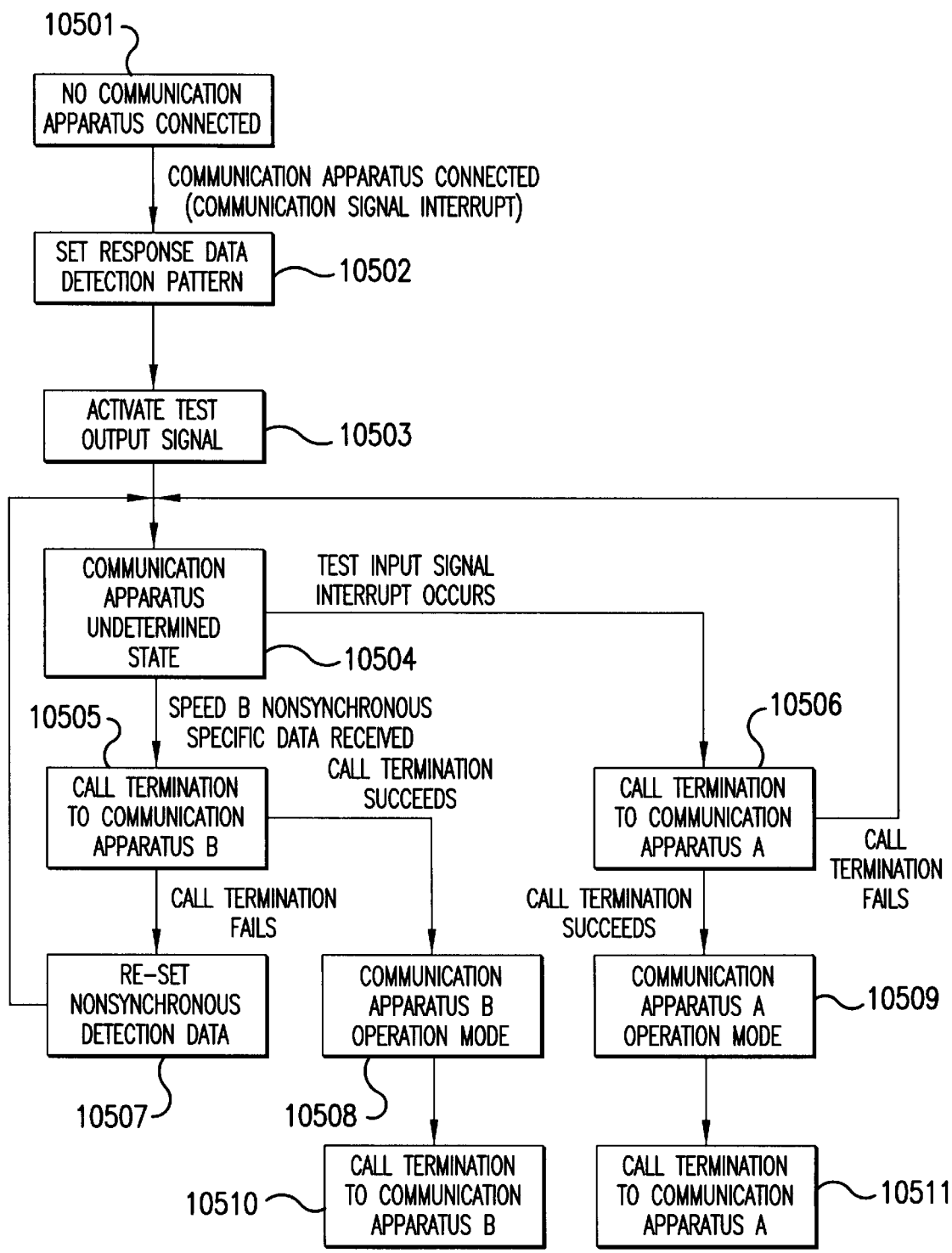
FIG. 42 is an explanatory diagram showing a communication apparatus detection process sequence for an automatic signal switching operation according to a 19th embodiment of the invention.

FIG. 43 is a conceptual diagram showing the configuration for implementing the automatic signal switching operation according to the invention, and FIG. 42 is a diagram illustrating one embodiment of the communication apparatus detection process.

With no communication apparatus 30 connected to the interface of the information terminal apparatus 1 (10501), when the communication apparatus 30 is connected to the connector of the information terminal apparatus 1, an interrupt occurs from the judging section 3 by a signal change on the notification signal line, and the control section 2 sets in the test section 9 a pattern used to detect the reception of data of a specific pattern from a response terminal (10502), and notifies the test section 9 to activate the test output signal line (10503). Thereafter, the control section 2 makes a transition to the communication apparatus undetermined state (10504) to wait for an interrupt notification to occur from the test section 9 by a signal change on the test input signal line or for an interrupt notification to occur by the reception of data on the response signal line from the communication apparatus 30 of speed B.

Here, if a call arrives at a communication apparatus A of speed A, the responding section 33 of the communication apparatus A activates the test input signal line; the test section 9 then detects the signal change on the test input signal line and notifies the control section 2 by causing an interrupt. The control section 2 thus detects the connection of the communication apparatus A, and performs a call termination procedure of the communication apparatus A (10506). If the call termination procedure failed, the control section 2 makes a transition back to the communication apparatus undetermined state (10504); on the other hand, when the call termination procedure is successfully accomplished, the control section 2 switches to the communication apparatus A operation mode, notifies the switching section 7 to switch the input/output lines to the communication apparatus A mode (10509), and accomplishes the call termination with speed A (10511).

If a call arrives at a communication apparatus B of speed B, the responding section 33 of the communication apparatus B outputs data indicating the arrival of a call with speed B onto the response signal line; therefore, only when the data that matches the pattern preset by the control section 2 is received on the response signal line, the test section 9 notifies the control section 2 of an interrupt, and the control section 2 thus detects the connection of the communication apparatus B and performs a call termination procedure of the communication apparatus B (10505). If the call termination procedure failed, the control section 2 resets the response signal line receive data pattern in the test section 9 (10507), and makes a transition back to the communication apparatus undetermined state (10504); on the other hand, when the call termination procedure is successfully accomplished, the control section 2 switches to the communication apparatus B operation mode, notifies the switching section 7 to switch the input/output lines to the communication apparatus B mode (10508), and accomplishes the call termination with speed B (10510). By performing the above process sequence, the communication apparatus detection process for the automatic signal switching operation according to the 20th invention is accomplished.

Embodiment 20

The automatic signal switching operation for automatically switching signal potentials, the input/output method of the interface, etc. by automatically detecting the connection of communication apparatus 30 and the attribute of the connected communication apparatus 30, according to a 20th embodiment, is implemented in the same manner as in any one of the first to 19th embodiments, and the description of the operation will not be repeated here.

Figure 44:
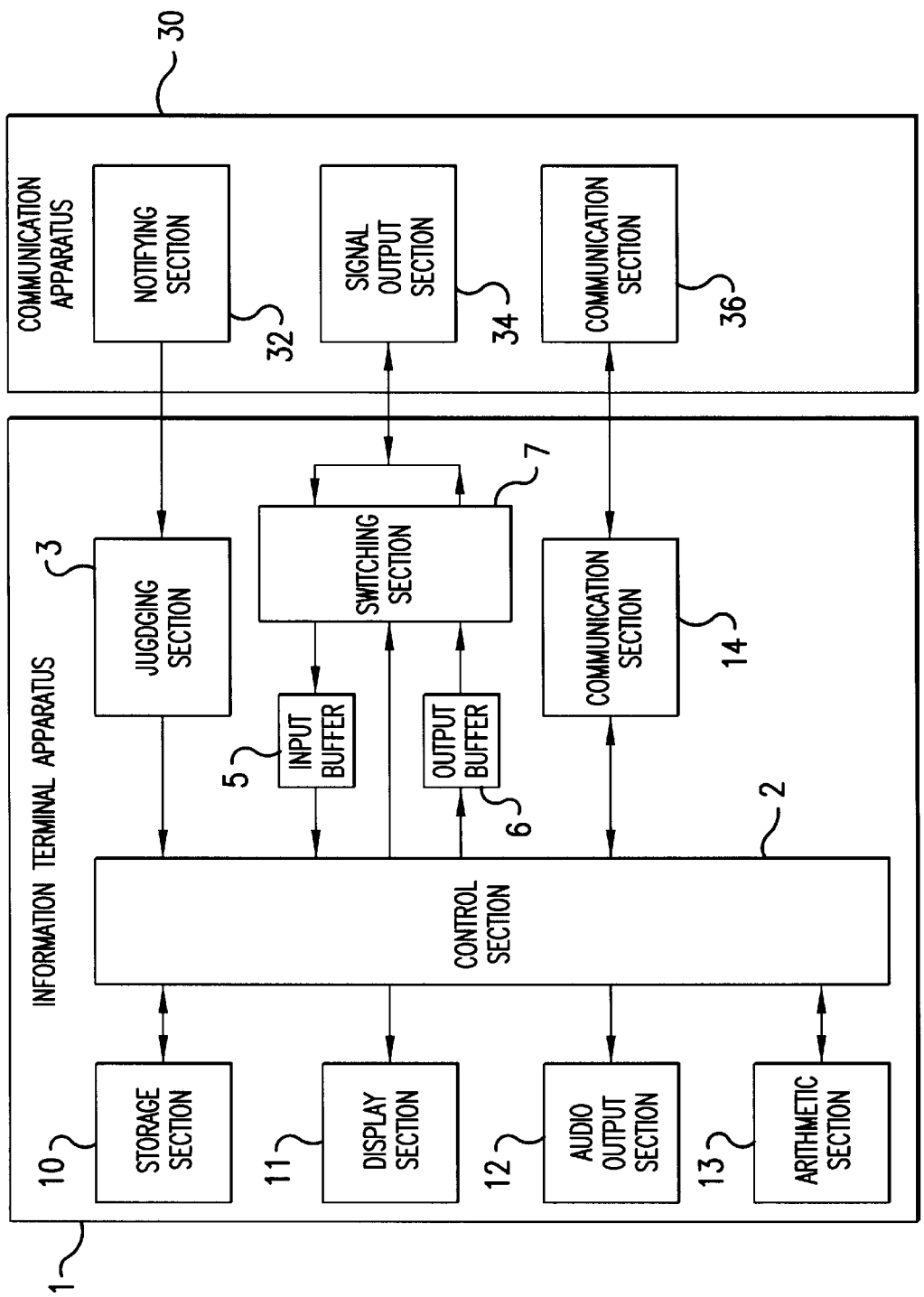
FIG. 44 is a block diagram showing the configuration for implementing an automatic signal switching operation according to 20th to 28th embodiments of the invention.
Figure 49:
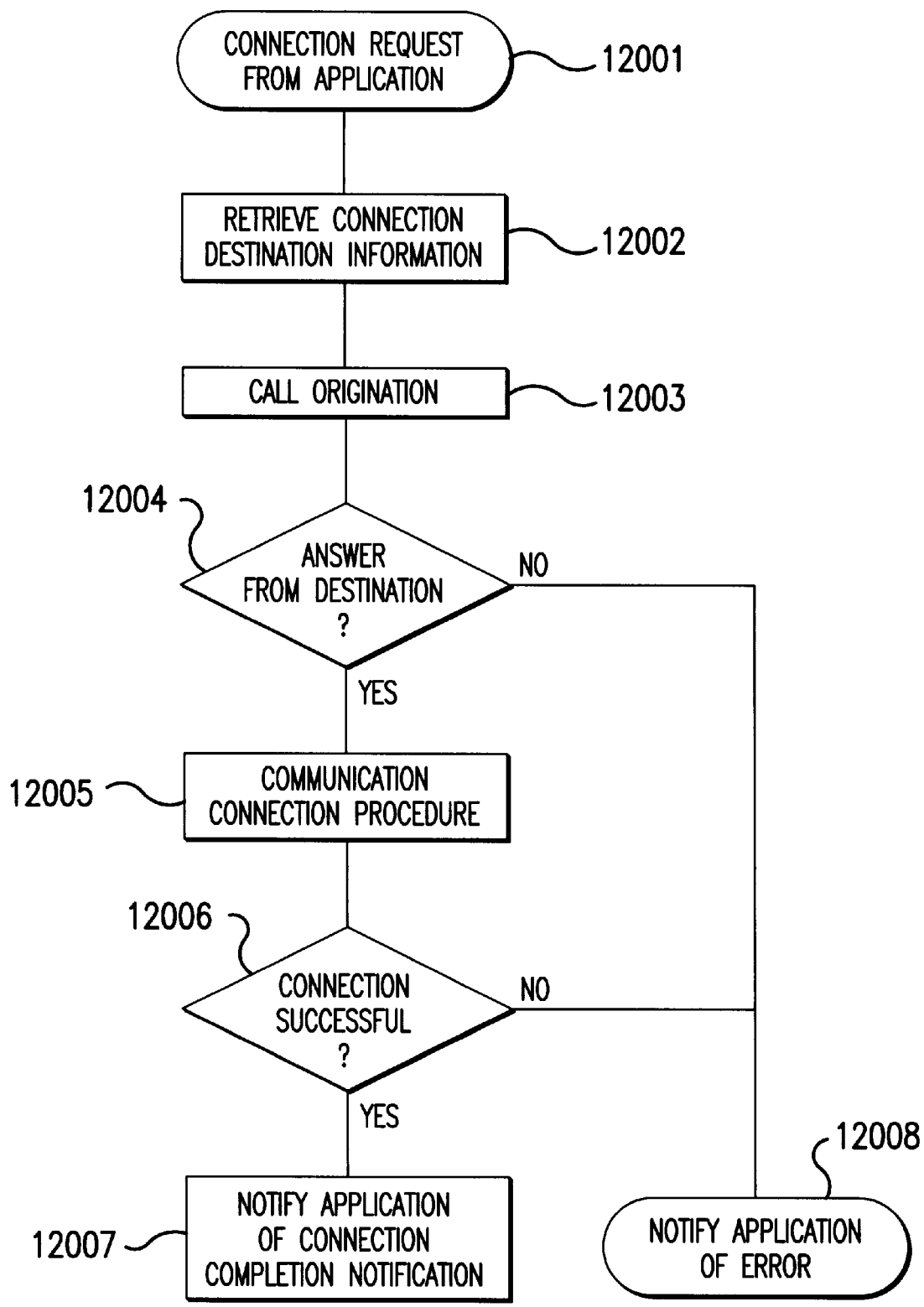
FIG. 49 is a flow chart illustrating the automatic signal switching operation according to the 20th embodiment of the invention.

Referring to FIGS. 44, 45, and 49, a description will be given of an automatic signal switching operation in which when a communication application is started after automatically identifying the connected communication apparatus 30, a call is automatically originated and the connection is set up in accordance with a communication procedure appropriate to the connected communication apparatus 30.

FIG. 44 is a diagram showing the configuration of the information terminal apparatus 1 and communication apparatus 30 for implementing the 20th embodiment, and FIG. 45 is a connection destination information table 10a stored in a storage section 10 for various communication apparatuses 30 connectable to the information terminal apparatus 1.

In FIG. 49, after a notification is provided from the judging section 3 identifying the communication apparatus 30 as a communication apparatus A, when a connection request for communication is received from the application (12001) the control section 2 retrieves connection destination telephone number A, connection ID A, and connection setup information A as the connection destination information for the communication apparatus 30 shown in FIG. 45 from the storage section 10 (12002), and using the retrieved information, a communication section 14 performs a call origination procedure (12003). The call is made to the destination via a communication section 36 in the communication apparatus 30, and if the communication section 14 does not receive an answer from the destination within a predetermined time (12004), a destination no answer error is reported to the application (12008).

If there is an answer from the destination, the communication section 14 performs a communication connection procedure (12005); when the connection is successfully set up, the application is notified of connection completion (12007), but when the connection failed, the application is notified of a connection failed error (12008).

By performing the above process sequence, the automatic connection process of the 21st invention is accomplished.

Embodiment 21

Figure 50:
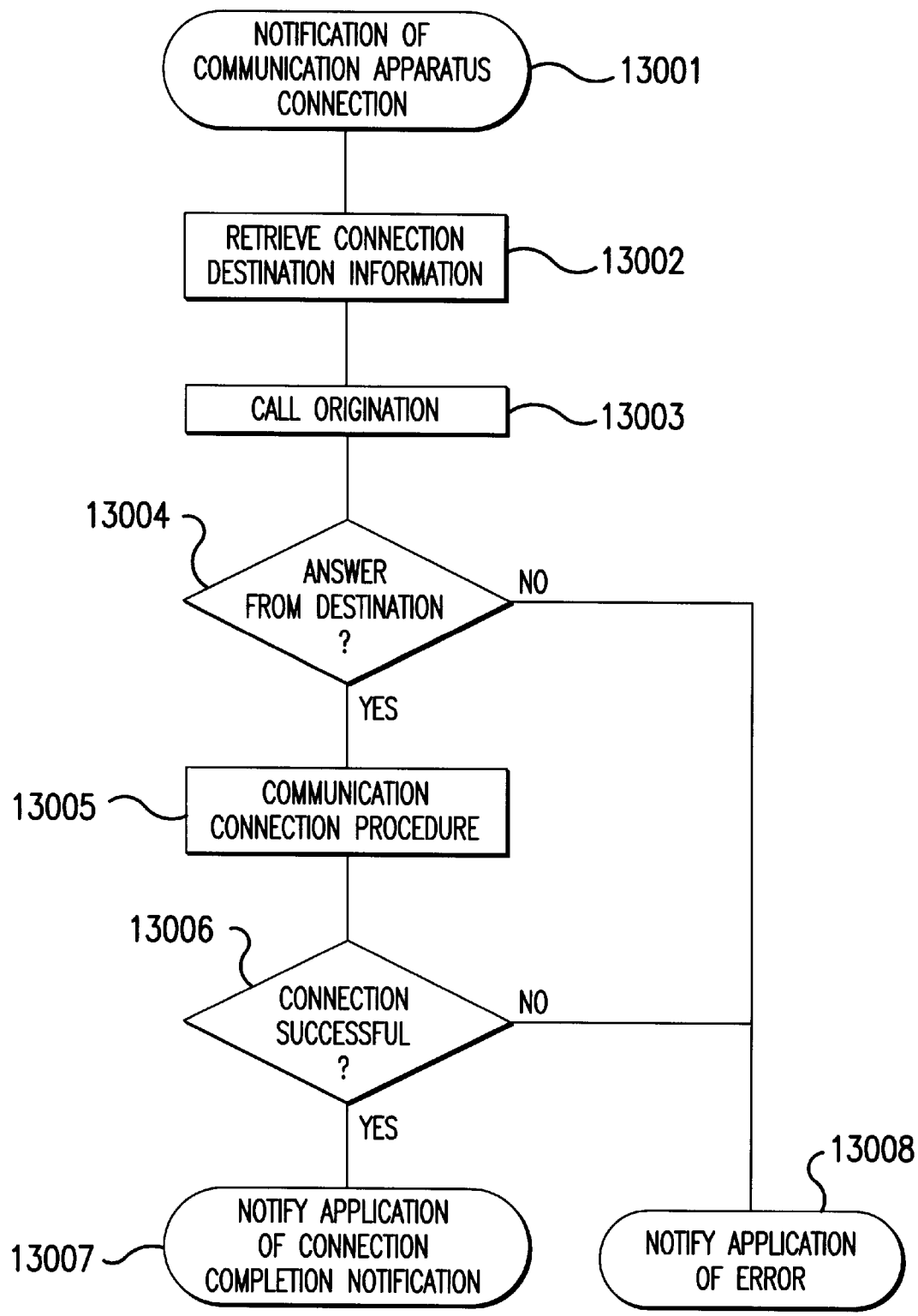
FIG. 50 is a flow chart illustrating the automatic signal switching operation according to the 21st embodiment of the invention.

Referring to FIGS. 44, 45, and 50, a description will be given of an automatic signal switching operation in which after a communication apparatus 30 is connected, and the connected communication apparatus 30 is automatically recognized, a call is automatically originated and the connection is set up in accordance with a communication procedure appropriate to the connected communication apparatus 30.

FIG. 44 is a diagram showing the configuration of the information terminal apparatus 1 and communication apparatus 30 for implementing the 21st embodiment, and FIG. 45 shows the connection destination information table 10a stored in the storage section 10 for various communication apparatuses 30 connectable to the information terminal apparatus 1.

In FIG. 50, after the communication apparatus 30 is connected to the information terminal apparatus 1, and a notification is provided from the judging section 3 identifying the communication apparatus 30 as a communication apparatus A (13001), the control section 2 retrieves connection destination telephone number A, connection ID A, and connection setup information A as the connection destination information for the communication apparatus 30 shown in FIG. 45 from the storage section 10 (13002), and using the retrieved information, the communication section 14 performs a call origination procedure (13003). The call is made to the destination via the communication section 36 of the communication apparatus 30, and if the communication section 14 does not receive an answer from the destination within a predetermined time (13004), a destination no answer error is reported to the application (13008).

If there is an answer from the destination, the communication section 14 performs a communication connection procedure (13005); when the connection is successfully set up, the application is notified of connection completion (13007), but when the connection failed, the application is notified of a connection failed error (13008).

Thereafter, the communication application is activated by the connection completion notification, thus starting data communication.

By performing the above process sequence, the automatic connection process of the 22nd invention is accomplished.

Embodiment 22

Figure 51:
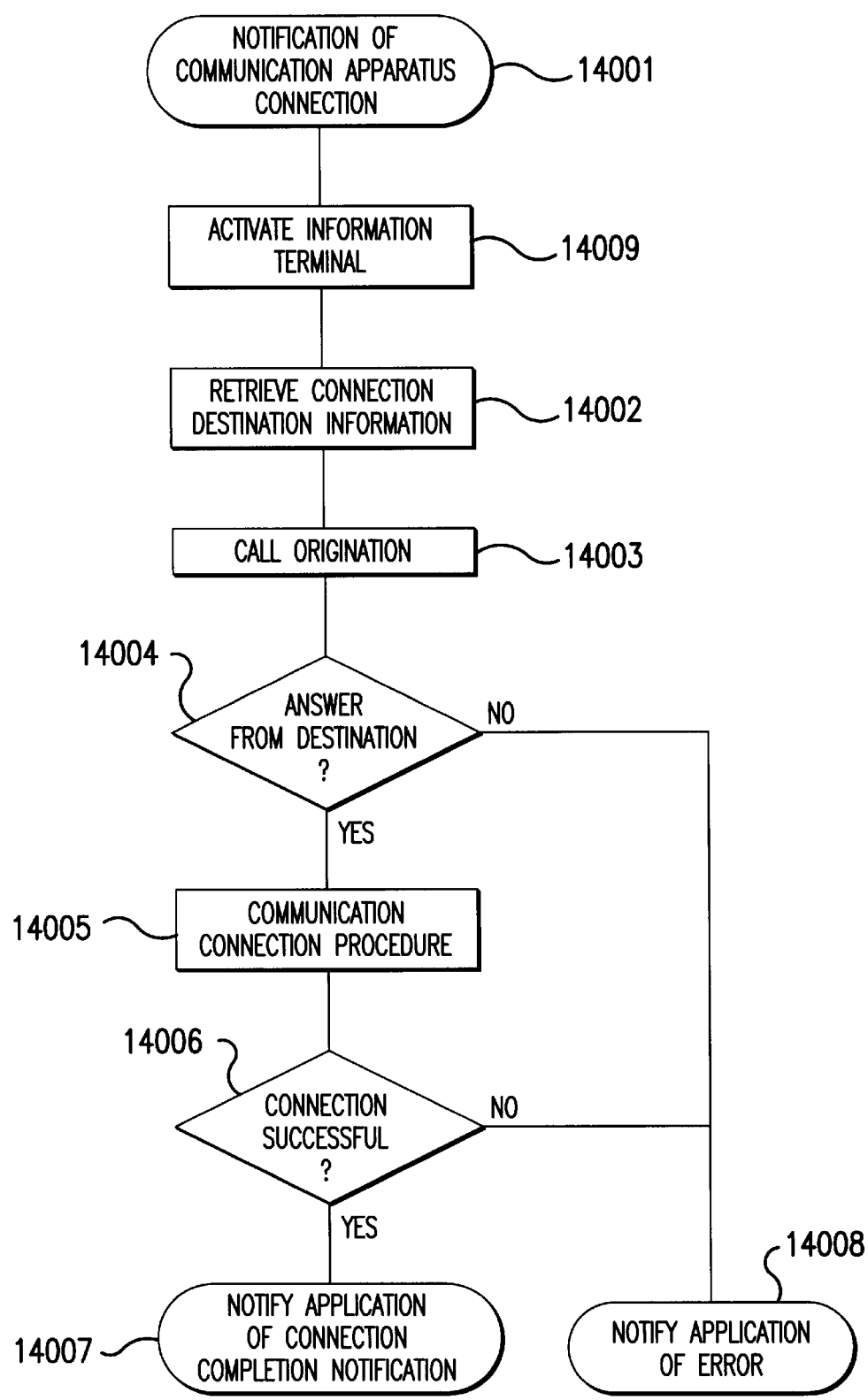
FIG. 51 is a flow chart illustrating the automatic signal switching operation according to the 22nd embodiment of the invention.

Referring to FIGS. 44, 45, and 51, a description will be given of an automatic signal switching operation in which when a communication apparatus 30 is connected to the information terminal apparatus 1 placed in an inactive state such as a sleep mode, the information terminal apparatus 1 enters an active state and automatically recognizes the connected communication apparatus 30, and then a call is automatically originated and the connection is set up in accordance with a communication procedure appropriate to the connected communication apparatus 30.

FIG. 44 is a diagram showing the configuration of the information terminal apparatus 1 and communication apparatus 30 for implementing the 22nd embodiment, and FIG. 45 shows the connection destination information table 10a stored in the storage section 10 for various communication apparatuses 30 connectable to the information terminal apparatus 1.

In FIG. 51, the information terminal apparatus 1 is placed in an inactive state in which all processing sections, except the judging section 3 for detecting the attribute of the communication apparatus 30, are deactivated; in this state, when the communication apparatus 30 is connected, the judging section 3 judges the attribute of the communication apparatus 30 and notifies the control section 2 (14001), thereby activating the information terminal apparatus 1 (14009). Recognizing the connection of the communication apparatus A, the control section 2 retrieves connection destination telephone number A, connection ID A, and connection setup information A as the connection destination information for the communication apparatus 30 shown in FIG. 45 from the storage section 10 (14002), and using the retrieved information, the communication section 14 performs a call origination procedure (14003). The call is made to the destination via the communication section 36 of the communication apparatus 30, and if the communication section 14 does not receive an answer from the destination within a predetermined time (14004), a destination no answer error is reported to the application (14008).

If there is an answer from the destination, the communication section 14 performs a communication connection procedure (14005); when the connection is successfully set up, the application is notified of connection completion (14007), but when the connection failed, the application is notified of a connection failed error (14008).

Thereafter, the communication application is activated by the connection completion notification, thus starting data communication.

By performing the above process sequence, the automatic connection process of the 23rd invention is accomplished.

Embodiment 23

Figure 52:
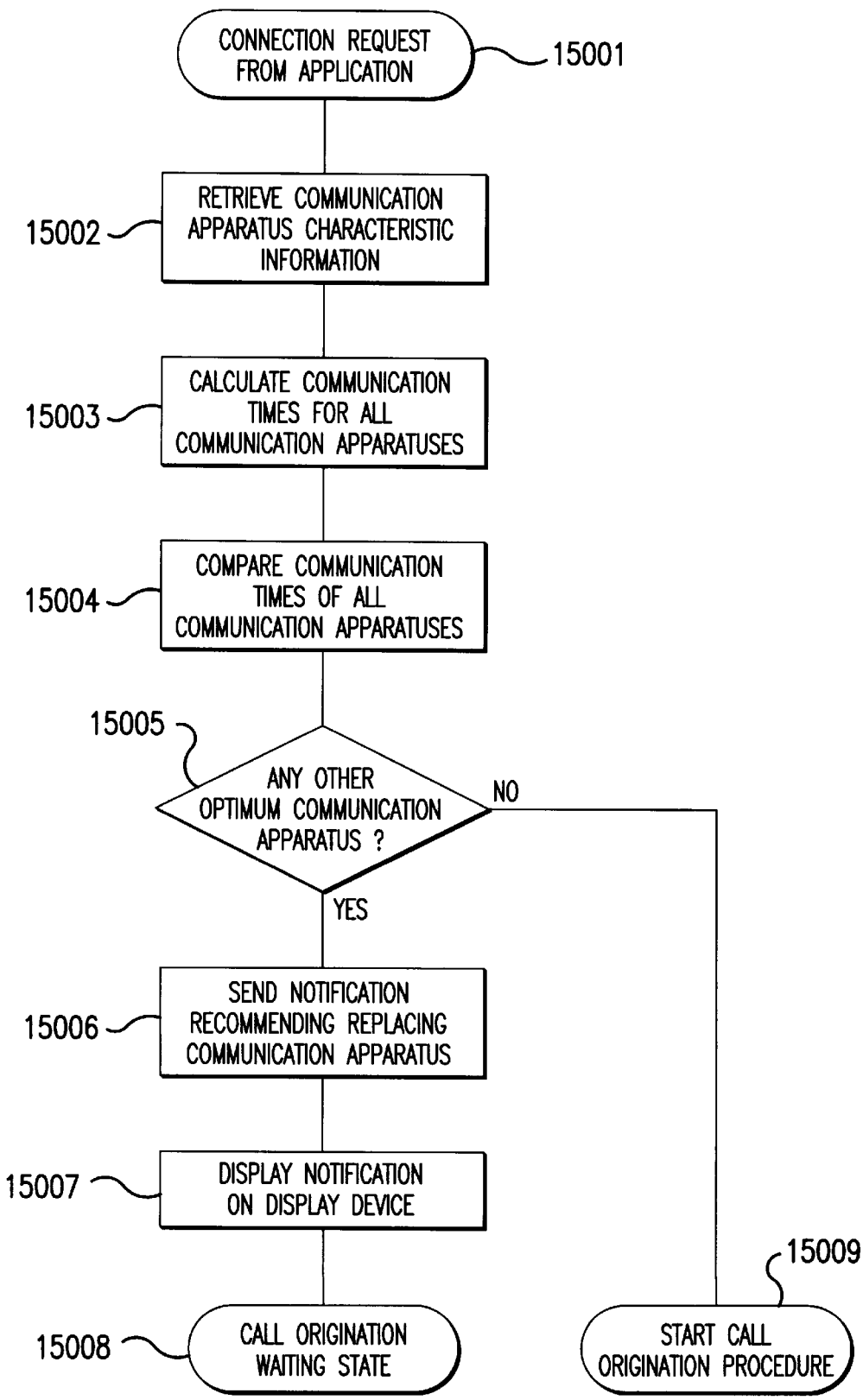
FIG. 52 is a flow chart illustrating the automatic signal switching operation according to the 23rd embodiment of the invention.

Referring to FIGS. 44, 46, and 52, a description will be given of an automatic signal switching operation in which when a communication application is started after automatically recognizing the connected communication apparatus 30, a notification is issued recommending switching to a communication apparatus 30 that provides shorter communication time.

FIG. 44 is a diagram showing the configuration of the information terminal apparatus 1 and communication apparatus 30 for implementing the 23rd embodiment, and FIG. 46 shows a characteristic information table 10b stored in the storage section 10 for various communication apparatuses 30 connectable to the information terminal apparatus 1.

In FIG. 52, after a notification is provided from the judging section 3 identifying the communication apparatus 30 as a communication apparatus A, when a connection request for communication is received from the application (15001) the control section 2 retrieves, from the storage section 10, transmission speeds A to N and communication protocols A to N as the characteristic information for the communication apparatus 30 shown in FIG. 46 (15002), and using the retrieved information, the amount of data predicted to occur from the start to the end of the communication, and the communication procedure to be used, an arithmetic section 13 calculates communication times A to N for the respective communication apparatuses (15003). When comparisons are made between the predicted communication times A to N calculated by the arithmetic section 13 for the communication apparatuses A to N (15004), if there is no communication apparatus that provides a shorter communication time than the communication time A of the currently connected communication apparatus A (15005), the communication section 14 originates a call using the currently connected communication apparatus (15009).

On the other hand, if a communication apparatus B is detected as having a shorter communication time B than the communication time A of the currently connected communication apparatus A, a notification is sent to a display section 11 to display a notification recommending replacing the communication apparatus (15006), and the display section 11 displays on an LED or liquid crystal panel the communication time A of the currently connected communication apparatus A and the communication time B of the communication apparatus B recommended as a replacement along with a notification recommending removing the communication apparatus A and instead connecting the communication apparatus B (15007). Thereafter, the control section 2 of the information terminal apparatus 1 makes a transition to a state (15008) ready for detecting the replacement of the communication apparatus and the issuance of a call origination request from the application.

By performing the above process sequence, the notification process for recommending an optimum communication apparatus according to the 24th invention is accomplished.

Embodiment 24

Figure 53:
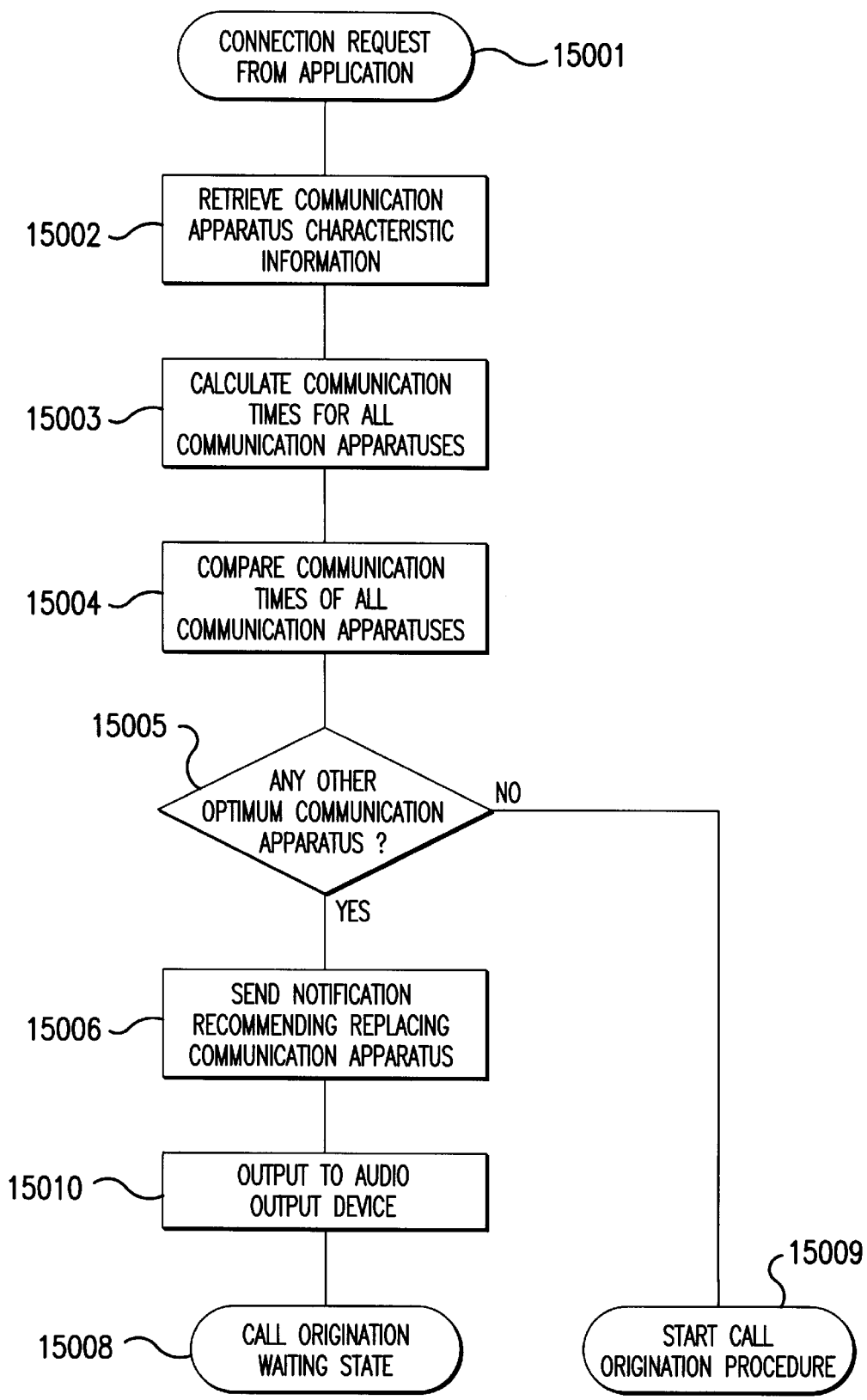
FIG. 53 is a flow chart illustrating the automatic signal switching operation according to the 24th embodiment of the invention.

Referring to FIGS. 44, 46, and 53, a description will be given of an automatic signal switching operation in which when a communication application is started after automatically recognizing the connected communication apparatus 30, a notification is issued recommending switching to a communication apparatus 30 that provides shorter communication time.

FIG. 44 is a diagram showing the configuration of the information terminal apparatus 1 and communication apparatus 30 for implementing the 24th embodiment, and FIG. 46 shows the characteristic information table 10b stored in the storage section 10 for various communication apparatuses 30 connectable to the information terminal apparatus 1.

The difference from the 23rd embodiment is that in FIG. 53, when a communication apparatus B is detected as having a shorter communication time B than the communication time A of the currently connected communication apparatus A (15005), a notification is sent to an audio output section 12 to produce an indication recommending replacing the communication apparatus (15006); using a buzzer or synthesized voice, the audio output section 12 audibly outputs information relating to the communication time A of the currently connected communication apparatus A and to the communication apparatus B recommended as a replacement and its communication time B along with information recommending removing the communication apparatus A and instead connecting the communication apparatus B (15010). Thereafter, the control section 2 of the information terminal apparatus 1 makes a transition to a state (15008) ready for detecting the replacement of the communication apparatus and the issuance of a call origination request from the application.

By performing the above process sequence, the notification process for recommending an optimum communication apparatus according to the 24th invention is accomplished.

Embodiment 25

Referring to FIGS. 44, 46, 47, and 54, a description will be given of an automatic signal switching operation in which when a communication application is started after automatically recognizing the connected communication apparatus 30, a notification is issued recommending switching to a communication apparatus 30 with a lower communication charge.

FIG. 44 is a diagram showing the configuration of the information terminal apparatus 1 and communication apparatus 30 for implementing the 25th embodiment, FIG. 46 shows the characteristic information table 10b stored in the storage section 10 for various communication apparatuses 30 connectable to the information terminal apparatus 1, and FIG. 47 is a tariff information table 10c stored in the storage section 10 for the various communication apparatuses 30.

Figure 54:
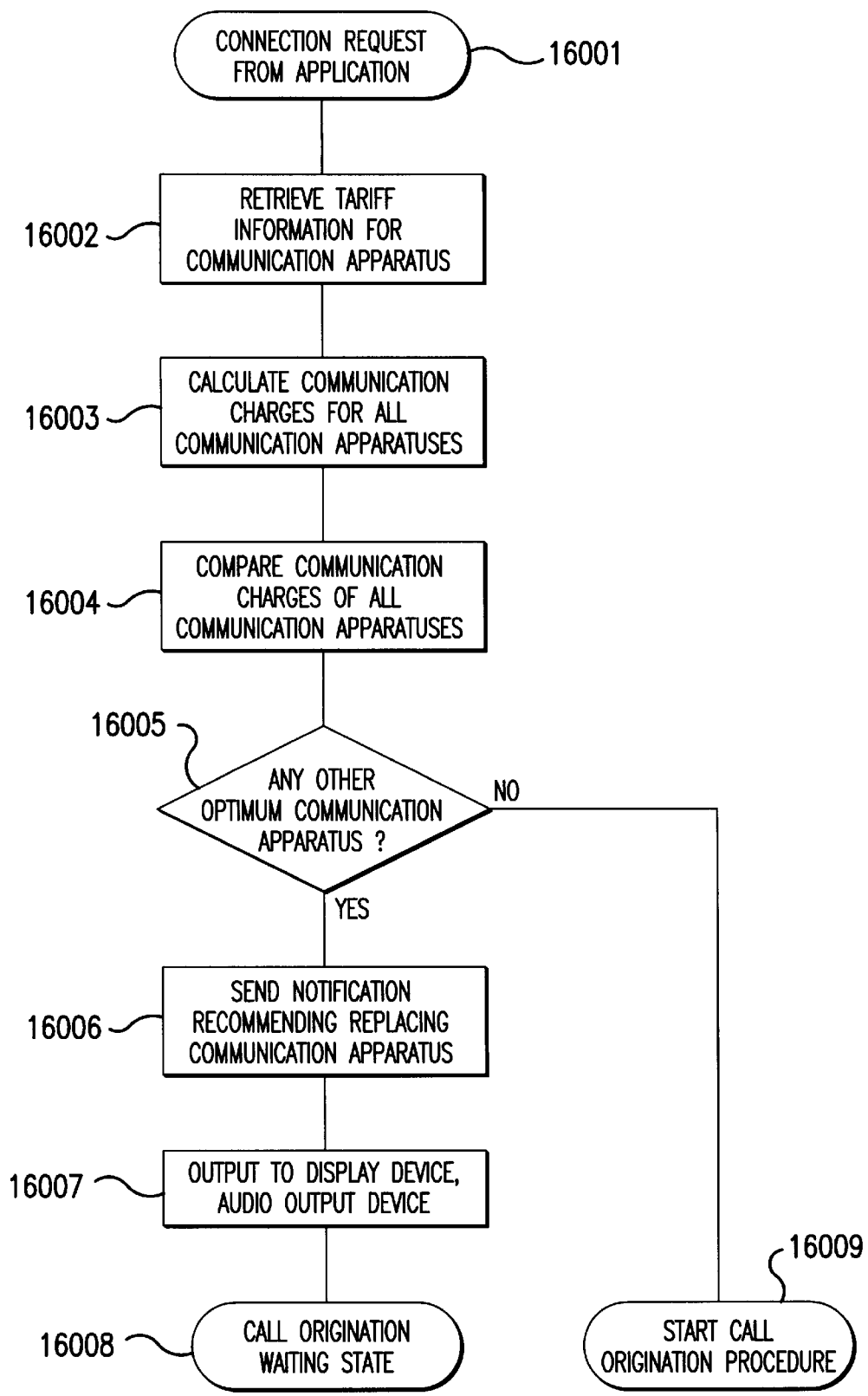
FIG. 54 is a flow chart illustrating the automatic signal switching operation according to the 25th embodiment of the invention.

In FIG. 54, after a notification is provided from the judging section 3 identifying the communication apparatus 30 as a communication apparatus A, when a connection request for communication is received from the application (16001) the control section 2 retrieves, from the storage section 10, transmission speeds A to N and communication protocols A to N shown in FIG. 46 as the characteristic information for the respective communication apparatuses 30 along with the tariff information shown in FIG. 47 for the respective communication apparatuses 30 (16002), and using the retrieved information, the amount of data and the number of packets predicted to occur from the start to the end of the communication, and the communication procedure to be used, the arithmetic section 13 calculates communication times A to N and communication charges A to N for the respective communication apparatuses (16003). When comparisons are made between the communication charges A to N calculated by the arithmetic section 13 for the communication apparatuses A to N (16004), if there is no communication apparatus with a lower communication charge than the communication charge A of the currently connected communication apparatus A (16005), the communication section 14 originates a call using the currently connected communication apparatus (16009).

On the other hand, if a communication apparatus B is detected as having a lower communication charge B than the communication charge A of the currently connected communication apparatus A, a notification is sent to the display section 11 or the audio output section 12 to output a notification recommending replacing the communication apparatus (16006), and the display section 11 or the audio output section 12 outputs the communication time A and communication charge A of the currently connected communication apparatus A and the communication time B and communication charge B of the communication apparatus B recommended as a replacement along with a notification recommending removing the communication apparatus A and instead connecting the communication apparatus B (16007). Thereafter, the control section 2 of the information terminal apparatus 1 makes a transition to a state (16008) ready for detecting the replacement of the communication apparatus and the issuance of a call origination request from the application.

By performing the above process sequence, the notification process for recommending an optimum communication apparatus according to the 25th invention is accomplished.

Embodiment 26

Figure 55:
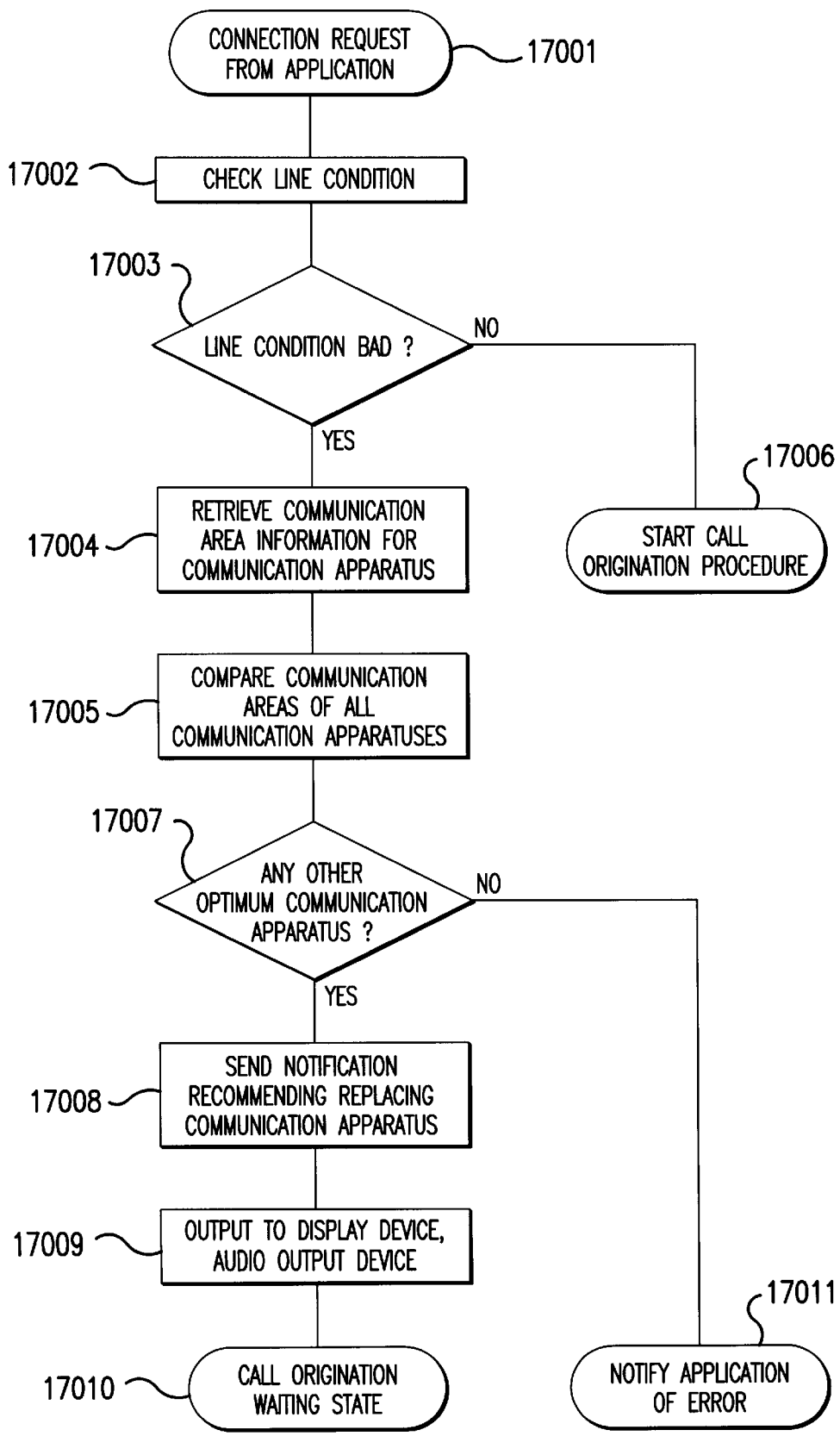
FIG. 55 is a flow chart illustrating the automatic signal switching operation according to the 26th embodiment of the invention.

Referring to FIGS. 44, 48, and 55, a description will be given of an automatic signal switching operation in which when a communication application is started after automatically recognizing the connected communication apparatus 30, the communication line condition is detected and a notification is issued recommending switching to a communication apparatus 30 having a wider communication area.

FIG. 44 is a diagram showing the configuration of the information terminal apparatus 1 and communication apparatus 30 for implementing the 26th embodiment, and FIG. 48 shows a supported communication area information table 10*d* stored in the storage section 10 for various communication apparatuses 30 connectable to the information terminal apparatus 1.

In FIG. 55, after a notification is provided from the judging section 3 identifying the communication apparatus 30 as a communication apparatus A, when a connection request for communication is received from the application (17001) the communication section 14 collects communication line condition information such as current radio wave conditions, etc. from the communication section 36 of the communication apparatus 30 (17002), and if the control section 2 judges that the line condition is good from the communication line condition information obtained from the communication section 14 (17003), the communication section 14 originates a call using the currently connected communication apparatus (17006).

On the other hand, if the line condition is judged to be bad (17003), the control section 2 retrieves from the storage section 10 the supported communication area information for the respective communication apparatuses 30 shown in FIG. 48 (17004) and compares the supported area information between the respective communication apparatuses A to N (17005); if a communication apparatus B and a communication apparatus N are detected as having wider areas than area 1 and area 2 supported by the communication apparatus A (17007), a notification is sent to the display section 11 or the audio output section 12 to output a notification recommending replacing the communication apparatus (17008), and the display section 11 or the audio output section 12 outputs information relating to the currently connected communication apparatus A as well as the communication apparatus B and communication apparatus N recommended as a replacement along with a notification recommending removing the communication apparatus A and instead connecting the communication apparatus B or communication apparatus N (17009). Thereafter, the control section 2 of the information terminal apparatus 1 makes a transition to a state (17010) ready for detecting the replacement of the communication apparatus and the issuance of a call origination request from the application.

If there is no communication apparatus having a wider communication area than the communication area supported by the currently connected communication apparatus A (17007), the application is notified of a communication line condition deteriorated error (17011).

By performing the above process,sequence, the notification process for recommending an optimum communication apparatus according to the 26th invention is accomplished.

Embodiment 27

Referring to FIGS. 44, 45, 48, 56 and 57, a description will be given of an automatic signal switching operation in which when communication is interrupted because of the deterioration of the communication line condition during data communication, a notification is issued recommending switching to a communication apparatus 30 having a wider communication area, while allowing the communication to be temporarily suspended during the replacement of communication apparatus 30 and to be resumed upon the completion of the replacement.

FIG. 44 is a diagram showing the configuration of the information terminal apparatus 1 and communication apparatus 30 for implementing the 27th embodiment, FIG. 45 shows the connection destination information table 10*a* stored in the storage section 10 for various communication apparatuses 30 connectable to the information terminal apparatus 1, and FIG. 48 shows the supported communication area information table 10*d* stored in the storage section 10 for the various communication apparatuses 30.

Figure 56:
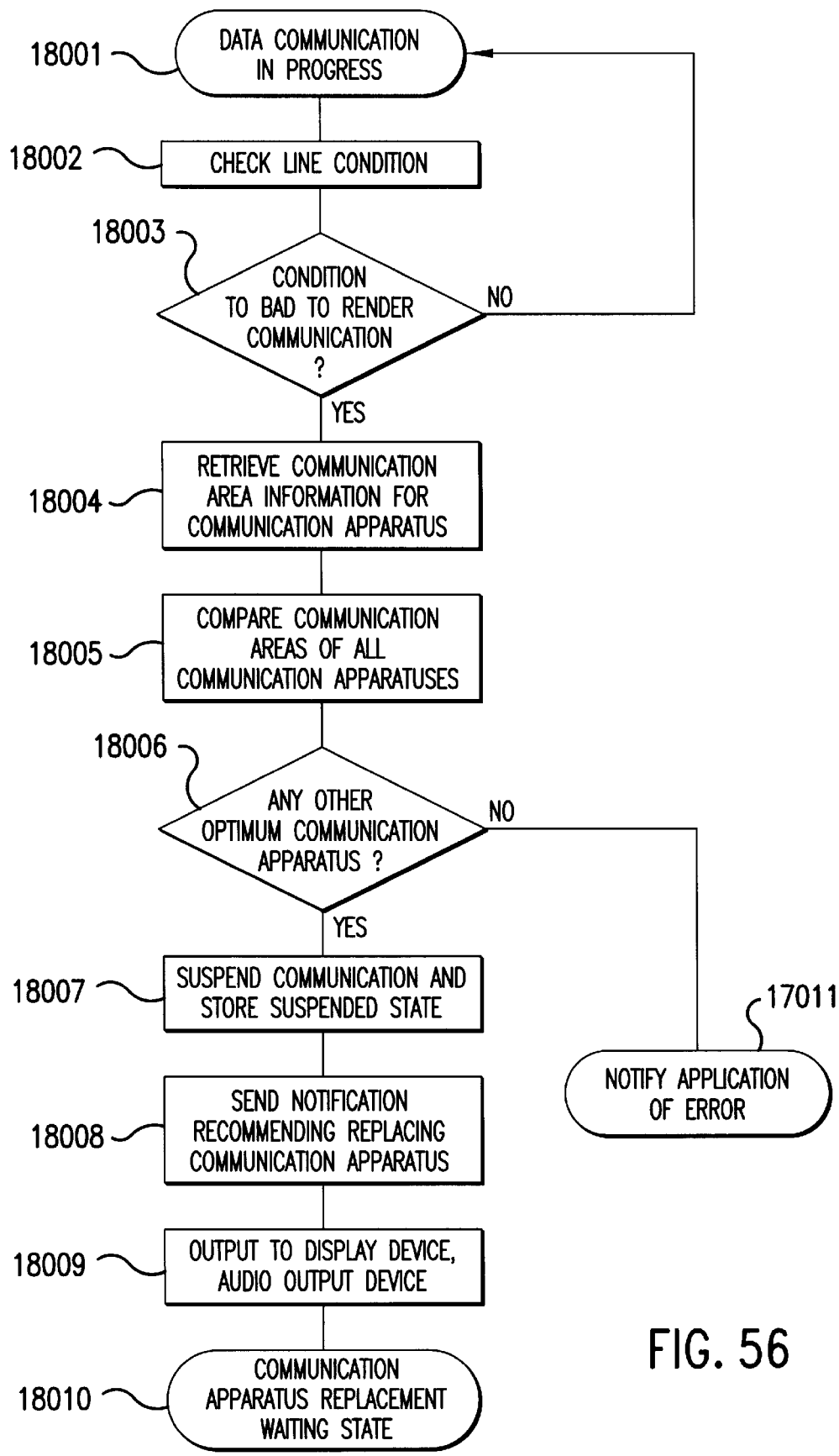
FIG. 56 is a flow chart illustrating the automatic signal switching operation according to the 27th embodiment of the invention.

In FIG. 56, during data communication (18001) the communication section 14 continually monitors the line condition by collecting communication line condition information such as current radio wave conditions, etc. from the communication section 36 of the communication apparatus 30 (18002), and if the control section 2 judges that the line condition is good from the communication line condition information obtained from the communication section 14 (18003), the data communication is continued (18001); on the other hand, if the line condition is judged to be bad (18003), the control section 2 retrieves from the storage section 10 the supported communication area information for the respective communication apparatuses 30 shown in FIG. 48 (18004) and compares the supported area information between the respective communication apparatuses A to N (18005); if a communication apparatus B and a communication apparatus N are detected as having wider areas than area 1 and area 2 supported by the communication apparatus A (18006), the data communication is temporarily suspended and the suspended communication state is stored in the storage section 10 (18007). Thereafter, a notification is sent to the display section 11 or the audio output section 12 to output a notification recommending replacing the communication apparatus (18008), and the display section 11 or the audio output section 12 outputs information relating to the communication apparatus B and communication apparatus N recommended as a replacement along with a notification recommending removing the communication apparatus A and instead connecting the communication apparatus B or communication apparatus N (18009). Thereafter, the control section 2 of the information terminal apparatus 1 makes a transition to a state (18010) ready for detecting the replacement of the communication apparatus.

If there is no communication apparatus having a wider communication area than the communication area supported by the currently connected communication apparatus A (18006), the application is notified of a communication line condition deteriorated error (18011).

Figure 57:
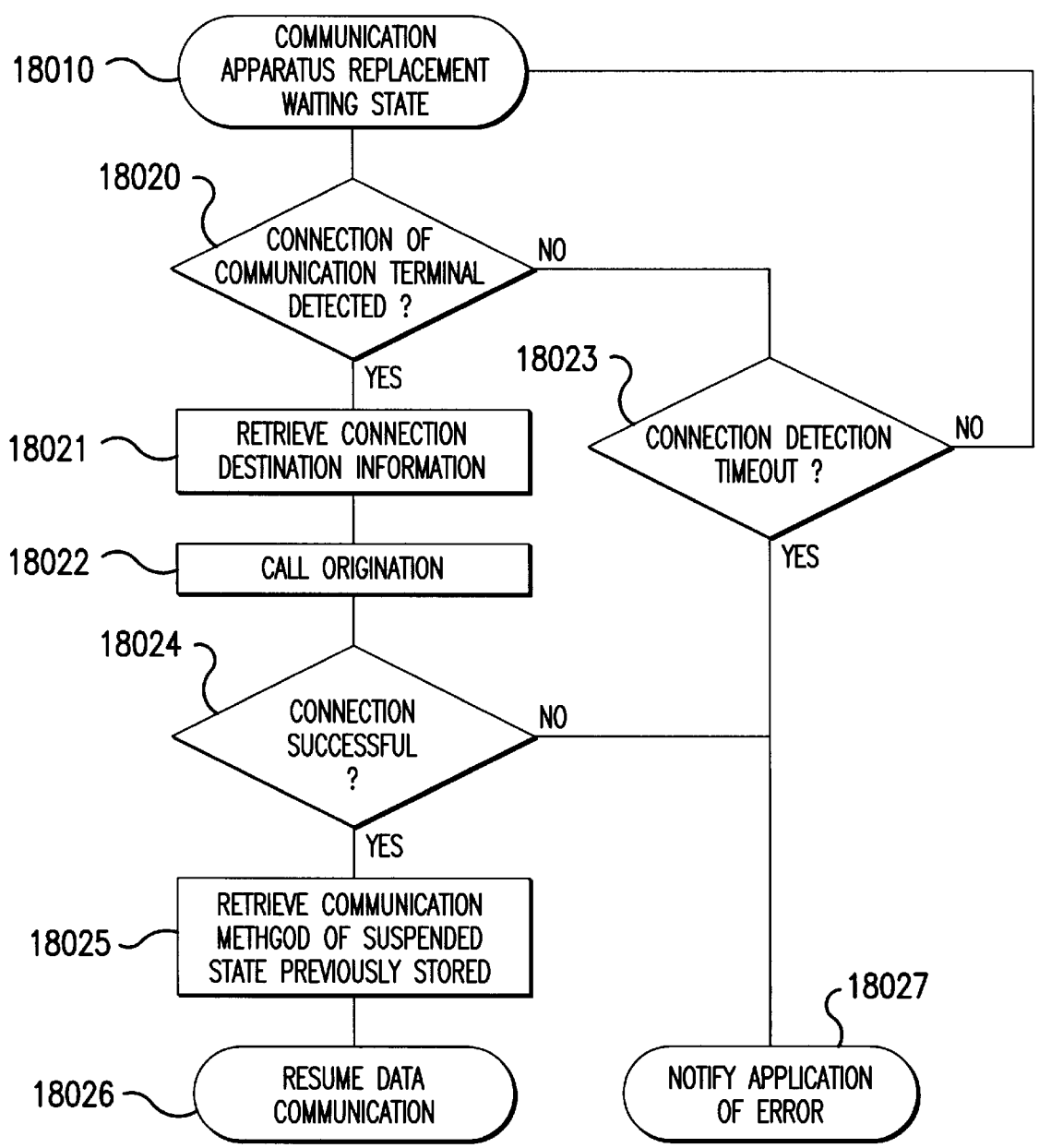
FIG. 57 is a flow chart illustrating the automatic signal switching operation according to the 27th and 28th embodiments of the invention.

Further, in FIG. 57, when a transition is made to the state ready for detecting the replacement of the communication apparatus 30, a timer for connection detection is started, and if the connection of a new communication apparatus 30 is not detected (18020), it is checked whether connection detection timeout has occurred or not (18023); if the timeout has not occurred, the state remains waiting for the detection of the replacement of the communication apparatus 30 (18010).

If the connection detection timeout has occurred (18023), a timeout error is reported to the application (18027).

When the connection of a new communication apparatus B is detected (18020), the control section 2 retrieves from the storage section 10 the destination telephone number B, connection ID B, and connection setup information B as the connection destination information for the communication apparatus 30 shown in FIG. 45 (18021), and using the retrieved information, the communication section 14 performs a call origination procedure (18022). The call is made to the destination via the communication section 36 of the communication apparatus 30, and when the connection is set up successfully (18024), the suspended communication state is retrieved from the storage section 10 (18025), and the data communication is resumed from the point at which it was suspended (18025).

If the connection failed, the application is notified of a connection failed error (18027).

By performing the above process sequence, the notification process for recommending an optimum communication apparatus and the process for temporarily suspending and then resuming communications at the time of the replacement of communication apparatus, according to the 27th invention, are accomplished.

Embodiment 28

Referring to FIGS. 44, 48, 57 and 58, a description will be given of an automatic signal switching operation for accomplishing temporary suspension and resumption of communication at the time of the replacement of communication apparatus 30 during data communication.

FIG. 44 is a diagram showing the configuration of the information terminal apparatus 1 and communication apparatus 30 for implementing the 28th embodiment, and FIG. 45 shows the connection destination information table 10a stored in the storage section 10 for various communication apparatuses. 30 connectable to the information terminal apparatus 1.

Figure 58:
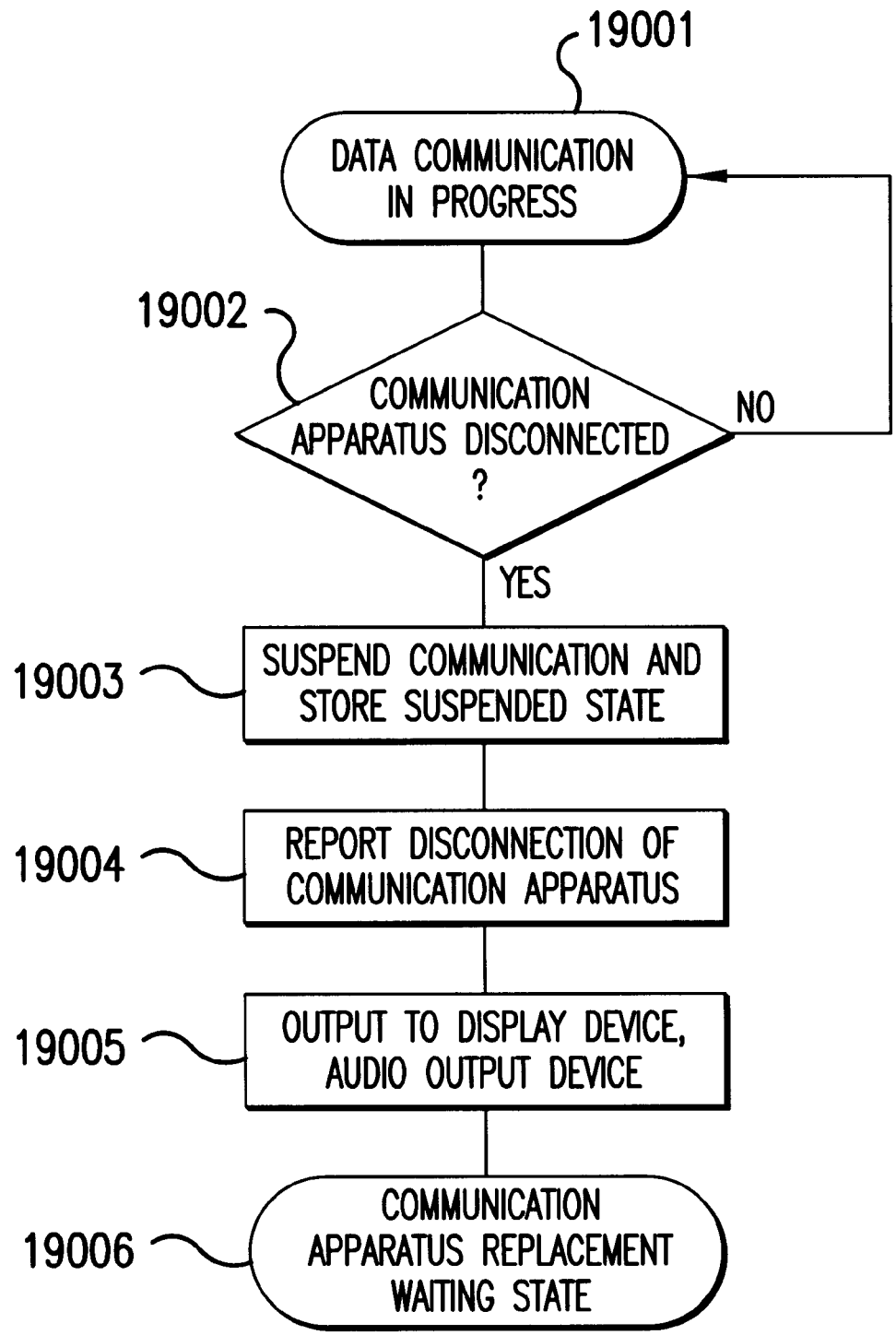
FIG. 58 is a flow chart illustrating the automatic signal switching operation according to the 28th embodiment of the invention.

In FIG. 58, during data communication (19001) the judging section 3 continually monitors the connected state of the communication apparatus 30; if the judging section 3 detects that the currently connected communication apparatus 30 is disconnected (19002), the data communication is temporarily suspended and the suspended communication state is stored in the storage section 10 (19003). Thereafter, the display section 11 or the audio output section 12 is notified of the disconnection of the communication apparatus (19004), and the display section 11 or the audio output section 12 outputs a notification recommending reconnecting the communication apparatus 30 (19005). Thereafter, the control section 2 of the information terminal apparatus 1 makes a transition to a state (19006) ready for detecting the replacement of the communication apparatus.

The remainder of the process is the same as that described in the 27th embodiment with reference to FIG. 57.

By performing the above process sequence, the process for temporarily suspending and then resuming communications at the time of the replacement of communication apparatus, according to the 28th invention, is accomplished.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An information terminal apparatus comprising:
   an interface section for connecting thereto an external device; and
   a control section for performing signal transfers to and from the external device via the interface section,
   wherein the interface section includes
      a connector having a terminal for sending and receiving communication control and data signals and a terminal for receiving an attribute signal representing an attribute of the external device;
      a judging circuit for judging the attribute of the connected external device based on the received attribute signal;
      a hysteresis buffer circuit connected to the attribute signal receiving terminal; and
      a switching circuit for receiving a result of the attribute judgement and, based on the attribute judgement, switching input/output directions of the communication control and data signals to directions appropriate for the connected external device and optimizing a signal level to a level appropriate for the connected external device.

2. The information terminal apparatus of claim 1, wherein the judging circuit supplies a voltage appearing at the attribute signal receiving terminal to the control section, and the control section verifies the connection of the external device based on a voltage change on the attribute signal receiving terminal.

3. The information terminal apparatus of claim 1, wherein an overcurrent protection circuit is inserted in an input line used to transfer the communication control and data signals.

4. An information terminal apparatus comprising:
an interface section for connecting thereto an external device; and
a control section for performing signal transfers to and from the external device via the interface section,
wherein the interface section includes
a connector having a terminal for sending and receiving communication control and data signals and a terminal for receiving an attribute signal representing an attribute of the external device;
a judging circuit for judging the attribute of the connected external device based on the received attribute signal; and
a switching circuit for switching input/output directions of the communication control and data signals to directions appropriate for the connected external device and optimizing a signal level to a level appropriate for the connected external device, and
wherein the control section verifies the connection of the external device based on the result of the judgement from the judging circuit, and causes the switching circuit to switch the signal input/output direction and optimize the signal level in accordance with the result of the judgement, and
wherein a hysteresis buffer circuit is connected to said terminal for receiving an attribute signal.

5. The information terminal apparatus of claim 4, wherein the control section controls the activation and deactivation of the judging circuit and switching circuit in such a manner that when no external device is connected, only the judging circuit is activated, and when an external device is connected, the judging circuit is deactivated and the switching circuit is activated.

6. The information terminal apparatus of claim 4, wherein an overcurrent protection circuit is inserted in an input line used to transfer the communication control and data signals, and the control section causes the switching circuit to perform the signal input/output direction switching operation so that when no external device is connected, the communication control and data signals are transferred from the terminal to the control section.

7. The information terminal apparatus of claim 1 or 4, wherein the judging circuit judges the attribute of the connected external device based on the presence or absence of the chattering of the attribute signal receiving terminal when the external device is connected.

8. The information terminal apparatus of claim 4, wherein the judging circuit judges the attribute of the connected external device to determine whether the external device is in a power ON state or in a power OFF or unknown power state.

9. The information terminal apparatus of claim 8, wherein when the connected external device is judged by the judging circuit to be in the power OFF or unknown power state, if there occurs a change in terminal potential, the judging circuit then determines that the connected external device has changed to the power ON state.

10. The information terminal apparatus of claim 8, wherein when a communication start request signal is output from the control section, the judging circuit performs the operation of judging the attribute of the connected external device.

11. The information terminal apparatus of claim 8, wherein, when the connected external device is judged by the judging circuit to be in the power OFF or unknown power state, the control section performs a communication operation procedure for each different type of communication apparatus, and when the communication operation procedure succeeds, the judging circuit determines that the connected external device has changed to the power ON state.

12. The information terminal apparatus of claim 4, wherein the external device is a communication apparatus, and when a call arrives at the connected communication apparatus, the judging circuit judges the attribute of the connected communication apparatus based on a terminal potential change or an input signal pattern.

13. The information terminal apparatus of claim 12, wherein the judging circuit judges the attribute of the connected communication apparatus based on the terminal potential change or the input signal at a predetermined terminal.

14. The information terminal apparatus of claim 12, wherein the judging circuit judges the attribute of the connected communication apparatus based on whether or not the input signal pattern matches a preset signal pattern.

15. An information terminal apparatus comprising:
an interface section for connecting thereto an external device; and
a control section for performing signal transfers to and from the external device via the interface section,
wherein the interface section includes
a connector having a terminal for sending and receiving communication control and data signals, a terminal for receiving an attribute signal representing an attribute of the external device, a terminal for sending a test signal for connection testing, and a terminal for receiving a test result signal;
a judging circuit for judging the attribute of the connected external device based on the received attribute signal;
a test circuit for outputting the test signal and receiving the test result signal; and
a switching circuit for switching input/output directions of the communication control and data signals to directions appropriate for the connected external device and optimizing a signal level to a level appropriate for the connected external device, and
wherein the control section verifies the connection of the external device based on the result of the judgement from the judging circuit, and when the connection of the external device is verified, the control section causes the test circuit to output the test signal and verifies the attribute of the external device based on the test result signal returned in response to and appropriate to the test signal, and causes the switching circuit to switch the signal input/output direction and optimize the signal level,
wherein the terminals on the connector are pin-type terminals, and the test result signal receiving terminal is shorter than the attribute signal receiving terminal, and the control section verifies the attribute of the connected device based on the length of time between the time the connection of the test result signal receiving terminal is detected and the time the connection of the attribute signal receiving terminal is detected.

16. The information terminal apparatus of claim 15, wherein the terminals on the connector have a plurality of contact faces, and the control section verifies the attribute of the connected external device based on the number of contact faces on the terminals.

17. An information terminal apparatus comprising:
an interface section for connecting thereto a communication apparatus; and
a control section for performing signal transfers to and from the communication apparatus via the interface section,
wherein the interface section includes:
a judging circuit for judging the attribute of the connected communication apparatus; and
a switching circuit for, based on the result of the judgement, performing an operation for switching input/output directions of the communication control and data signals to directions appropriate to the connected communication apparatus and an operation for optimizing signal level to a level appropriate to the connected communication apparatus, and
wherein when a communication application is started after the communication apparatus is connected, the control section executes a call origination procedure by retrieving connection destination information associated with the connected communication apparatus from a table in which connection destination information is prestored for each individual communication apparatus.

18. The information terminal apparatus of claim 17, wherein the control section retrieves the connection destination information associated with the communication apparatus based on the result of the judgement.

19. The information terminal apparatus of claim 17, wherein, when no communication apparatus is connected, the control section activates only the judging circuit, and when a communication apparatus is connected, the judging circuit supplies the result of the judgement to the control section which then activates the entire information terminal apparatus.

20. The information terminal apparatus of claim 17, wherein, when the communication application is started after the communication apparatus is connected, the control section judges whether any other communication apparatus is available that can accomplish communication in a shorter time than the currently connected communication apparatus, and
wherein the information terminal apparatus includes a reporting means for visually or audibly reporting the result of the judgement made by the control section.

21. The information terminal apparatus of claim 17, wherein, when the communication application is started after the communication apparatus is connected, the control section judges whether any other communication apparatus is available that can accomplish communication with a lower communication charge than the currently connected communication apparatus, and
wherein the information terminal apparatus includes a reporting means for visually or audibly reporting the result of the judgement made by the control section.

22. The information terminal apparatus of claim 17, wherein, when the communication application is started after the communication apparatus is connected, the control section judges whether any other communication apparatus is available that can perform communication with a higher signal level than the signal level on a communication line of the currently connected communication apparatus, and
wherein the information terminal apparatus includes a reporting means for visually or audibly reporting the result of the judgement made by the control section.

23. The information terminal apparatus of claim 17, wherein the control section suspends communication when the communication becomes impossible, and resumes the communication when the communication becomes possible, and while the communication is being suspended, the control section judges whether any other communication apparatus is available that has a wider communication area than the communication area of the currently connected communication apparatus, and that the information terminal apparatus includes a reporting means for visually or audibly reporting the result of the judgement made by the control section.

24. The information terminal apparatus of claim 17, wherein, when the communication apparatus is disconnected from the information terminal apparatus during communication, the control section suspends the communication, and resumes the communication upon detecting the connection of the communication apparatus being restored.

25. An information terminal apparatus comprising:
an interface section for connection thereto an external device; and
a control section for performing signal transfers to and from the external device via the interface section,
wherein the interface section includes
a connector having a terminal for sending and receiving communication control and data signals and a terminal for receiving an attribute signal representing an attribute of the external device;
a judging circuit for judging the attribute of the connected external device based on the received attribute signal, wherein the external device is a communication apparatus, and when a call arrives at the connected communication apparatus, the judging circuit judges the attribute of the connected communication apparatus based on a terminal potential change or an input signal pattern; and
a switching circuit for receiving a result of the attribute judgment and, based on the attribute judgment, switching input/output directions of the communication control and data signals to directions appropriate for the connected external device and optimizing a signal level to a level appropriate for the connected external device, wherein the judging circuit judges the attribute of the connected communication apparatus based on whether or not the input signal pattern matches a present signal pattern.

* * * * *